(12) United States Patent
Umayabashi et al.

(10) Patent No.: US 8,565,124 B2
(45) Date of Patent: Oct. 22, 2013

(54) NODE, NETWORK, CORRESPONDENCE RELATIONSHIP GENERATION METHOD AND FRAME TRANSFER PROGRAM

(75) Inventors: Masaki Umayabashi, Tokyo (JP); Kazuo Takagi, Tokyo (JP); Daisaku Ogasahara, Tokyo (JP); Nobuyuki Enomoto, Tokyo (JP); Youichi Hidaka, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 716 days.

(21) Appl. No.: 11/885,573

(22) PCT Filed: Mar. 1, 2006

(86) PCT No.: PCT/JP2006/304420
§ 371 (c)(1),
(2), (4) Date: Jan. 2, 2008

(87) PCT Pub. No.: WO2006/093321
PCT Pub. Date: Sep. 8, 2006

(65) Prior Publication Data
US 2008/0165705 A1 Jul. 10, 2008

(30) Foreign Application Priority Data
Mar. 4, 2005 (JP) .................................. 2005-061675

(51) Int. Cl.
*H04L 12/28* (2006.01)
(52) U.S. Cl.
USPC .......................................... 370/256; 370/255
(58) Field of Classification Search
None
See application file for complete search history.

(56) References Cited

U.S. PATENT DOCUMENTS

| | | | |
|---|---|---|---|
| 6,519,651 B1 * | 2/2003 | Dillon | 709/250 |
| 6,538,997 B1 * | 3/2003 | Wang et al. | 370/241 |
| 6,556,541 B1 * | 4/2003 | Bare | 370/235 |
| 7,400,634 B2 * | 7/2008 | Higashitaniguchi et al. | 370/395.53 |

(Continued)

FOREIGN PATENT DOCUMENTS

| | | |
|---|---|---|
| JP | 2004-032006 | 1/2004 |
| WO | WO 2004/075482 | 9/2004 |

OTHER PUBLICATIONS

Ando (Powered Com), "Lan Switch Technology~ Redundancy Method and Latest Technology~", Internet Week 2003, http://www.nic.ad.jp/ja/materials/iw/2003/proceedings/index.html http://www.nic.ad.jp/ja/materials/iw/2003/proceedings/T14-2.pdf, p. 42-57.

(Continued)

*Primary Examiner* — Ayaz Sheikh
*Assistant Examiner* — Faiyazkhan Ghafoerkhan
(74) *Attorney, Agent, or Firm* — Scully, Scott, Murphy & Presser PC

(57) ABSTRACT

Provided in the EoE technique are the node, the network, the correspondence relationship generating method and the frame transfer program to avoid traffic concentration on a specific link to improve throughput of the network as a whole by realizing optimum path transfer. The frame switching unit includes the frame analysis unit for analyzing an input frame kind and the like, the table search unit for obtaining frame rewriting information and output port information, the forwarding table storage unit for managing an output port of a frame, the MAC learning unit for executing MAC address learning, the EoE-MAC learning unit for learning a relationship between a MAC address and an EoE-MAC address, the STP control unit for executing processing of a spanning tree, and the like.

54 Claims, 44 Drawing Sheets

(56) References Cited

U.S. PATENT DOCUMENTS

| | | | |
|---|---|---|---|
| 7,570,604 B1 * | 8/2009 | Aggarwal et al. | 370/256 |
| 2003/0179707 A1 * | 9/2003 | Bare | 370/235 |
| 2004/0047300 A1 * | 3/2004 | Enomoto et al. | 370/256 |
| 2004/0148279 A1 * | 7/2004 | Peleg | 707/3 |
| 2004/0225725 A1 * | 11/2004 | Enomoto et al. | 709/220 |
| 2006/0092860 A1 * | 5/2006 | Higashitaniguchi et al. | 370/255 |

OTHER PUBLICATIONS

Umayabashi et al., "Proposal of Next Generation Ethernet (R) -(2) Highly Efficient Routing and High Speed Protection", 2002, Institute of Electronics, Information and Communication Engineers of Japan, Society Conference B-7-11.

* cited by examiner

FIG. 5

341    MAC TABLE

| MAC ADDRESS | VLAN ID | OUTPUT PORT |
|---|---|---|
| e1 | g1 | p1 |
|  |  |  |
|  |  |  |
| ⋮ | ⋮ | ⋮ |
|  |  |  |
|  |  |  |

FIG. 6

342    MAC/EoE−MAC TABLE

| MAC ADDRESS | EoE−MAC ADDRESS | VLAN ID |
|---|---|---|
| t3 | e3 | g3 |
|  |  |  |
|  |  |  |
| ⋮ | ⋮ | ⋮ |
|  |  |  |
|  |  |  |

FIG. 7

343 BROADCAST TABLE

| VLAN ID | OUTPUT PORT |
|---------|-------------|
| g1      | g2, g3      |
|         |             |
|         |             |
| ⋮       | ⋮           |
|         |             |
|         |             |

FIG. 8

800 STP PORT STATE MANAGEMENT TABLE

| VLAN ID | STP PORT INFORMATION | | | |
|---------|------|------|------|------|
|         | p1   | p2   | p3   | p4   |
| g1      | R/f  | D/f  | D/f  | D/f  |
|         |      |      |      |      |
| ⋮       | ⋮    | ⋮    | ⋮    | ⋮    |
|         |      |      |      |      |
|         |      |      |      |      |

FIG. 9

900 VLAN ID/EoE-MAC MANAGEMENT TABLE

| VLAN ID | EoE-MAC ADDRESS |
|---------|-----------------|
| g1      | e1              |
|         |                 |
|         |                 |
| ⋮       | ⋮               |
|         |                 |
|         |                 |

FIG. 10

1000 EoE-MAC/VLAN ID MANAGEMENT TABLE

| EoE-MAC ADDRESS | VLAN ID |
|-----------------|---------|
| e1              | g1      |
|                 |         |
|                 |         |
| ⋮               | ⋮       |
|                 |         |
|                 |         |

FIG. 23

2301 MAC TABLE

| MAC ADDRESS | VLAN ID | OUTPUT PORT |
|---|---|---|
| t1 | 0 | p1 |
|  |  |  |
|  |  |  |

2302 MAC/EoE-MAC TABLE

| MAC ADDRESS | EoE-MAC ADDRESS | VLAN ID | Flag |
|---|---|---|---|
| t3 |  |  | 1 |
|  |  |  |  |
|  |  |  |  |

2303 BROADCAST TABLE

| VLAN ID | OUTPUT PORT |
|---|---|
| g1 | p2, p3 |
| g3 | p2, p3 |
|  |  |

2304 MAC TABLE

| MAC ADDRESS | VLAN ID | OUTPUT PORT |
|---|---|---|
| t1 | 0 | p1 |
| e3 | g3 | p2 |
|  |  |  |

2305 MAC/EoE-MAC TABLE

| MAC ADDRESS | EoE-MAC ADDRESS | VLAN ID | Flag |
|---|---|---|---|
| t3 | e3 | g3 | 1 |
|  |  |  |  |
|  |  |  |  |

FIG. 24

2401 MAC TABLE

| MAC ADDRESS | VLAN ID | OUTPUT PORT |
|---|---|---|
| e1 | g1 | p1 |
| | | |
| | | |

2404 MAC TABLE

| MAC ADDRESS | VLAN ID | OUTPUT PORT |
|---|---|---|
| e1 | g1 | p1 |
| e3 | g3 | p2 |
| | | |

2403 BROADCAST TABLE

| VLAN ID | OUTPUT PORT |
|---|---|
| g1 | p1, p2, p3 |
| g3 | p1, p2, p3 |
| | |

FIG. 25

2504 MAC TABLE

| MAC ADDRESS | VLAN ID | OUTPUT PORT |
|---|---|---|
| e1 | g1 | p1 |
| t3 | 0 | p2 |
|  |  |  |

2505 MAC/EoE-MAC TABLE

| MAC ADDRESS | EoE-MAC ADDRESS | VLAN ID | Flag |
|---|---|---|---|
| t1 | e1 | g1 | 1 |
|  |  |  |  |
|  |  |  |  |

2501 MAC TABLE

| MAC ADDRESS | VLAN ID | OUTPUT PORT |
|---|---|---|
| e1 | g1 | p1 |
|  |  |  |
|  |  |  |

2502 MAC/EoE-MAC TABLE

| MAC ADDRESS | EoE-MAC ADDRESS | VLAN ID | Flag |
|---|---|---|---|
| t1 | e1 | g1 | 0 |
|  |  |  |  |
|  |  |  |  |

2503 BROADCAST TABLE

| VLAN ID | OUTPUT PORT |
|---|---|
| g1 | p1, p3 |
| g7 | p1, p3 |
| 0 | p2 |

FIG. 32

PORT/VPN TABLE 30461

| PORT | VPN-ID |
|------|--------|
| p1   | A      |
|      |        |
|      |        |
| ⋮    | ⋮      |
|      |        |
|      |        |

FIG. 33

VPN/PORT TABLE 30462

| VPN-ID | PORT |
|--------|------|
| A      | p1   |
|        |      |
|        |      |
| ⋮      | ⋮    |
|        |      |
|        |      |

FIG. 34

30463  PORT/VPN TABLE

| PORT | VLAN ID | VPN-ID |
|------|---------|--------|
| p1   | g1      | A      |
|      |         |        |
|      |         |        |
| ⋮    | ⋮       | ⋮      |
|      |         |        |
|      |         |        |

FIG. 35

30464  VPN/PORT TABLE

| VPN-ID | VLAN ID | PORT |
|--------|---------|------|
| A      | g1      | p1   |
|        |         |      |
|        |         |      |
| ⋮      | ⋮       | ⋮    |
|        |         |      |
|        |         |      |

FIG. 39

3921 BROADCAST TABLE (EDGE SWITCH E3)

| VLAN ID | OUTPUT PORT |
|---------|-------------|
| g1 | p1, p3 |
| g3 | p1, p3 |
| 0 | p2 |
| A | p1 |

3922 PORT/VPN TABLE (EDGE SWITCH E3)

| PORT | VPN-ID |
|------|--------|
| p2 | A |

3923 VPN/PORT TABLE (EDGE SWITCH E3)

| VPN-ID | PORT |
|--------|------|
| A | p2 |

3911 BROADCAST TABLE (EDGE SWITCH C1)

| VLAN ID | OUTPUT PORT |
|---------|-------------|
| g1 | p1, p2, p3 |
| g3 | p1, p2, p3 |
| A | p1, p2 |

3901 BROADCAST TABLE (EDGE SWITCH E1)

| VLAN ID | OUTPUT PORT |
|---------|-------------|
| g1 | p2, p3 |
| g3 | p2, p3 |
| A | p2 |

3902 PORT/VPN TABLE (EDGE SWITCH E1)

| PORT | VPN-ID |
|------|--------|
| p1 | A |

3903 VPN/PORT TABLE (EDGE SWITCH E1)

| VPN-ID | PORT |
|--------|------|
| A | p1 |

NODE, NETWORK, CORRESPONDENCE RELATIONSHIP GENERATION METHOD AND FRAME TRANSFER PROGRAM

TECHNICAL FIELD

The present invention relates to a node in an EoE (Ethernet (R) over Ethernet (R)) network, a network, a correspondence relationship generation method and a frame transfer program and, more particularly, a node, a network, a correspondence relationship generation method and a frame transfer program for optimization of frame transfer.

BACKGROUND ART

In recent years, the center of attention as reasonable data service for corporate use is a wide area Ethernet (R) VPN service (wide area Ether) which is an expansion of the Ethernet (R) technique used widely in LAN into a wide area network. Although wide area Ether takes over the advantages of the related Ethernet (R) techniques such as plug and play as easiness to use and low costs, because a MAC address of a user terminal passes in a core network, the number of MAC addresses to be processed by a core switch is enormous. More specifically, the problem is that the amount of MAC address processing (MAC address learning processing, address search processing at the time of frame transfer, etc.) in the core switch bottlenecks or that when the number of MAC addresses accommodated in the core switch is limited, the number of accommodated MAC addresses in the network (the number of accommodated user terminals) is limited.

In order to solve the problem, non-patent Literature 1 proposes the technique called EoE. Although other than the non-patent Literature 1, there exist similar techniques, for example, the MAC in MAC technique discussed in IEEE802.1 and the like, since the problem to be solved which will be described in the following is in common, description will be here made of the non-patent Literature 1.

FIG. 48 shows one example of a wide area Ether network. The wide area Ether network comprises edge switches E5, E6, E7 and E8 which accommodate user terminals T5, T6, T7 and T8, and core switches C3 and C4 which execute only relay operation without accommodating the user terminals.

With the wide area Ether service using the related Ethernet (R) techniques, when ten thousand of user terminals are connected to each edge switch in FIG. 48, for example, the core switch needs to process forty thousands of MAC addresses. On the other hand, with the EoE techniques, a MAC address which is effective only in the network (hereinafter referred to as EoE-MAC address) is set at each edge switch, so that when transferring a frame from a user terminal connected under the switch itself in the network, the frame is encapsulated by the EoE-MAC address and transferred. In FIG. 48, EoE-MAC addresses e5, e6, e7 and e8 are set at the edge switches E5, E6, E7 and E8, respectively.

Next, a frame format will be described. FIG. 49 shows a format of an ordinary Ethernet (R) frame 4300. The Ethernet (R) frame 4300 comprises a destination MAC address 4310, a transmission source MAC address 4320, a Type 4330, a payload 4340 and an FCS (Frame Check Sequence) 4350.

On the other hand, a format of a frame encapsulated by an EoE-MAC address (hereinafter referred to as EoE frame) has an arrangement as shown in FIG. 50. As shown in FIG. 50, an EoE frame 4400 has a format encapsulated with an EoE-MAC address 4410 of a destination edge switch (destination EoE-MAC address), an EoE-MAC address 4420 of its own switch as a transmission source (transmission source EoE-MAC address) and Type 4430 added before an Ethernet (R) frame 4440 and an FCS 4450 added after the Ethernet (R) frame 4440. The Ethernet (R) frame 4440 encapsulated here is equivalent to the Ethernet (R) frame 4300 received from a user terminal with the FCS 4350 deleted.

Format of an Ethernet (R) frame from a user terminal with a VLAN tag added is shown in FIG. 51. An Ethernet (R) frame 4500 with a VLAN tag comprises the destination MAC address 4310, the transmission source MAC address 4320, a VLAN tag 4510, the Type 4330, the payload 4340 and the FCS 4350. In the Ethernet (R) frame 4440 shown in FIG. 50, the Ethernet (R) frame 4500 with a VLAN tag from which the FCS 4350 is deleted is stored in some cases.

The EoE frame 4400 is structured to have a VLAN tag in some cases, and in such a case, the frame comprises the destination EoE-MAC address 4410, the transmission source EoE-MAC address 4420, the VLAN 4510, the Type 4430, the Ethernet (R) frame 4440 and the FCS 4450 as shown in FIG. 52.

Returning to the description of FIG. 48, when the edge switches E5~E8 receive an Ethernet (R) frame from the user terminals T5~T8, the switches encapsulate the frame by the EoE-MAC address and transfer the obtained frame to the core network side, resulting in transferring a frame with an EoE-MAC address to the core switches C3 and C4. Therefore, the core switches C3 and C4 should process as many MAC addresses as the number of edge switches in the network. In the example shown in FIG. 48, since the number of edge switches is four, each of the core switches C3 and C4 needs to process four MAC addresses.

While in the above-described example in the existing Ethernet (R) technique, in a case where user terminals on the order of ten thousand are connected to each edge switch, forty thousands of MAC addresses should be processed, with the EoE technique, only four MAC addresses need to be processed. Thus, the EoE techniques have the effect that while the core switch supports standard MAC address transfer, the number of MAC addresses to be processed by a core switch can be reduced to as many MAC addresses as the number of edge switches irrespective of the number of MAC addresses accommodated in the network, which is a technique expandable to a large-scale network.

On the other hand, the Ethernet (R) technique has a possibility that with no countermeasure taken, when a loop structure exists in a network, a frame will continue circulating on the loop and in particular, a broadcast frame circulating will down the network. In order to avoid such a situation, used in many cases are the spanning tree protocol (hereinafter referred to as STP, which technique is defined by IEEE802.1D) for forming a loop-free network by logically excluding the loop even when a physical loop structure exists in the network and a higher version of the same, that is, the rapid spanning tree protocol (hereinafter referred to as RSTP, which technique is defined by IEEE802.1w).

With the STP or RSTP technique used, when any port on a loop structure enters a blocked state (a state where neither transmission nor reception of a main signal frame is executed), a loop-free structure is established. Taking the network shown in FIG. 48 as an example in which there exists a loop structure among the edge switch E7, the core switch C3, the core switch C4 and the edge switch E8, for example, when a port p3 of the core switch C3 enters the blocked state, the structure becomes loop-free.

When such STP and RSTP techniques are used, however, no frame is transferred on a link connected to a blocked port, so that in a case of frame transfer between certain switches, the frame can not be transferred by the shortest path (a path with a minimum number of hops). In the example of FIG. 48, when a frame is transferred from the user terminal T6 to the user terminal T5, since the port p3 of the edge switch E5 is blocked, transfer is impossible from the edge switch E6 to the edge switch E5, so that the frame will be transferred through a path of the edge switch E6->the core switch C4->the edge switch E8->the edge switch E7->the core switch C3->the edge switch E5 to reach the user terminal T5.

As a technique for solving the problem, in non-patent Literature 2 with the use of the technique of Multiple STP (hereinafter referred to as MSTP) capable of management on a plurality of VLANID basis, each edge switch generates an STP/RSTP tree as a transfer path with the switch itself as a route node, and a transfer path of a frame destined for an edge switch as a route node of each STP/RSTP tree is taken as its STP/RSTP tree. Since as a link going active in the STP/RSTP tree (link including no blocked port), a link whose cost of link from a route node is the lowest is selected, the method of the non-patent Literature 2 enables transfer by the shortest path.

Shown in FIG. 53 is an example where the method of the non-patent Literature 2 is used for the above frame transfer from the user terminal T6 to T5 described in FIG. 48. In FIG. 53, frame transfer from the user terminal T6 to T5 is executed by using the STP/RSTP tree with the edge switch E5 as a route node (transfer from the edge switches E7 and E8 to E5 is executed also by using the STP/RSTP tree with the edge switch E5 as a route node). Accordingly, a frame from the user terminal T6 arrives at the user terminal T5 through the edge switch E6 and the edge switch E5. Thus, transfer between the respective nodes can be executed through the shortest path.

In the non-patent Literature 2, the following processing is executed for such transfer. In the transfer between edge switches, with a node ID set at each edge switch stored in a VLAN tag of an Ethernet (R) frame, each edge switch and each core switch execute frame transfer based on the ID.

In FIG. 53, node IDs g11, g12, g13 and g14 are assigned to the edge switches E5, E6, E7 and E8 and in the transfer from the edge switch E6 to the edge switch E5, the VLANID=g11 stored in a VLAN tag is stacked in a frame at the edge switch E6 (the present VLAN tag will be denoted as a forwarding tag) and the edge switch E6 executes frame transfer toward the direction of the edge switch E5 based on the forwarding tag=g11.

In a forwarding table of each switch, an output port for a forwarding tag value is managed and set as an output port is a port number of a route port (a port state at that time is a forwarding state indicative of transfer enabled state) of an STP/RSTP tree with an edge switch having the same node ID as that of the forwarding tag value as a route node. Here, assume that the forwarding tag value (node ID of a destination edge switch) and an identification ID (VLANID) of the STP/RSTP tree are both stored in the VLAN tag and have the same values.

In FIG. 53, the node ID of the edge switch E5 is g11 and an identification ID (VLANID) of the STP/RSTP tree with the edge switch E5 as a route node is also g11, which are respectively stored in the VLAN tag. In the setting of a forwarding table, on a forwarding tag, port information of an STP/RSTP tree identified by the same identifier as a value of the tag will be reflected. In FIG. 53, at each switch, an output port for the forwarding tag g11 reflects port information of the STP/RSTP tree whose VLANID is g1.

Non-patent Literature 1: Ando (Powered Com), "LAN Switch Technology~Redundancy Method and Latest Technology~", Internet Week 2003.

Non-patent Literature 2: Umayabashi et al., "Proposal of Next Generation Ethernet (R) Architecture GOE (Global Optical Ethernet (R))—(2) Highly Efficient Routing and High Speed Protection", 2002, Institute of Electronics, Information and Communication Engineers of Japan, Society Conference B-7-11.

Description will be made with reference to FIG. 54 whether applying the optimum path transfer technique of the non-patent Literature 2 to the EoE technique of the non-patent Literature 1 described above solves the problem or not that the EoE technique fails to realize optimum path transfer.

Similarly to the non-patent Literature 2, an STP/RSTP tree with each edge switch as a route node is generated by the EoE technique. Because of use of the MSTP technique, an identifier of each STP/RSTP tree will be VLANID. In FIG. 54, the VLANID of the STP/RSTP tree with the edge switch E5 as a route is g11. In addition, in the EoE technique, frame transfer is executed based on an EoE-MAC address as described above.

In FIG. 54, the EoE-MAC address of the edge switch E5 is e5, so that a frame directed to the edge switch E5 is transferred based on the EoE-MAC address e5. Here, when an output port is set by the method of the non-patent Literature 2, each switch is not allowed to determine an output port for an EoE-MAC address because an identifier of an STP/RSTP tree (VLANID) corresponding to the EoE-MAC address is unknown. Thus, simply applying the technique of the non-patent Literature 2 to the EoE technique fails to enable the EoE technique to realize optimum path transfer.

SUMMARY

An exemplary object of the present invention is to improve throughput of a network as a whole by realizing optimum path transfer in the EoE technique to avoid concentration of traffic on a specific link.

According to a first exemplary aspect of the invention, a node of a network for transferring a data frame sent from a transmission source terminal to a destination terminal, wherein each node in the network holds a correspondence relationship between an identifier of a node to which the destination terminal is connected and an identifier of a spanning tree with the node connecting with the destination terminal as a route node, adds the identifier of the node to which the destination terminal is connected and the identifier of the spanning tree to the data frame, and with the spanning tree as a path, determines an output port of the data frame from the correspondence relationship.

According to a second exemplary aspect of the invention, a network including a plurality of nodes for transferring a data frame between a transmission source terminal and a destination terminal connected to the nodes, wherein each node in the network holds a correspondence relationship between an identifier of a node to which the destination terminal is connected and an identifier of a spanning tree with the node connecting with the destination terminal as a route node, adds the identifier of the node to which the destination terminal is connected and the identifier of the spanning tree to the data frame, and on the spanning tree, determines an output port for the node to which the destination terminal is connected from the correspondence relationship based on port information of the spanning tree to transfer the data frame.

According to a third exemplary aspect of the invention, a method of generating a correspondence relationship of transfer information in a network for transferring a data frame sent from a transmission source terminal to a destination terminal, includes the steps of adding an identifier of a node to which the destination terminal is connected and an identifier of a spanning tree with the node to which the destination terminal is connected as a route node to the data frame, and generating a correspondence relationship for determining an output port of the data frame to be transferred to the node to which the destination terminal is connected based on port information of the spanning tree, which is a correspondence relationship between an identifier of the node to which the destination terminal is connected and an identifier of the spanning tree with the node to which the destination terminal is connected as a route node to each node in the network.

According to a fourth exemplary aspect of the invention, a frame transfer program executed on a computer as a node of a network for transferring a data frame between a transmission source terminal and a destination terminal, which causes the node to execute the functions of holding a correspondence relationship between an identifier of a node to which the destination terminal is connected and an identifier of a spanning tree with the node connecting with the destination terminal as a route node, adding the identifier of the node to which the destination terminal is connected and the identifier of the spanning tree to the data frame, and on the spanning tree, determining an output port for the node to which the destination terminal is connected from the correspondence relationship based on port information of the spanning tree to transfer the data frame.

BRIEF DESCRIPTION OF THE DRAWINGS

FIG. 5 is a MAC table of the present invention.

FIG. 6 is a block diagram showing a MAC/EoE-MAC table of the present invention;

FIG. 7 is a broadcast table of the present invention;

FIG. 8 is an STP port state management table of the present invention;

FIG. 9 is a VLAN/EoE-MAC management table of the present invention;

FIG. 10 is an EoE-MAC/VLAN management table of the present invention;

FIG. 23 is a forwarding table of the edge switch E5 according to the fourth exemplary embodiment of the present invention;

FIG. 24 is a forwarding table of the core switch C5 according to the fourth exemplary embodiment of the present invention;

FIG. 25 is a forwarding table of the edge switch E7 according to the fourth exemplary embodiment of the present invention;

FIG. 32 is a port/VPN table of the present invention;

FIG. 33 is another VPN/port table of the present invention;

FIG. 34 is a port/VPN table of the present invention;

FIG. 35 is other VPN/port table of the present invention;

FIG. 39 shows an example of a forwarding table of each switch according to the sixth exemplary embodiment of the present invention;

EXEMPLARY EMBODIMENT (First Exemplary Embodiment)

In the following, exemplary embodiments of the present invention will be described in detail with reference to the drawings.

Figure 1:
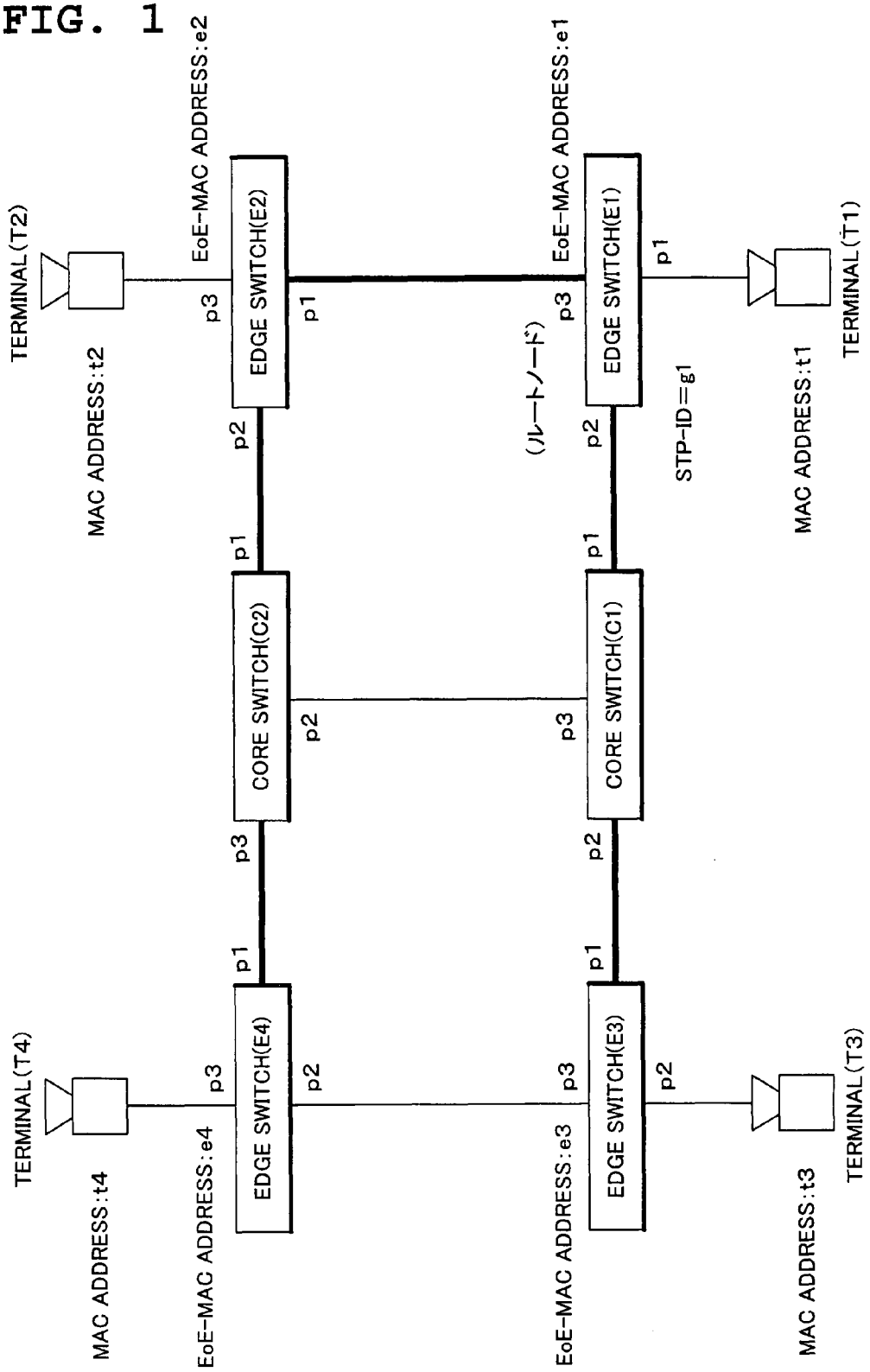
FIG. 1 is a diagram of a network model of a wide area Ether of the present invention.

FIG. 1 shows an example of a physical network structure to which the present invention is applied.

Edge switches (nodes) E1, E2, E3 and E4 in FIG. 1 are EoE-technique-compatible switches and core switches (nodes) C1 and C2 are existing Ethernet (R)-technique-compatible switches, all of which comprise the function according to the present invention in addition to related functions. The switches are connected in the following manner.

Connected are a port p3 of the edge switch E1 and a port p1 of the edge switch E2, a port p2 of the edge switch E1 and the port p1 of the core switch C1, the port p2 of the core switch C1 and the port p1 of the edge switch E3, the port p3 of the edge switch E3 and the port p2 of the edge switch E4, the port p1 of the edge switch E4 and the port p3 of the core switch C2, the port p1 of the core switch C2 and the port p2 of the edge switch E2, and the port p3 of the core switch C1 and the port p2 of the core switch C2, respectively.

In addition, each edge switch connects to a user terminal as described in the following.

Connected to the port p1 of the edge switch E1 is a user terminal T1, connected to the port p3 of the edge switch E2 is a user terminal T2, connected to the port p2 of the edge switch E3 is a user terminal T3 and connected to the port p3 of the edge switch E4 is a user terminal T4.

Frame transfer in such a network is premised on a typical case where an Ethernet (R) frame transmitted from the user terminals T1~T4 are encapsulated into an EoE-MAC frame at the edge switches E1~E4, transfer by an EoE-MAC address is executed at the core switches C1 and C2 and the encapsulation of the EoE-MAC frame is released at the edge switches E1~E4 on the destination user terminal side to transfer the frame to the destination user terminals T1~T4.

In the first exemplary embodiment of the present invention, for realizing optimum path transfer by the EoE technique, each of the edge switches E1~E4 generates an STP/RSTP-based spanning tree with its own node as a route node and each switch in the network holds the correspondence between a VLANID for identifying its own STP/RSTP-based spanning tree and an EoE-MAC address of the edge switch E1~E4 as a route node of the spanning tree.

Then, based on port information of the STP/RSTP-based spanning tree, an STP control unit which will be described later refers to the above correspondence to set an output port corresponding to the EoE-MAC address.

In the following, outlines of operation in the present exemplary embodiment will be described with reference to FIG. 42 and FIG. 43.

Figure 42:
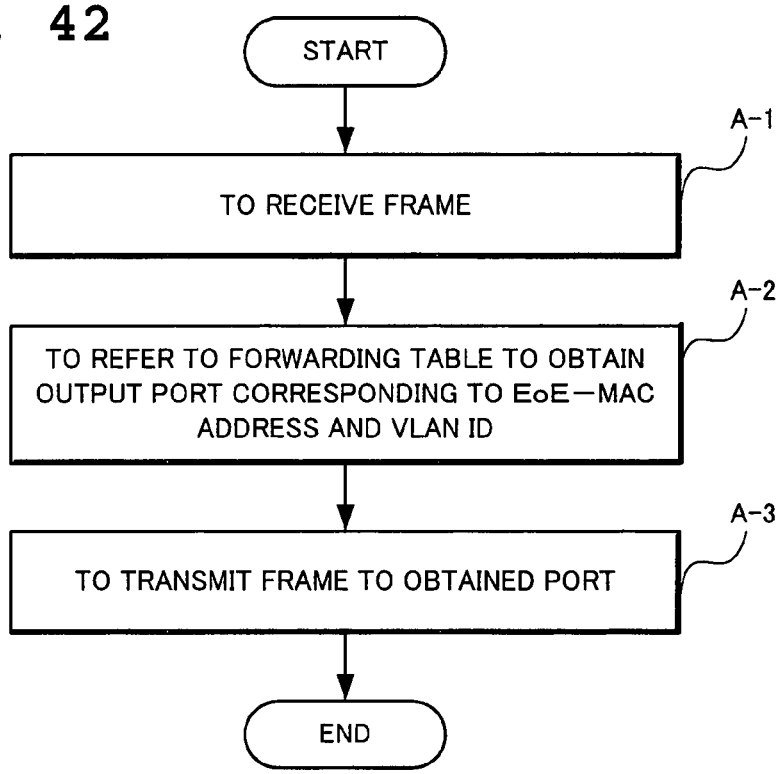
FIG. 42 is a flow chart showing an outline of a frame transfer procedure in the first exemplary embodiment of the present invention.

Outlines of a frame transfer procedure at the switch according to the present exemplary embodiment are as shown in the flow chart of FIG. 42.

Receive an EoE-MAC frame with a VLAN tag (Step A-1).

Obtain an EoE-MAC address indicative of a node to which a destination terminal is connected and a VLANID indicative of a spanning tree with the node to which the destination terminal is connected as a route node to refer to a forwarding table (which will be described later) and obtain an output port corresponding to the EoE-MAC address and the VLANID (Step A-2).

Output an EoE-MAC frame with a VLAN tag through the output port obtained at Step A-2 (Step A-3).

A node to which a transmission source terminal is connected transmits an Ethernet (R) frame having a VLAN tag received from the transmission source terminal, with an EoE-MAC address indicative of the node to which the transmission source terminal is connected, the EoE-MAC address indicative of the node to which the destination terminal is connected and a VLANID indicative of a spanning tree with the node to which the destination terminal is connected as a route node added in the respective fields of the frame (a destination EoE-MAC address field, a transmission source EoE-MAC address field and a VLAN tag field).

The node to which the destination terminal is connected deletes, from the received frame, the destination EoE-MAC address field and the transmission source EoE-MAC address field, the VLAN tag and the like and further obtains a MAC address of the transmission source terminal and a MAC address of the destination terminal to transmit the obtained frame to the destination terminal.

Figure 43:
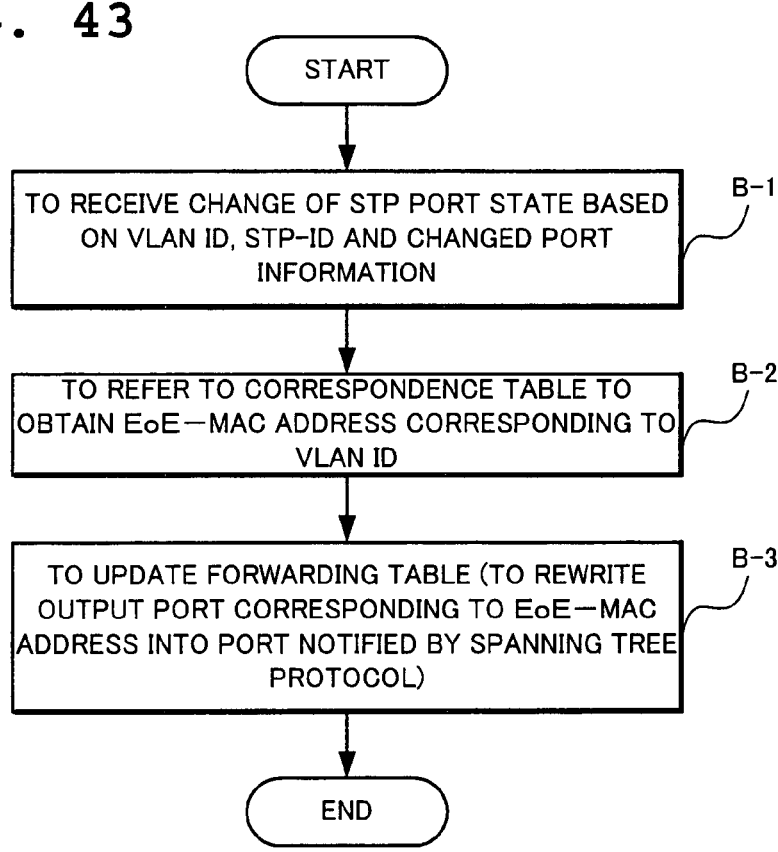
FIG. 43 is a flow chart showing an outline of a forwarding table update procedure in the first exemplary embodiment of the present invention.

Outlines of a forwarding table update procedure in the present exemplary embodiment is as shown in the flow chart of FIG. 43.

At the time of change of an STP port state (which will be described later), each switch receives a VLAN ID (spanning tree protocol ID) and changed port information (which will be described later) (Step B-1).

Refer to the correspondence table to obtain an EoE-MAC address corresponding to the VLAN ID at Step B1 (Step B-2).

Rewrite an output port corresponding to the EoE-MAC address obtained at Step B-2 into a port notified by the spanning tree protocol to update the forwarding table (Step B-3).

Detailed contents of the above-described frame transfer procedure and forwarding table update procedure will be clarified in the following description of the respective components and their operation.

Structure of the edge switches E1~E4 and the core switches C1 and C2 will be described with reference to FIG. 2.

Figure 2:
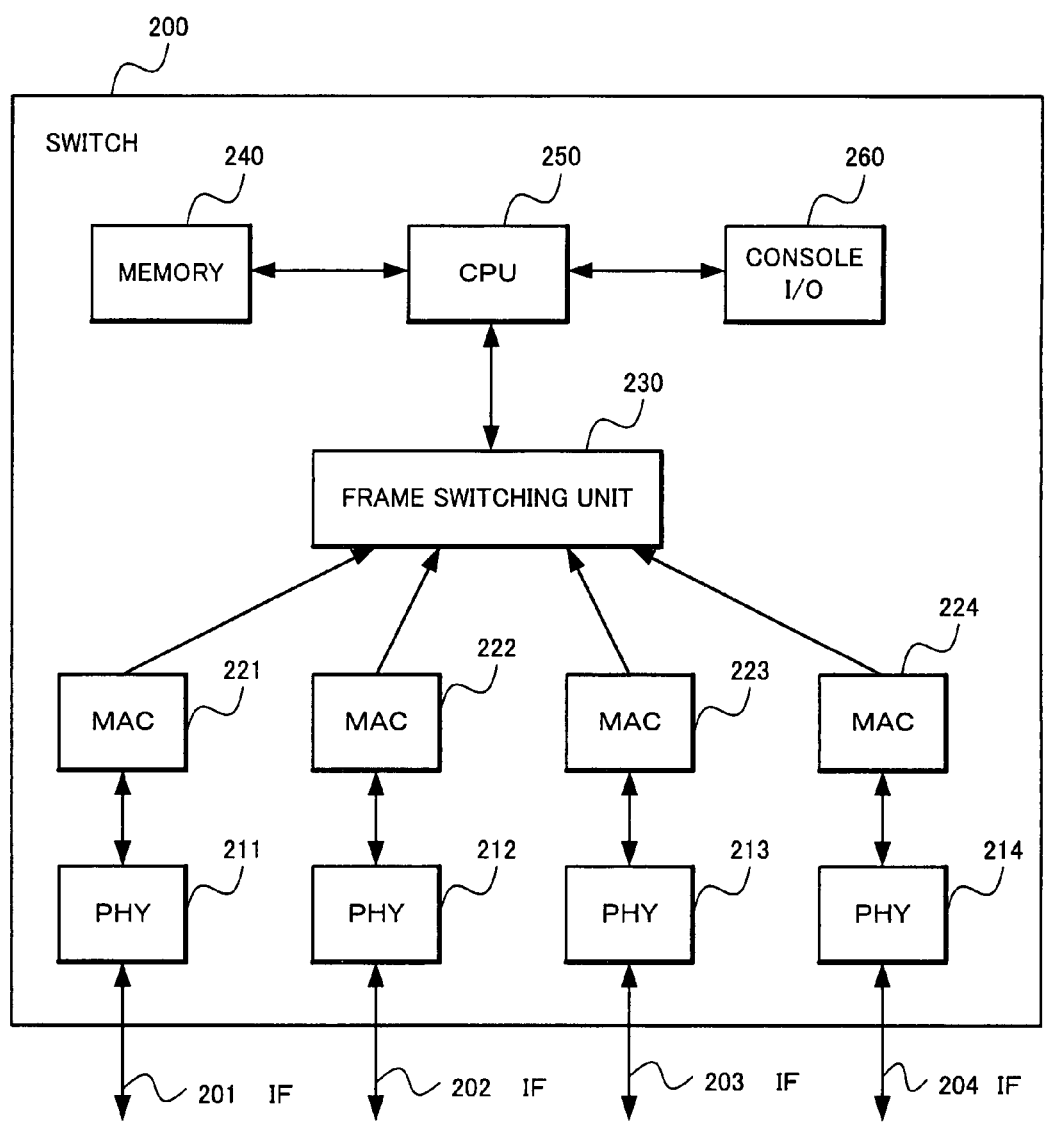
FIG. 2 is a block diagram of a switch of the present invention.

Switch 200 of FIG. 2 has a block diagram in common among the edge switches E1~E4 and the core switches C1 and C2.

The switch 200 comprises PHYs (Physical) 211, 212, 213 and 214, MACs (Media Access Control) 221, 222, 223 and 224, a frame switching unit 230, a memory 240, a CPU 250 and a console I/O 260.

The PHYs 211, 212, 213 and 214 are interfaces which execute access in a physical layer as the lowest-order layer of an OSI reference model and the MACs 221, 222, 223 and 224 are interfaces which execute access in a MAC layer as a lower sub-layer of a data link layer of the OSI reference model.

To IFs (interface units) 201, 202, 203 and 204, the PHYs 211, 212, 213 and 214 are connected, respectively, to the PHYs 211, 212, 213 and 214, the MACs 221, 222, 223 and 224 are connected and to the MACs 221, 222, 223 and 224, the frame switching unit 230 is connected.

Ethernet (R) frames input through the IFs 201, 202, 203 and 204 are applied to the frame switching unit 230 through the PHYs 211, 212, 213 and 214 and the MACs 221, 222, 223 and 224 and with an appropriate output IF determined by the frame switching unit 230 by operation which will be described later, are output to the IFs 201, 202, 203 and 204 through the MACs 221, 222, 223 and 224 and the PHYs 211, 212, 213 and 214, respectively.

In addition, with a program for controlling operation of the frame switching unit 230 and necessary data stored, the CPU 250 and the memory 240 give a control instruction to the frame switching 230. The console I/O 260 is an external interface related to setting management of each unit in the device.

Operation of the switch 200 of the present invention can be realized not only as hardware but also as software by executing a program which executes the above-described components by means of the CPU 250 of the computer processing device. The program is stored in the memory 240 as a recording medium such as a magnetic disk or a semiconductor memory and loaded from the memory 240 into the CPU 250 to control its operation, thereby realizing each function of the above-described respective components.

Figure 3:
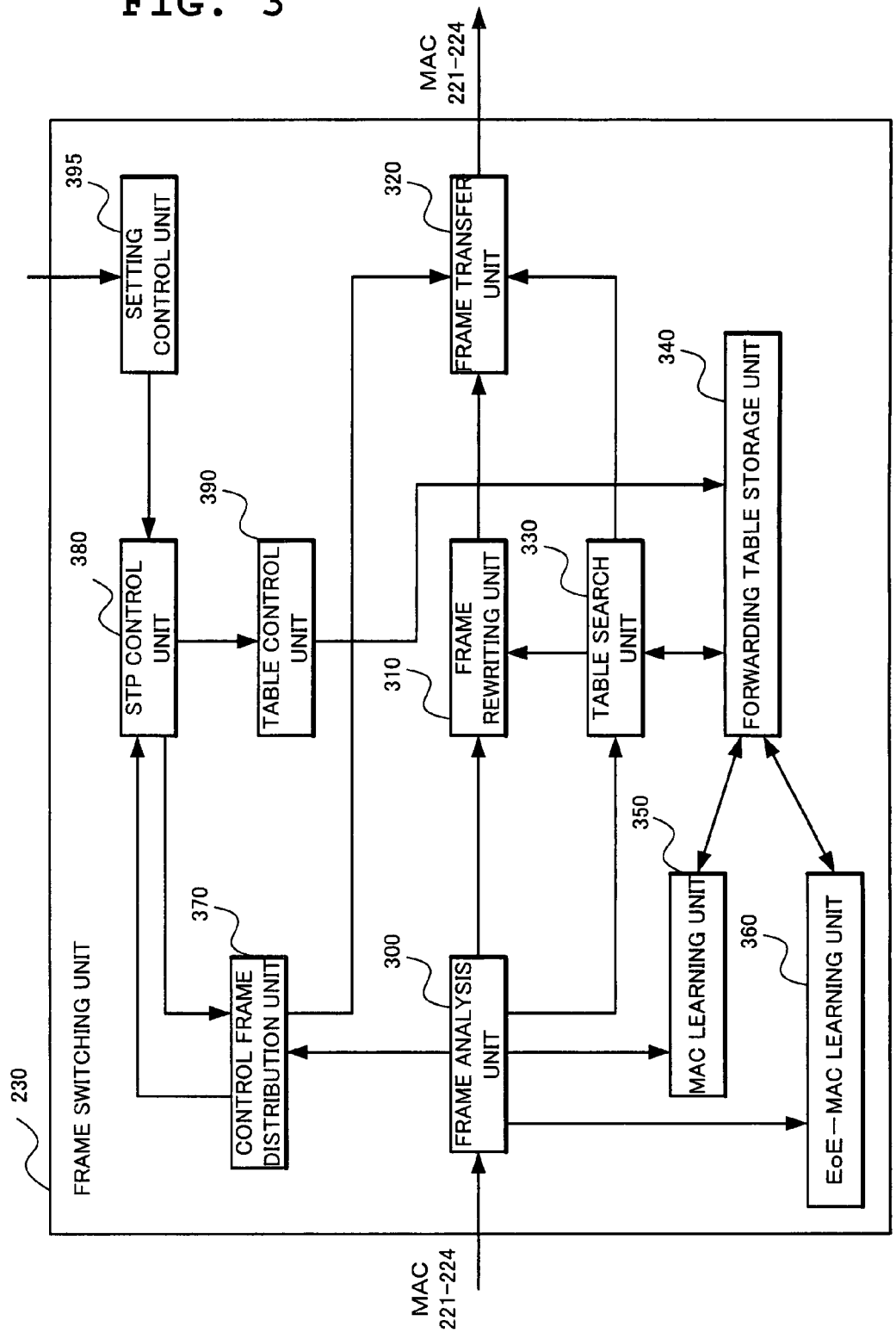
FIG. 3 is a block diagram of a frame switching unit according to a first exemplary embodiment of the present invention.

FIG. 3 shows a detailed structure of the frame switching unit 230.

The frame switching unit 230 comprises a frame analysis unit 300, a frame rewriting unit 310, a frame transfer unit 320, a table search unit 330, a forwarding table storage unit 340, a MAC learning unit 350, an EoE-MAC learning unit 360, a control frame distribution unit 370, an STP control unit 380, a table control unit 390 and a setting control unit 395.

The frame switching unit 230, as is described above, has a function of determining an output IF for an Ethernet (R) frame input from the MAC 221~224 and transferring the frame to the MAC 221~224 connected to a predetermined IF.

Figure 49:
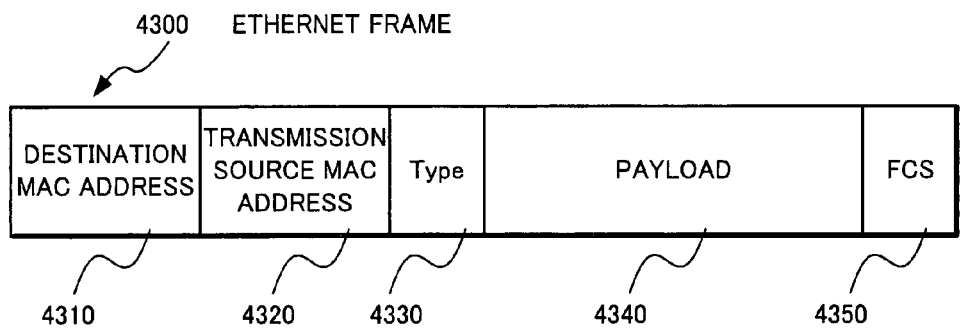
FIG. 49 shows a format of an Ethernet (R) frame.
Figure 50:
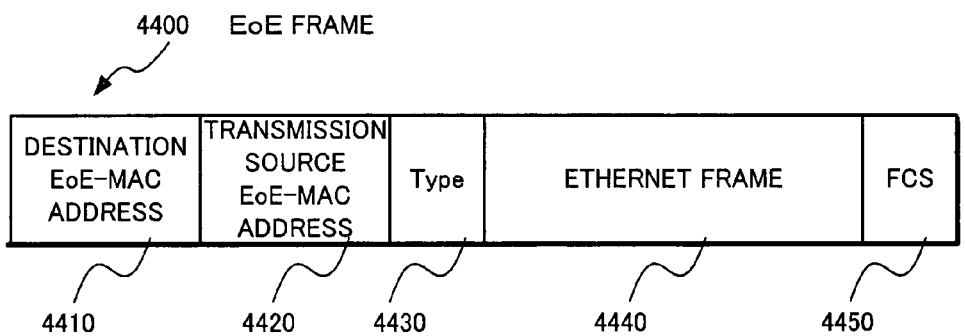
FIG. 50 shows a format of an EoE frame.
Figure 51:
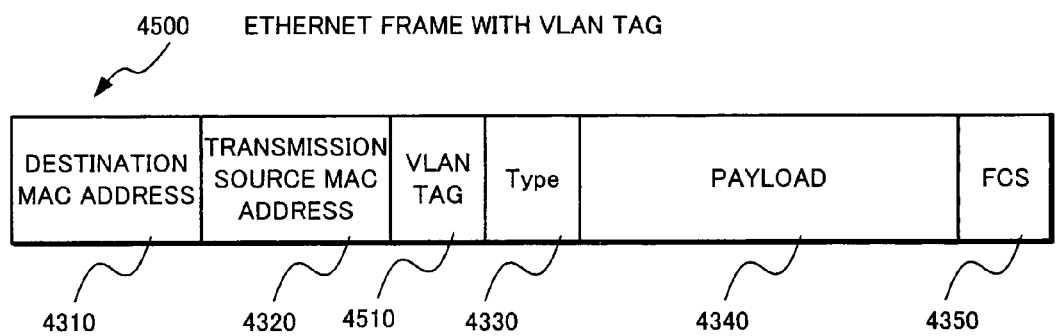
FIG. 51 shows a format of an Ethernet (R) frame with a VLAN tag.

When the switch 200 is the edge switch E1~E4, as a kind of input/output frame, the Ethernet (R) frame 4300 in FIG. 49 or the Ethernet (R) frame 4500 with a VLAN tag in FIG. 51 is input and the EoE frame 4400 in FIG. 50 or an EoE frame 4600 with a VLAN tag is output.

Alternatively, the EoE frame 4400 or the EoE frame 4600 with a VLAN tag is input and the Ethernet (R) frame 4300 or the Ethernet (R) frame 4500 with a VLAN tag is output. Alternatively, there is a case where both input and output frames are the EoE frame 4400 or the EoE-MAC frame 4600 with a VLAN tag.

On the other hand, when the switch 200 is the core switch C1 or C2, a kind of input/output frame will be the EoE frame 4400 or the EoE frame 4600 with a VLAN tag for both the input and output frames.

In the following, each component of the frame switching unit 230 will be described.

The frame analysis unit 300 analyzes a frame input from the MAC 221~224 and when the frame is a main signal data frame of the ordinary Ethernet (R) frame 4300, the Ethernet (R) frame 4500 with a VLAN tag, the EoE-MAC frame 4400 or the EoE-MAC frame 4600 with a VLAN tag, transfers header information, frame kind information and input port information to the table search unit 330 and the MAC learning unit 350.

Here, when the input frame is the EoE-MAC frame 4400 or the EoE-MAC frame 4600 with a VLAN tag, the unit transfers the above information also to the EoE-MAC learning unit 360. In addition, the unit transfers the entire frame or a payload part to the frame rewriting unit 310.

When the input frame is a control frame such as BPDU, the entire frame is transferred to the control frame distribution unit 370.

When an instruction is given by the table search unit 330 as to the main signal data frame received from the frame analysis unit 300, the frame rewriting unit 310 rewrites the frame. As frame rewriting, there is a case where the Ethernet (R) frame 4300 or the Ethernet (R) frame 4500 with a VLAN tag is encapsulated by an EoE-MAC header, while a VLAN tag which stores a VLANID instructed by the table search unit 330 is stacked to rewrite the frame into the EoE-MAC frame 4600 with a VLAN tag.

Encapsulation of the Ethernet (R) frame 4300 or the Ethernet (R) frame 4500 with a VLAN tag by the EoE-MAC header has another example.

There is a case where with respect to the input frame, with an EoE-MAC_DA (destination address) of the EoE-MAC header as a broadcast address or a multicast address and an EoE-MAC_SA (transmission source address) as an EoE-MAC address of its own node, an EoE-MAC header is formed to encapsulate the frame by the EoE-MAC header, while a VLAN tag which stores a VLANID instructed by the table search unit 330 is stacked, thereby rewriting the frame into the EoE-MAC frame 4600 with a VLAN tag.

Another case is where with respect to the EoE-MAC frame 4400 or the EoE-MAC frame 4600 with a VLAN tag, the EoE-MAC header is decapsulated to delete the VLAN tag, thereby rewriting the frame into the Ethernet (R) frame 4300 or the Ethernet (R) frame 4500 with a VLAN tag.

After any of the foregoing rewritings is executed or when rewriting is unnecessary, after the reception of a frame from the frame analysis unit 300, the frame is transferred to the frame transfer unit 320.

As to a main signal data frame, the frame transfer unit 320 transfers a main signal data frame received from the frame rewriting unit 310 to the MAC 221~224 corresponding to an output port received from the table search unit 330.

As to a control frame, the frame transfer unit 320 transfers the frame to the MAC 221~224 corresponding to output ports which simultaneously receive a control frame from the control frame distribution unit 370.

The table search unit 330 refers to the forwarding table storage unit 340 based on the header information, the frame kind information and the input port information received from the frame analysis unit 300 to obtain output port information and frame rewriting information.

In the following, description will be made of processing of the table search unit 330 according to frame identification information.

(1) In a case where frame kind information is the Ethernet (R) frame 4300 or the Ethernet (R) frame 4500 with a VLAN tag and an input port is a user terminal side port, refer to a MAC/EoE-MAC table 342 (FIG. 4, which will be described later) of the forwarding table storage unit 340 to obtain an EoE-MAC address for the MAC_DA and a VLANID to be stored in a VLAN tag to be added.

(1-1) When there exists a target entry in the MAC/EoE-MAC table 342, notify the frame rewriting unit 310 of the obtained EoE-MAC address and VLANID stored in the VLAN tag to instruct the same to encapsulate the EoE-MAC header and stack the VLAN tag. Also refer to the MAC table 300 of the forwarding table storage unit 340 to obtain output port information corresponding to the obtained EoE-MAC address and VLAN. When there exists a target entry here, notify the frame transfer unit 320 of the output port information.

(1-2) When there exists no target entry in the MAC/EoE-MAC table 342, instruct the frame rewriting unit 310 to encapsulate the EoE-MAC header with EoE-MAC_DA as broadcast or multicast and EoE-MAC_SA as its own node EoE-MAC. Also refer to the broadcast table 343 of the forwarding table storage unit 340 to obtain broadcast transfer port information and notify the frame transfer unit 320 of port information with an input port excluded.

(2) When frame kind information is the EoE-MAC frame 4400 or the EoE-MAC frame 4600 with a VLAN tag and an input port is a port on the network side, operation varies with a case where a destination MAC address (EoE-MAC_DA address) is its own node address and a case where the same is other node address.

(2-1) In a case of other node address, refer to a MAC table 341 of the forwarding table storage unit 340 to obtain an output port corresponding to the destination MAC address (EoE-MAC_DA address) and the VLAN.

(2-1-1) When there exists a target entry here, notify the frame transfer unit 320 of the output port information, as well as notifying the frame rewriting unit 310 of no frame rewriting.

(2-1-2) On the other hand, when there exists no target entry, refer to a broadcast table 343 to obtain broadcast transfer port information and notify the frame transfer unit 320 of port information with an input port excluded, as well as notifying the frame rewriting unit 310 of no frame rewriting.

(2-2) In a case where the destination MAC address (EoE-MAC_DA address) is its own node address, refer to the MAC table 341 of the forwarding table storage unit 340 to obtain an output port for the MAC_DA and the VLAN.

(2-2-1) When there exists a target entry here, notify the frame transfer unit 320 of the output port information, as well as instructing the frame rewriting unit 310 to delete the EoE-MAC header.

(2-2-2) On the other hand, when there exists no target entry, refer to the broadcast table 343 to obtain broadcast transfer port information and notify the frame transfer unit 320 of port information with an input port excluded, as well as instructing the frame rewriting unit 310 to delete the EoE-MAC header.

The forwarding table storage unit 340 has various kinds of tables in which information for transferring a frame is stored. The tables include the MAC table 341 for solving an output port from a MAC address and a VLANID, the MAC/EoE-MAC table 342 for solving an EoE-MAC address and a VLANID to be stored in a VLAN tag to be added from a MAC address, and the broadcast table 343 for solving a broadcast output port from a VLANID.

Figure 4:
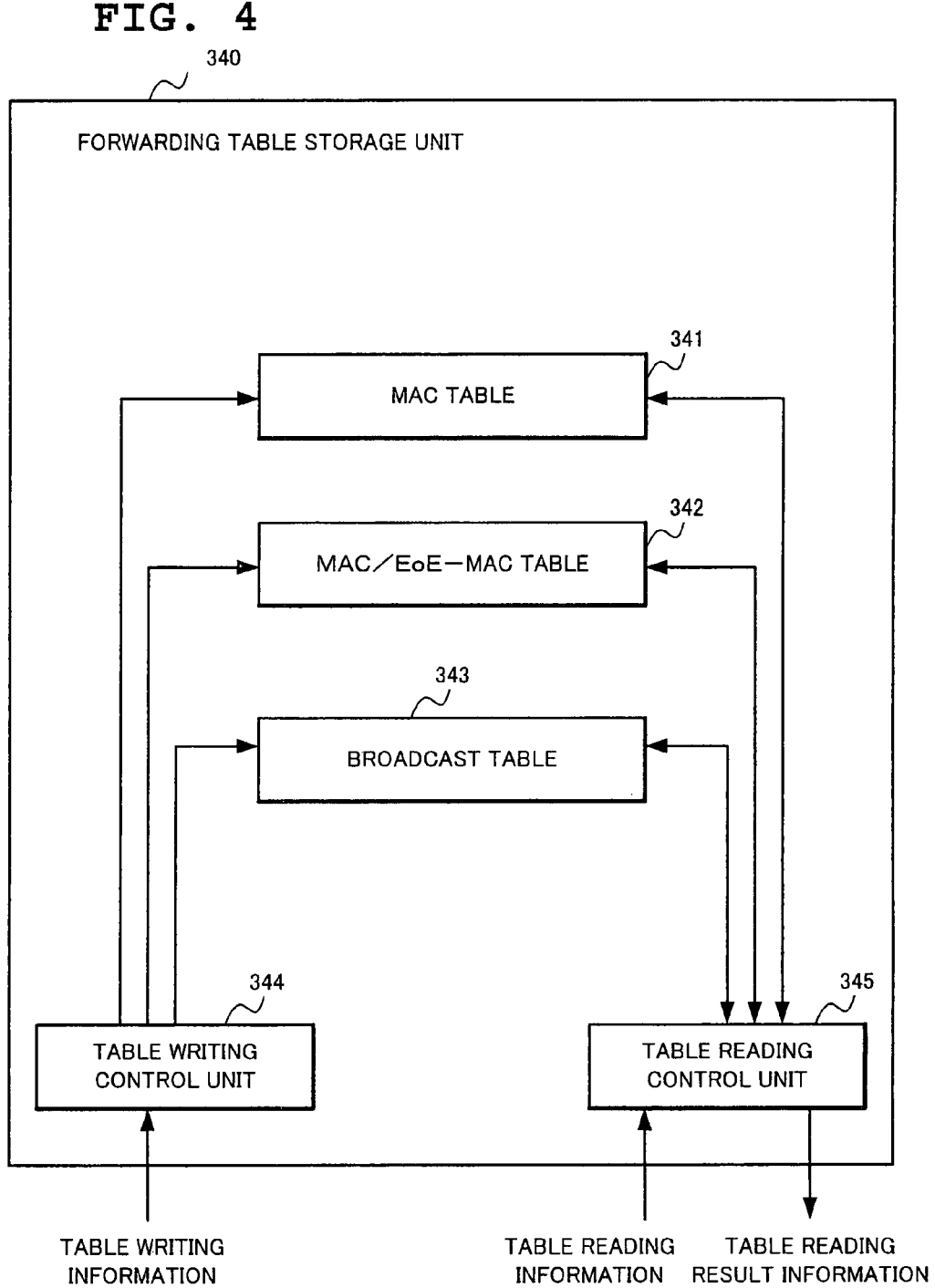
FIG. 4 is a block diagram showing a forwarding table storage unit of the present invention.

FIG. 4 is an example of a structure of the forwarding table storage unit 340.

The forwarding table storage unit 340 comprises the MAC table 341, the MAC/EoE-MAC table 342, the broadcast table 343, a table writing control unit 344 and a table reading control unit 345. New data write to each table is executed through the table writing control unit 344 and data read from each table is executed through the table reading control unit 345.

Structures of the MAC table 341, the MAC/EoE-MAC table 342 and the broadcast table 343 are as shown in FIG. 5, FIG. 6 and FIG. 7.

In addition, the MAC/EoE-MAC table 342 may be structured to separately include the MAC/EoE-MAC table 342 with a VLAN field deleted and an EoE-MAC/VLAN management table 1000 for solving, from an EoE-MAC address, its corresponding VLAN as shown in FIG. 10.

In the following, description will be made of the one-body MAC/EoE-MAC table 342 shown in FIG. 6.

Upon receiving header information from the frame analysis unit 300, the MAC learning unit 350 refers to the MAC table 341 of the forwarding table storage unit 340 to search an output port for MAC_SA and VLAN of the received header information and when there exists no entry, stores the MAC_SA in the MAC address field, the VLAN in the VLAN field and the reception port in the output port field. Here, when the reception port is a port on the network side, the above learning function may be stopped by setting.

Upon receiving header information from the frame analysis unit 300, the EoE-MAC learning unit 360 refers to the MAC/EoE-MAC table 342 to search EoE-MAC for MAC_SA of the received header information and when there exists no entry, stores the MAC_SA in the MAC address field and EoE-MAC_SA in the EoE-MAC address field.

The control frame distribution unit 370 transfers a control frame received from the frame analysis unit 300 to a predetermined processing unit, as well as transferring a control frame and output port information received from the processing unit to the frame transfer unit 320. In the present structure, since the processing unit is only the STP control unit 380, transfer the control frame (hereinafter referred to as BPDU (Bridge Protocol Data Unit)) to the STP control unit 380, as well as transferring the BPDU and output port information received from the STP control unit 380 to the frame transfer unit 320.

The STP control unit 380 executes processing of updating port information of STP/RSTP and the like based on a BPDU received from the control frame distribution unit 370 to regenerate a BPDU and transfers the BPDU and the output port information to the control frame distribution unit 370 for the transfer to an adjacent switch.

Since the present invention is premised on MSTP which activates an RSTP tree for each VLANID, port information of an RSTP-based spanning tree is managed for each VLANID. As a table for managing the present information, an STP port information management table 800 shown in FIG. 8 is provided.

In the STP port information management table 800, managed for each VLANID is information of an STP tree related to a port of its switch. Managed as port information of an STP tree are a function of a port and a state of a port.

Functions of a port are a Root port (denoted as R in FIG. 8), a Designated port (assigned port; denoted as D in FIG. 8) and an Alternate port (port yet to be assigned; denoted as A in FIG. 8) and states of a port are a Forwarding state (denoted as f in FIG. 8), a Learning state (denoted as l in FIG. 8) and a Discarding (stopped) state (denoted as d in FIG. 8), which are denoted in the table as a set of a port function/a port state.

From the STP port state management table 800, the STP control unit 380 extracts, for each VLAN (e.i. for each STP/RSTP tree), a port whose port function is the Root port and whose port state is the Forwarding state (denoted as R/f in FIG. 8) or a port whose port function is the Designated port and whose port state is the Forwarding state or the Learning state (denoted as D/f or D/l in FIG. 8) to notify the table control unit 390 of the VLAN number and its port information.

When the structure of the RSTP tree has a change and a port state has a change, the unit updates the contents of the STP port state management table 800, as well as notifying the table control unit 390 of new information when changed is a port whose port function is the Root port and whose port state is the Forwarding state or a port whose port function is the Designated port and whose port state is the Forwarding state or the Learning state.

The table control unit 390 has a function of setting an output port corresponding to an EoE-MAC address based on port information of an STP tree notified from the STP control unit 380 (updating the MAC table 341 in the forwarding table storage unit 340).

For realizing the processing, the table control unit 390 has a VLAN/EoE-MAC management table 900 shown in FIG. 9.

The VLAN/EoE-MAC management table 900 manages a VLANID for identifying an STP tree activated for each VLAN at the STP control unit 380 and an EoE-MAC address of an edge switch as a route node of the STP tree so as to be correlated with each other. The contents of the VLAN/EoE-MAC management table 900 are set by the setting control unit 395.

Upon receiving a VLAN number and its corresponding port information (a kind of port (A) or (B) and its port number: (A) a port whose port function is the Root port and the port state is the Forwarding state or (B) a port whose port function is the Designated port and the port state is the Forwarding state or the Learning state) from the STP control unit 380, the table control unit 390 executes the following two kinds of rewriting processing with respect to the forwarding table storage unit 340.

First rewriting processing is to refer to the VLAN/EoE-MAC management table 900 to obtain an EoE-MAC address corresponding to a received VLAN and rewrite an output port for the obtained EoE-MAC address and VLAN in the MAC table 341 of the forwarding table storage unit 340. An output port number to be rewritten is a port number of (A) received from the STP control unit 380.

Also in the broadcast table 343, an output port corresponding to the obtained VLAN is rewritten. An output port number to be rewritten is a port number of (B) received from the STP control unit 380.

Second rewriting processing is to rewrite a VLANID for the obtained EoE-MAC address in the MAC/EoE-MAC table 342 of the forwarding table storage unit 340. VLANID to be rewritten is a VLANID notified by the STP control unit 380.

The setting control unit 395 receives, through the CPU 250, setting information input through the console I/O 260 in FIG. 2 to execute setting processing with respect to an appropriate processing unit. More specifically, the unit sets an STP parameter and the like for the STP control unit 380. The unit also sets each value of the VLAN/EoE-MAC management table 900 of the table control unit 390.

Description will be made of shortest path transfer of the present invention with respect to frame transfer from the terminal T3 to the terminal T1 in the network of FIG. 1 formed of the edge switches E1~E4 and the core switches C1 and C2 which has the foregoing described structure as an example.

In FIG. 1, since the terminal T1 is a destination terminal, an RSTP tree with the edge switch E1 to which the terminal T1 is connected as a route node will be a path of frame transfer. STPID as an identifier of the tree is g1, which tree is identified as VLANID=g1.

In FIG. 1, an active link in the tree has a heavy line. The STP port state management table 800 at each switch in this case has the contents shown in FIG. 11 (shown here is only the RSTP tree with the edge switch E1 as a route node. In practice, the contents also include information related to a tree with other node as a route node).

With reference to FIG. 1, a frame from the terminal T3 to the terminal T1 is transferred through the edge switch E3, the core switch C1 and the edge switch E1. Table contents and a table setting procedure at each switch for executing the transfer will be described.

Figure 11:
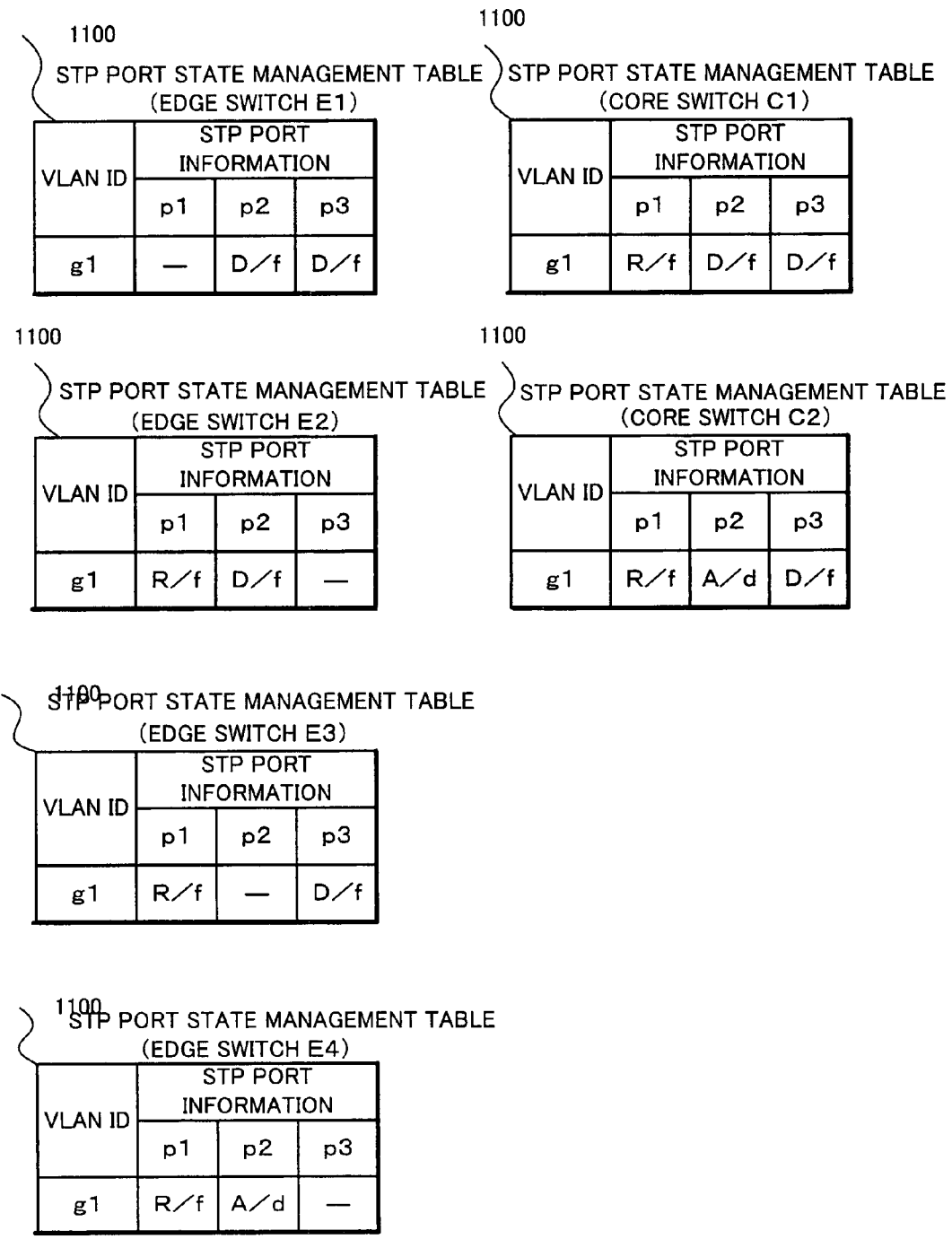
FIG. 11 is an STP port state management table of each switch of the present invention.
Figure 12:
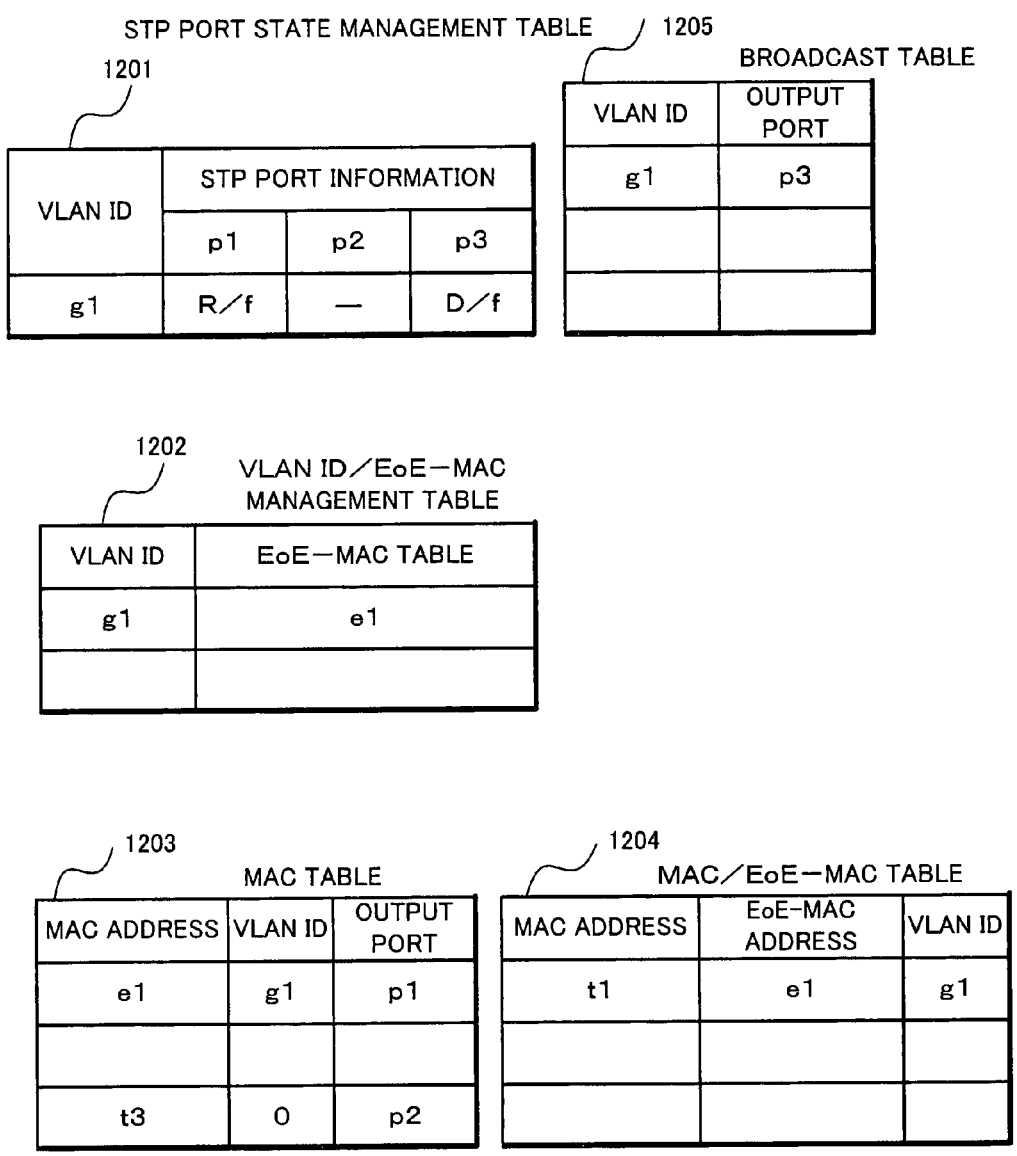
FIG. 12 is a forwarding table of the edge switch E5 in the first exemplary embodiment of the present invention.

Contents of each table of the edge switch E3 are shown in the lump in FIG. 12. At the edge switch E3, the STP control unit 380 has an STP port state management table 1201 (which is the above-described table of the edge switch E3 of the STP port state management table 800 in FIG. 11). The table control unit 390 has a VLAN/EoE-MAC management table 1202.

In FIG. 1, since the RSTP tree with the edge switch E1 at which an EoE-MAC address e1 is set as a route node is set to have an STPID=g1, the EoE-MAC address for the VLANID=g1 is set to be e1 in the VLAN/EoE-MAC management table 1202 through the setting control unit 395.

When a port state of the STP tree becomes stable, the STP control unit 380 refers to the STP port state management table 1201 to notify the table control unit 390 of VLANID=g1 and the port=p1 as a port whose port function is the Root port and whose port state is the Forwarding state. The unit also notifies the table control unit 390 of VLANID=g1 and the port=p3 as a port whose port function is the Designated port and whose port state is the Forwarding state or the Learning state.

The table control unit 390 refers to the VLAN/EoE-MAC management table 1202 to obtain the EoE-MAC address=e1 for the notified VLANID=g1.

Based on the information, the table control unit 390 sets an output port for the MAC address=e1 and the VLANID=g1 to be the port p1 notified from the STP control unit 380 in the MAC table 341 of the forwarding table storage unit 340. Also in the broadcast table 343, an output port for the VLANID=g1 is set to be the port p3 notified from the STP control unit 380.

The resultant MAC table 341 has the contents shown in a MAC table 1203 (here, an output port for a MAC address t3 is set by ordinary MAC address processing by the MAC learning unit 350 at frame reception from the user terminal T3). The broadcast table 343 has the contents shown in a broadcast table 1205 in FIG. 12.

In addition, as to an entry whose EoE-MAC address is e1 in the MAC/EoE-MAC table 342 of the forwarding table storage unit 340, the table control unit 390 sets its VLAN to be VLANID=g1 notified from the STP control unit 380. The resultant MAC/EoE-MAC table 342 has the contents shown in a MAC/EoE-MAC table 1204 in FIG. 12.

Figure 13:
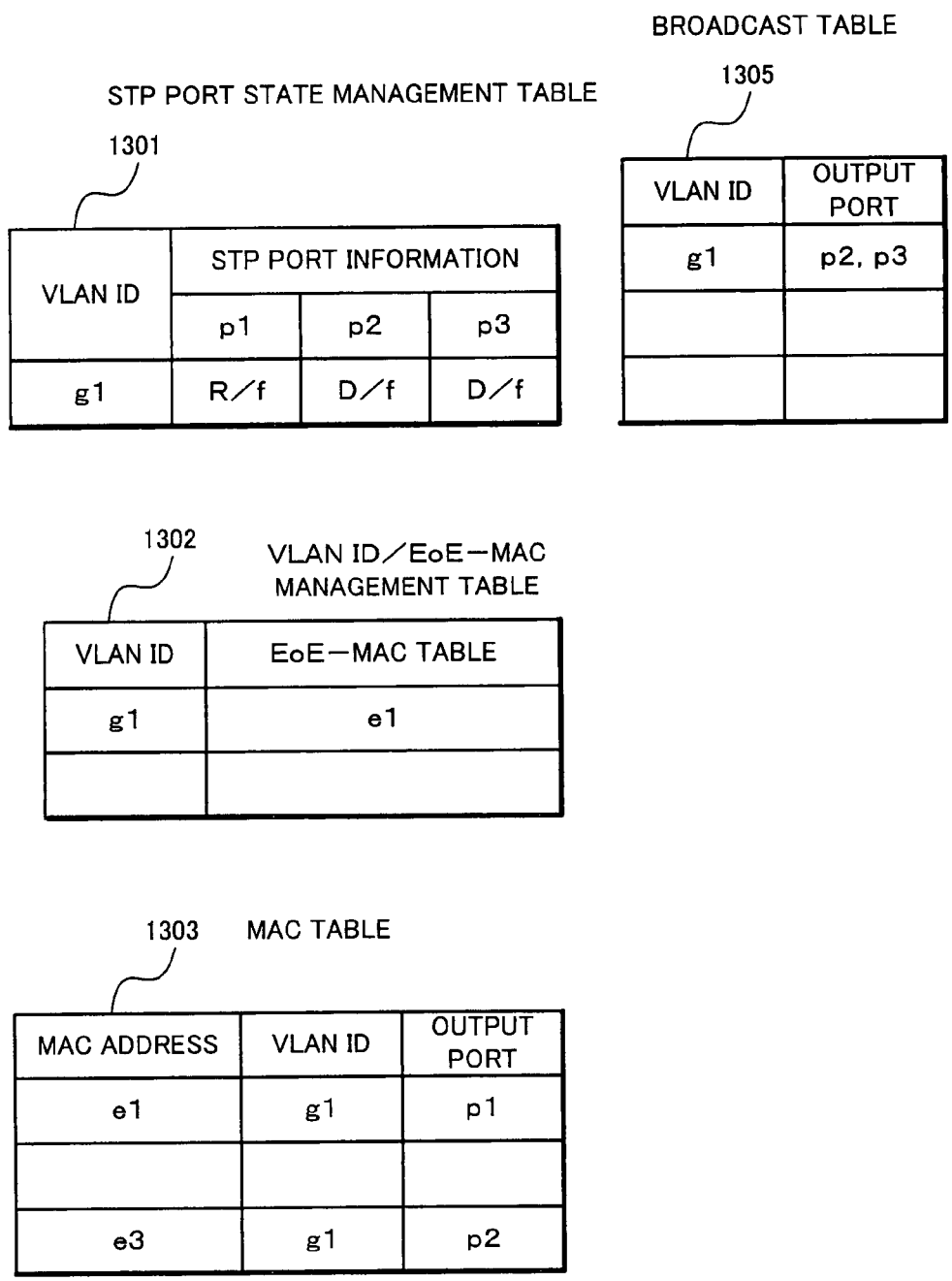
FIG. 13 is a forwarding table of the core switch C5 in the first exemplary embodiment of the present invention.

Subsequently, description will be made of a table of the core switch C1 which is a node at a hop subsequent to the edge switch E3 on the transfer path. Contents of each table are shown in FIG. 13.

At the core switch C1, the STP control unit 380 has an STP port state management table 1301 (which is an excerpt from FIG. 11). The table control unit 390 has a VLAN/EoE-MAC management table 1302.

Similarly to the edge switch E3, set in the VLAN/EoE-MAC management table 1302 through the setting control unit 395 is the EoE-MAC address as e1 for the VLANID=g1.

When a port state of the STP tree becomes stable, the STP control unit 380 refers to the STP port state management table 1301 to notify the table control unit 390 of VLANID=g1 and the port=p1 as a port whose port function is the Root port and whose port state is the Forwarding state. The unit also notifies the table control unit 390 of VLANID=g1 and the ports=p2 and p3 as ports whose port functions are the Designated port and whose port states are the Forwarding state or the Learning state.

The table control unit 390 refers to the VLAN/EoE-MAC management table 1302 to obtain the EoE-MAC address=e1 for the notified VLANID=g1.

Based on the information, the table control unit 390 sets, in the MAC table 341 of the forwarding table storage unit 340, an output port for the MAC address=e1 and the VLANID=g1 to be the port p1 notified from the STP control unit 380. Also in the broadcast table 343, the output port for the VLANID=g1 is set to be the port p2 and the port p3 notified from the STP control unit 380.

The resultant MAC table 341 has the contents shown in a MAC table 1303 and the resultant broadcast table 343 has the contents shown in a broadcast table 1305 in FIG. 13.

Since the core switch C1 fails to have the MAC/EoE-MAC table 342, these are all the tables of the core switch C1.

Figure 14:
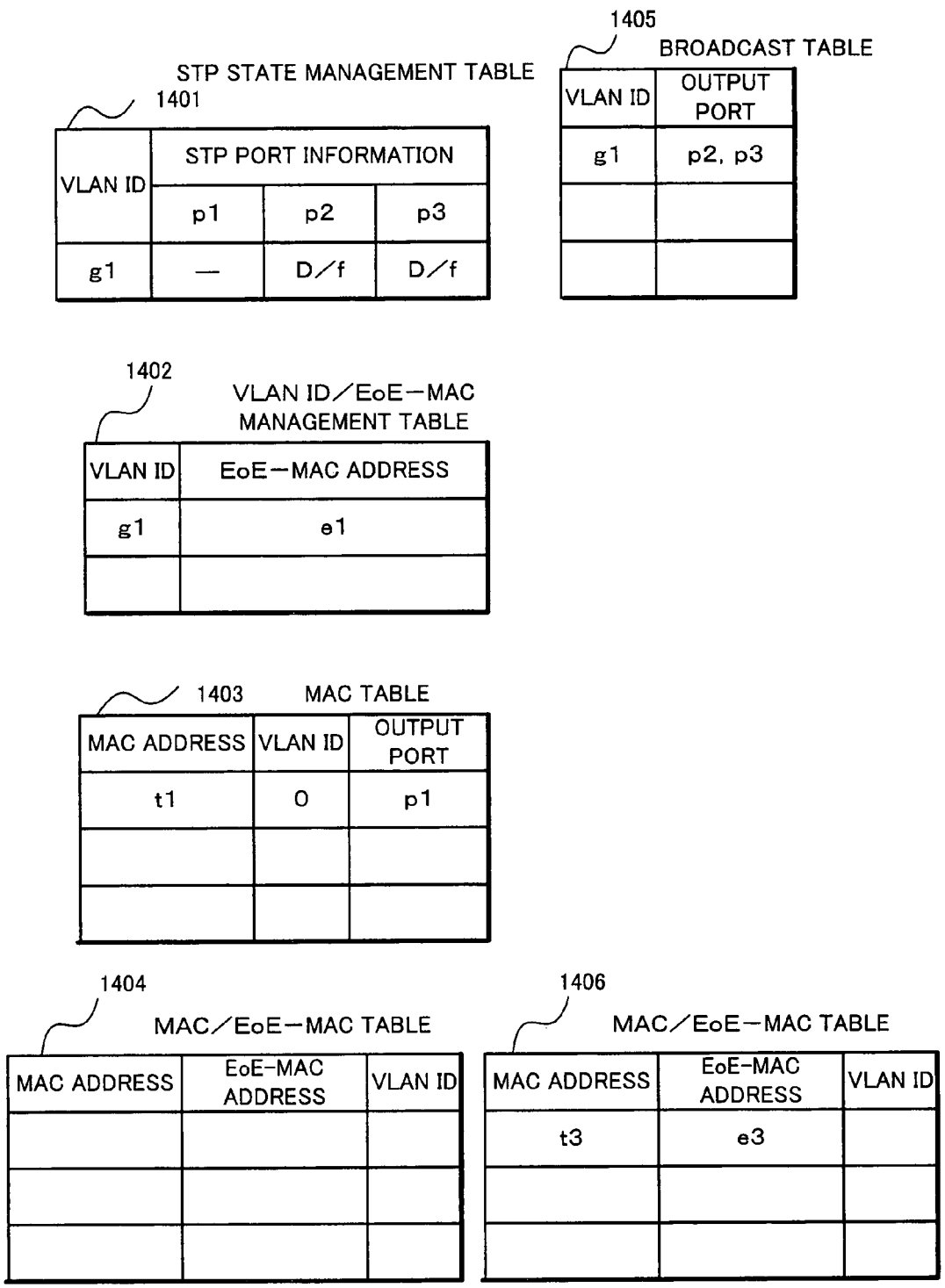
FIG. 14 is a forwarding table of the edge switch E7 in the first exemplary embodiment of the present invention.

Subsequently, description will be made of a table of the edge switch E1 which is a node at a hop subsequent to the core switch C1 on the transfer path. Contents of each table are shown in FIG. 14.

At the edge switch E1, the STP control unit 380 has an STP port state management table 1401 (see FIG. 11). The table control unit 390 has a VLAN/EoE-MAC management table 1402. Similarly to the edge switch E3, set in a VLAN/EoE-MAC management table 1402 through the setting control unit 395 is e1 as the EoE-MAC address for the VLANID=g1.

When a port state of the STP tree becomes stable, the STP control unit 380 refers to the STP port state management table 1401 to notify a port whose port function is the Root port and whose port state is the Forwarding state. Since at the current state, no relevant port exists, nothing is notified.

More specifically, since the edge switch E1 is an Egress edge switch in the present transfer, an output port of a subsequent hop needs not to be set. Also as a port whose port function is the Designated port and whose port state is the Forwarding state or the Learning state, VLANID=g1 and the ports p2 and p3 are notified to the table control unit 390.

At the edge switch E1, as to a frame directed to the terminal T1, EoE-MAC header deletion processing is selected by the table search unit 330 as has been described in FIG. 3 and then a MAC table 1403 in FIG. 14 is referred to.

At the MAC table 1403, an output port for a MAC address t1 is set by ordinary MAC address processing by the MAC learning unit 350 at frame reception from the user terminal T1.

Also at the broadcast table 343, an output port for the VLANID=g1 is set to be the ports p2 and p3 notified from the STP control unit 380.

The resultant broadcast table 343 will be a broadcast table 1405. As to a MAC/EoE-MAC table 1404, the edge switch E1 fails to have an entry related to transfer from the user terminal T3 to the user terminal T1 (although the switch has an entry related to other transfer, it is omitted from FIG. 14).

Frame transfer processing at each switch at a state where the foregoing described table setting is made will be described in the following with reference to the block diagram of the node in FIG. 3 and the tables shown in FIG. 12 through FIG. 14.

Figure 15:
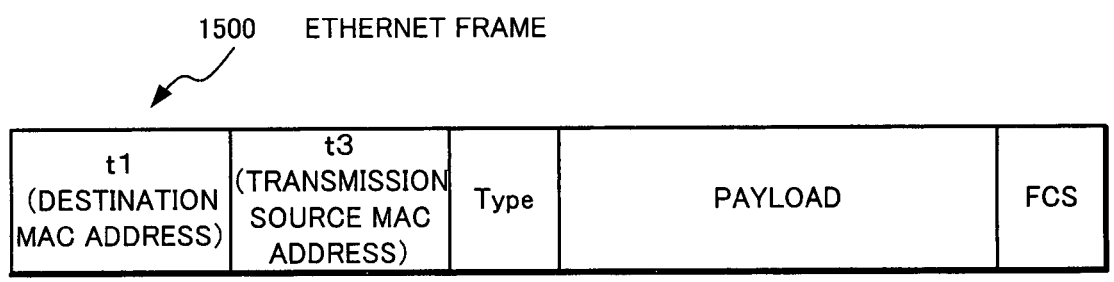
FIG. 15 shows one example of an Ethernet (R) frame.

The edge switch E3 having received an Ethernet (R) frame 1500 directed to the user terminal T1 from the user terminal T3 (see FIG. 1) analyzes the input frame as being the ordinary Ethernet (R) frame 4300 at the frame analysis unit 300 as shown in FIG. 15 to notify the table search unit 330 of header information, frame kind information and input port information and notify the frame rewriting unit 310 of the entire frame or a payload part.

The table search unit 330 refers to the MAC/EoE-MAC table 1204 (see FIG. 12) to obtain the EoE-MAC address=e1 for the destination MAC address t1 and VLANID=g1 to be stored in a VLAN tag to be stacked and instructs the frame rewiring unit 310 to execute EoE-MAC encapsulation processing and VLAN tag stacking processing.

The unit also refers to the MAC table 1203 (see FIG. 12) to obtain an output port=the port p1 for the EoE-MAC address e1 and the VLANID=g1 and notify the frame transfer unit 320 of the port.

Figure 16:
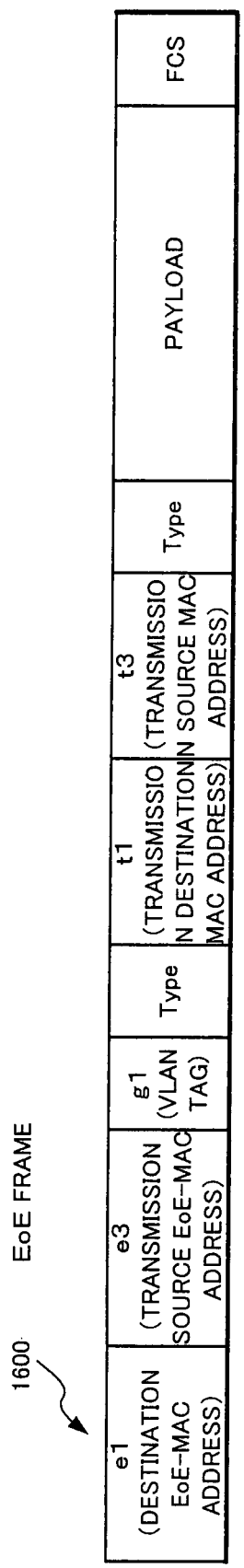
FIG. 16 shows one example of an EoE frame.

With respect to a frame or a payload received from the frame analysis unit 300, the frame rewriting unit 310 executes encapsulation processing of the EoE-MAC address=e1 and stacking processing of the VLAN tag in which the VLANID=g1 is stored which processing is both instructed by the table search unit 330. As a result, a frame to be output will be an EoE frame 1600 shown in FIG. 16.

When the frame rewriting unit 310 transfers the EoE frame 1600 to the frame transfer unit 320, the frame transfer unit 320 outputs the EoE frame 1600 to the output port=the port p1 received from the table search unit 330.

In line with the frame transfer processing described here, learning processing is also executed.

The frame analysis unit 300 notifies the frame rewriting unit 310 and the table search unit 330 of information, as well as notifying the MAC learning unit 350 of header information, frame kind information and input port information.

The MAC learning unit 350 having received the information refers to the MAC table 1203 to search a reception port for the MAC_SA=t3 and VLANID=0 of the received header information and when there exists no entry, stores MAC_SA=t3 in the MAC address field, VLANID=0 in the VLAN field and the reception port p2 in the output port field.

Subsequently, the core switch C1 at a subsequent hop to the edge switch E3 will be described.

The core switch C1 having received the EoE frame 1600 from the edge switch E3 analyzes the input frame as being the EoE-MAC frame 4600 with a VLAN tag at the frame analysis unit 300 to notify the table search unit 330 of header information, frame kind information and input port information and notify the frame rewriting unit 310 of the entire frame or a payload part.

The table search unit 330 refers to the MAC table 1303 to obtain the output port=the port p1 for the destination MAC address e1 and the VLANID=g1 and notifies the frame rewriting unit 310 of no frame rewriting and notify the frame transfer unit 320 of the output port p1.

The frame rewriting unit 310 transfers the EoE frame 1600 received from the frame analysis unit 300 to the frame transfer unit 320 without executing rewriting processing.

The frame transfer unit 320 outputs the EoE frame 1600 to the output port=port p1 received from the table search unit 330.

In the learning processing, the frame analysis unit 300 notifies the MAC learning unit 350 of header information, frame kind information and input port information, and the MAC learning unit 350 having received the information refers to the MAC table 1303 to search an output port for the MAC_SA=e3 and VLANID=g1 of the received header information and when there exists no entry, stores a MAC_SA=e3 in the MAC address field, g1 in the VLAN field and the reception port p2 in the output port field.

This processing is not executed when the learning function in a case where an input port is a network side port is set to be off.

Subsequently, the edge switch E1 at a hop subsequent to the core switch C1 will be described.

The edge switch E1 having received the EoE frame 1600 from the core switch C1 analyzes the input frame as being the EoE-MAC frame 4600 with a VLAN tag at the frame analysis unit 300 to notify the table search unit 330 of header information, frame kind information and input port information and notify the frame rewriting unit 310 of the entire frame or a payload part.

Since the destination MAC address (EoE-MAC_DA) is its own node, the table search unit 330 instructs the frame rewriting unit 320 to execute EoE-MAC decapsulation processing (deletion processing) and VLAN tag deletion processing, as well as referring to the MAC table 1403 to obtain the output port=the port p1 for the MAC_DA=t1 and VLANID=0 and notify the frame transfer unit 320 of the port.

With respect to the frame or the payload received from the frame analysis unit 300, the frame rewiring unit 310 executes the processing of deleting the EoE-MAC address and the VLAN tag instructed by the table search unit 330.

As a result, a frame to be output will be the Ethernet (R) frame 1500 of FIG. 15.

When the frame rewriting unit 310 transfers the Ethernet (R) frame 1500 to the frame transfer unit 320, the frame transfer unit 320 outputs the Ethernet (R) frame 1500 to the output port=the port p1 received from the table search unit 330. In line with the frame transfer processing described here, learning processing is also executed.

The frame analysis unit 300 notifies the MAC learning unit 350 and the EoE-MAC learning unit 360 of header information, frame kind information and input port information. The MAC learning unit 350 having received the information refers to the MAC table 1403 to search an output port for the MAC_SA=e3 and VLANID=g1 of the received header information and when there exists no entry, stores MAC_SA=e3 in the MAC address field, VLANID=g1 in the VLAN field and the reception port p2 in the output port field.

This processing is not executed when the learning function in a case where an input port is a network side port is set to be off.

On the other hand, the EoE-MAC learning unit 360 having received the information refers to the MAC/EoE-MAC table 1404 to search an EoE-MAC for the MAC_SA=t3 of the received header information and when there exists no entry, stores MAC_SA=t3 in the MAC address field and EoE-MAC_SA=e3 in the EoE-MAC address field. As a result, the MAC/EoE-MAC table 1404 is turned into a MAC/EoE-MAC table 1406.

Output of the Ethernet (R) frame 1500 to the port p1 by the edge switch E1 causes the Ethernet (R) frame 1500 to arrive at the user terminal T1.

As described in the foregoing, the Ethernet (R) frame 1500 sent from the user terminal T3 to the user terminal T1 are allowed to reach the user terminal T1 as a destination by the shortest path through the edge switch E3, the core switch C1 and the edge switch E1.

According to the foregoing described node structure, table generation method and data transfer method, as to transfer from the terminal T3 to the terminal T1, set in the edge switch E3 and the core switch C1 is an output port for the EoE-MAC address e1 on the side of a route port of a tree with the edge switch E1 as a route node as shown in the MAC table 1203 in FIG. 12 and the MAC table 1303 in FIG. 13 to enable transfer to the Egress edge switch E1 to which the terminal T1 is connected by the shortest path.

(Effects of First Exemplary Embodiment)

Generating a tree with all the edge switches as a route node similarly to the tree with the edge switch E1 as a route node as described in the present exemplary embodiment to execute the processing described in the present exemplary embodiment by each node results in forming a shortest path between all the edge switches to enable transfer of the Ethernet (R) frame 1500 between all the user terminals by the shortest path.

(Second Exemplary Embodiment)

In the first exemplary embodiment of the present invention, for executing optimum path transfer in the EoE technique, each node is designed to hold correspondence between a VLANID for identifying each RSTP tree and the edge switches E1~E4 as a route node of the RSTP tree. Also in the first exemplary embodiment, it is assumed that the correspondence is set through an external IF by a manager or a server.

On the other hand, in the second exemplary embodiment, each node automatically obtains the above correspondence relationship.

Figure 44:
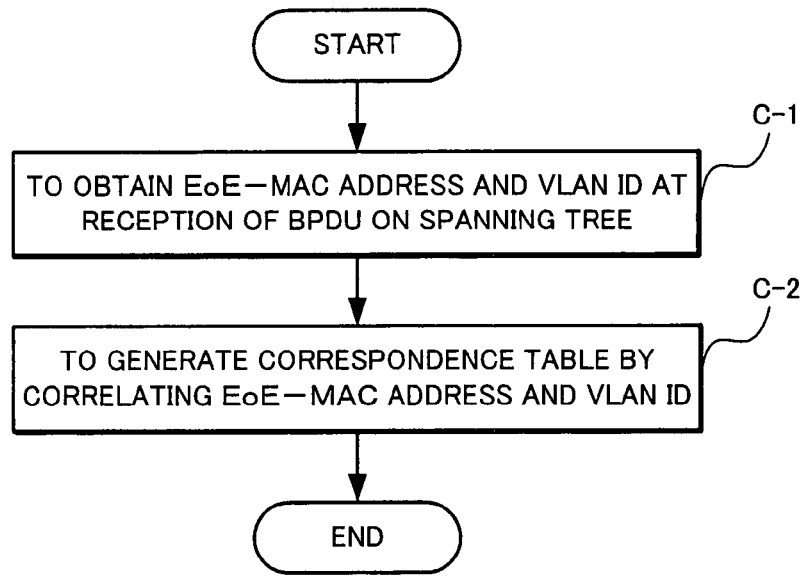
FIG. 44 is a flow chart showing an outline of a procedure of processing of correlating an EoE-MAC address and VLANID in the second exemplary embodiment of the present invention.

Outlines of a procedure of processing of correlating an EoE-MAC address and a VLANID for automatically obtaining the above-described correspondence relationship in the present exemplary embodiment are as shown in the flow chart of FIG. 44.

Obtain an EoE-MAC address and a VLAN ID by receiving a BPDU on a spanning tree with an edge node as a route node (Step C-1).

Generate a correspondence table by correlating the EoE-MAC address and the VLAN ID obtained at Step C1 (Step C-2).

Since outlines of a frame transfer procedure and a forwarding table updating procedure in the present exemplary embodiment are the same as the frame transfer procedure and the forwarding table updating procedure in the first exemplary embodiment, no description will be made thereof.

Detailed contents of the above correlation processing procedure will be clarified by the following description of the respective components and their operation.

Figure 17:
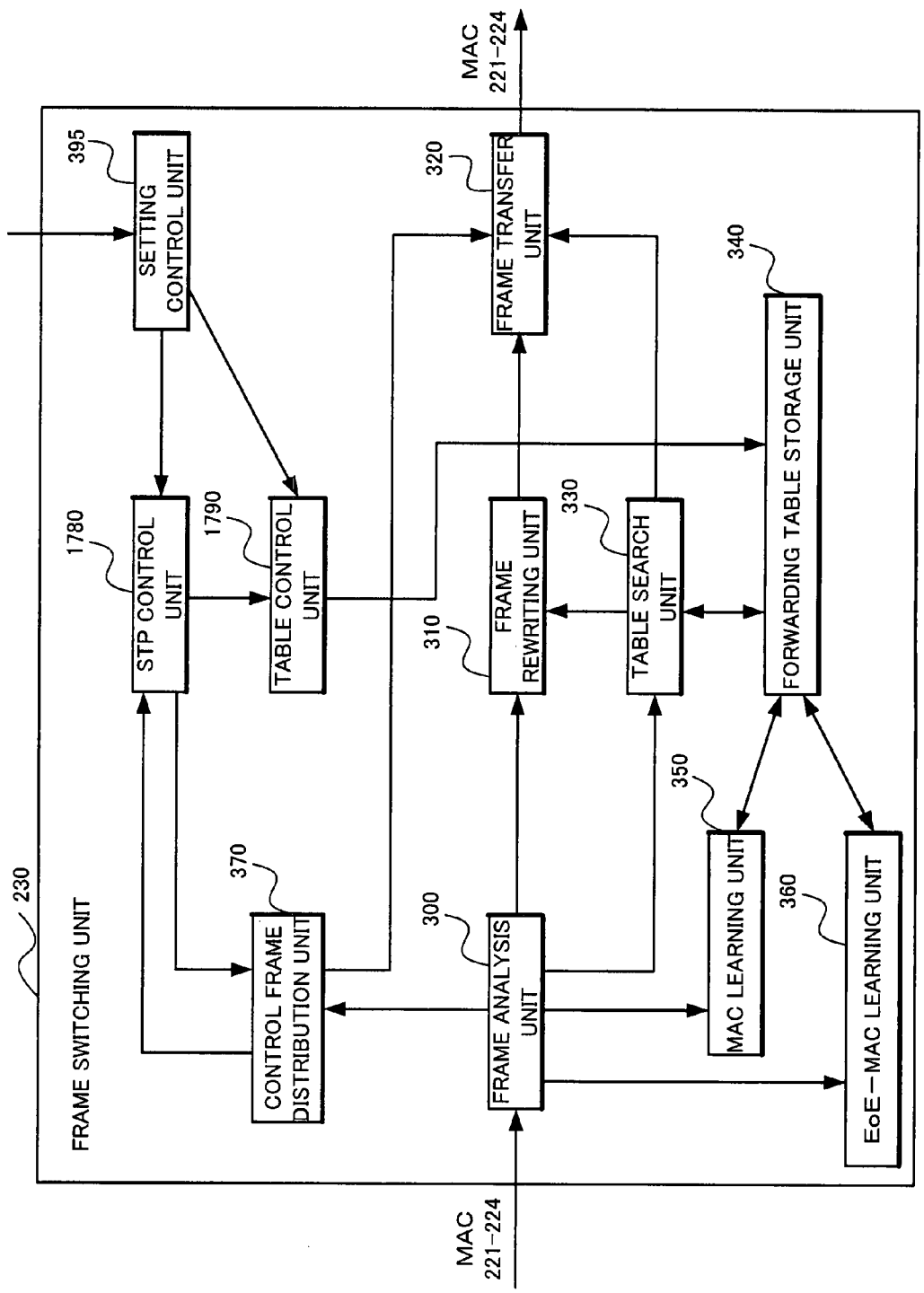
FIG. 17 is a block diagram of a frame switching unit according to a second exemplary embodiment of the present invention.

Structure of a node for automatically obtaining a correspondence relationship by the above-described correlation processing is shown in FIG. 17.

In FIG. 17, the STP control unit 380 and the table control unit 390 in the node structure according to the first exemplary embodiment shown in FIG. 3 are replaced by an STP control unit 1780 and a table control unit 1790, respectively, and the remaining units are the same as those in FIG. 3 (like unit is denoted by the same name and reference numeral).

In the following, description will be made of the STP control unit 1780 and the table control unit 1790 as differences from the first exemplary embodiment.

In the present exemplary embodiment, for a correspondence relationship between a VLANID for identifying an RSTP tree and an EoE-MAC address of an edge switch as a route node of the RSTP tree, its information is automatically obtained by processing of transmitting and receiving a BPDU as a control frame of the STP.

First, the STP control unit 1780 will be described.

The STP control unit 380 of the first exemplary embodiment receives a BPDU transferred from the control frame distribution unit 370 and updates an STP port state to update the STP port state management table 1100 based on the information of the BPDU, as well as generating a new BPDU and transferring the new BPDU to the control frame distribution unit 370 in order to transfer the BPDU to a node at a subsequent hop. The unit also notifies the table control unit 390 of a port number whose port state coincides with a condition among the ports and a VLANID as an identifier of an STP tree.

On the other hand, the STP control unit 1780 of the present exemplary embodiment newly has a function of copying a BPDU received from the control frame distribution unit 370 and transferring the copied BPDU to the table control unit 1790. The unit has such functions held by the STP control unit 380 as BPDU processing and new BPDU generation.

Subsequently, the table control unit 1790 will be described.

Upon receiving a VLAN and a port number from the STP control unit 380, the table control unit 390 according to the first exemplary embodiment refers to the VLAN/EoE-MAC management table 900 to obtain an EoE-MAC address corresponding to the notified VLAN and sets the received port number as an output port for the obtained EoE-MAC and VLAN at the MAC table 341 in the forwarding table storage unit 340. Also at the MAC/EoE-MAC table 342, the unit sets the received VLANID at an entry related to the obtained EoE-MAC address.

Although the VLAN/EoE-MAC management table 900 is here assumed to be set by the setting control unit 395, setting of the VLAN/EoE-MAC management table 900 in the present exemplary embodiment is made not externally but by the table control unit 1790.

Upon receiving a BPDU from the STP control unit 1780, the table control unit 1790 obtains information to be held in the VLAN/EoE-MAC management table 900 from the information stored in the BPDU.

Figure 18:
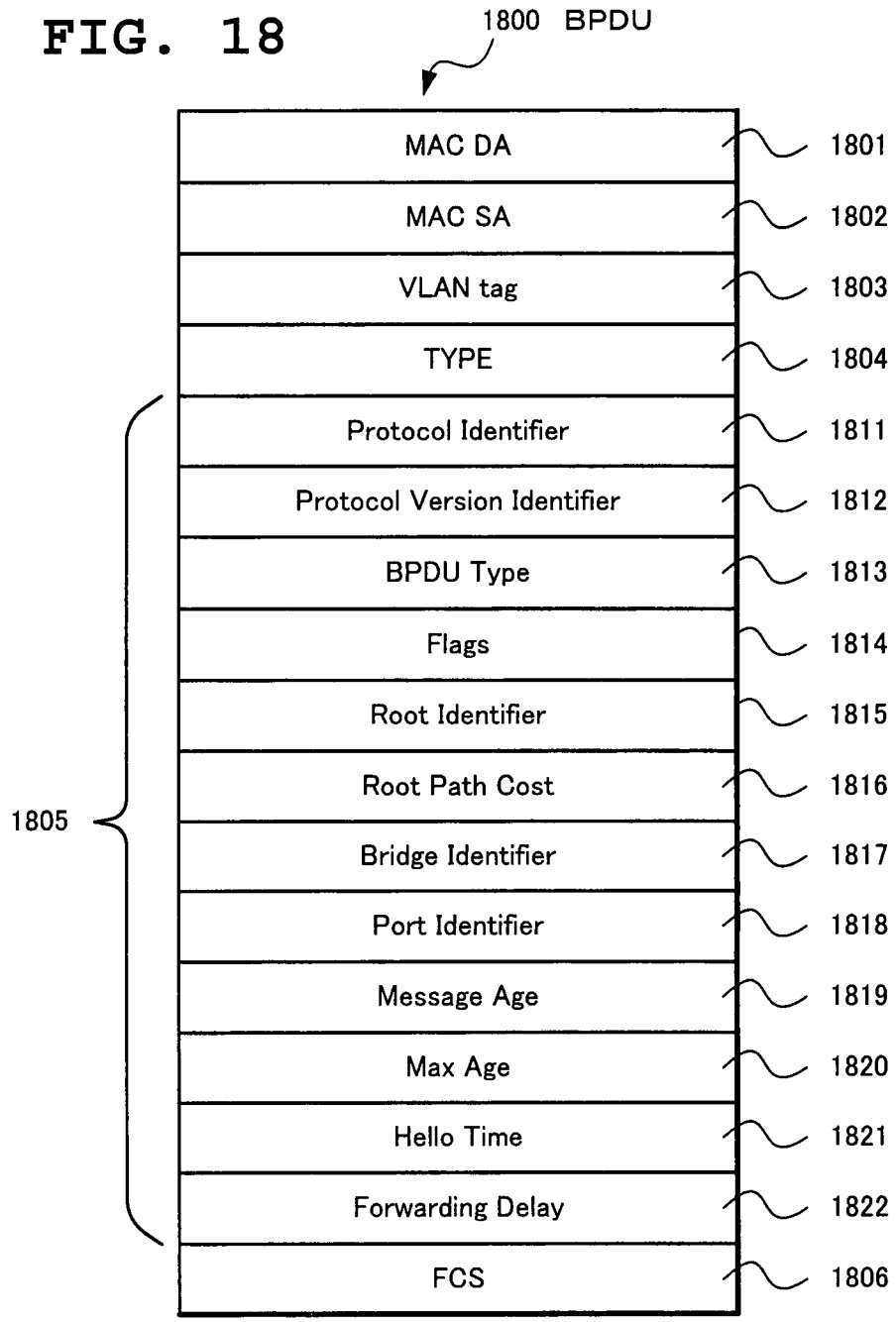
FIG. 18 shows a format of a BPDU.

FIG. 18 is a format diagram of a BPDU.

A BPDU 1800 comprises a MAC_DA field 1801, a MAC_SA field 1802, a VLAN tag field 1803, a Type field 1804, a BPDU parameter region 1805 and an FCS field 1806, and the BPDU parameter region 1805 comprises a Protocol_Identifier field 1811, a Protocol_Version_Identifier field 1812, a BPDU_Type field 1813, a Flags field 1814, a Root_Identifier field 1815, a Root_Path_Cost field 1816, a Bridge_Identifier field 1817, a Port_Identifier field 1818, a Message_Age field 1819, a Max_Age field 1820, a Hello_Time field 1821 and a Forwarding_Delay field 1822.

Stored in the MAC_DA field 1801 is a destination MAC address. Stored in the MAC_SA field 1802 is a transmission source MAC address.

Stored in the VLAN tag field 1803 is a VLANID as an identifier for identifying a spanning tree. Stored in the Type field 1804 is a type identifier of a frame.

Stored in the BPDU parameter region 1805 are various kinds of parameters of a BPDU recited in IEEE802.1D or IEEE802.1w. Stored in each parameter field of the BPDU parameter region 1805 is a corresponding parameter value recited in IEEE802.1D or IEEE802.1w.

Stored in the FCS field 1806 is a frame check sequence.

Figure 19:
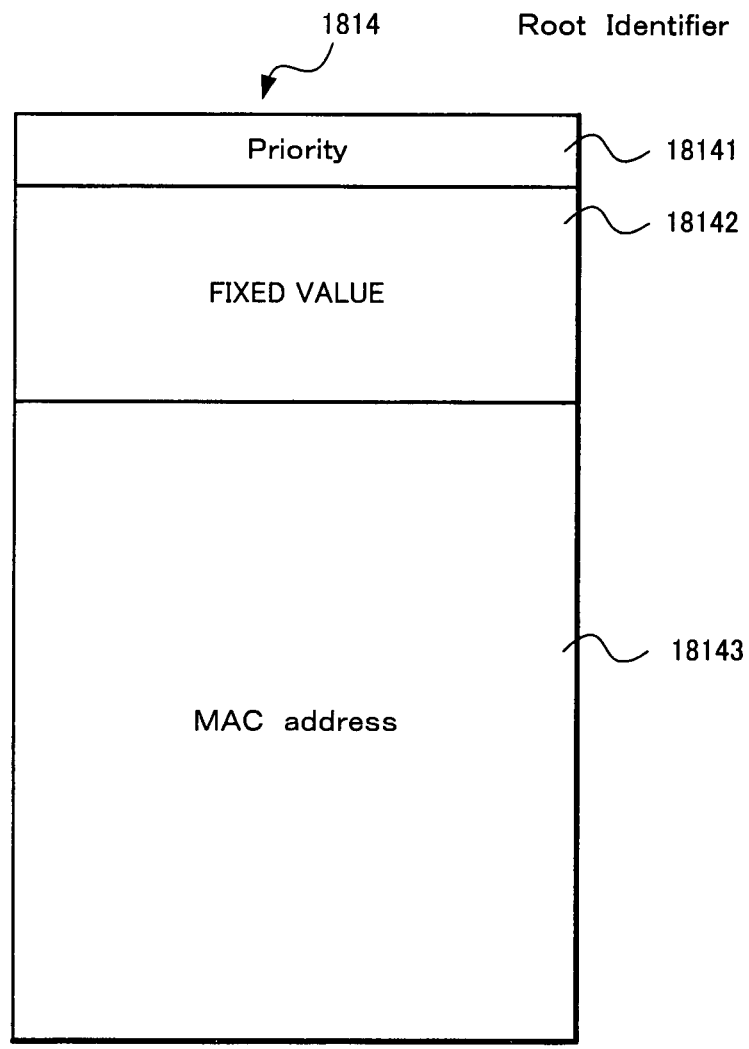
FIG. 19 shows a format of a Root Identifier of BPDU.

Structure of the Root_Identifier field 1815 in the BPDU parameter region 1805 is shown in FIG. 19.

The Root_Identifier field 1815 comprises a Priority field 18151, a fixed value field 18142 and a MAC_Address field 18143.

Stored in the MAC_Address field 18143 is a MAC address of a route node. The Root_Identifier field 1815 has an 8-byte length, the Priority field 18141 has a 4-bit length, the fixed value field 18142 has a 12-bit length and the MAC_Address field 18143 has a 6-byte length.

Accordingly, extracting lower-order six bytes of the Root_Identifier field 1815 obtains a MAC address of a route node of the spanning tree.

As described in the foregoing, based on the information of the VLAN tag field 1803 and the MAC_Address field 18143 in the Root_Identifier field 1815 of the BPDU as illustrated in the structure of the BPDU shown in FIGS. 18 and 19, a VLANID as an identifier of an RSTP tree and a MAC address of an edge switch as a route node of the RSTP tree can be obtained.

In response to the foregoing, upon receiving a BPDU from the STP control unit 1780, the table control unit 1790 stores, in the VLAN field and the EoE-MAC address field of the VLAN/EoE-MAC management table 900, the information stored in the VLAN tag field 1803 and the information stored in the MAC_Address field 18143 of the Root_Identifier field 1815 of the BPDU, respectively. After obtaining the information, the unit abandons the BPDU. Executing such processing at every reception of a BPDU sets the VLAN/EoE-MAC management table 900. It is also possible, without executing processing at every reception of a BPDU, to manage a list of VLAN already processed among the respective VLANs to execute correlation obtaining processing when a VLAN is yet to be processed at the reception of a BPDU.

The function of setting the forwarding table storage unit 340 by using the information of the VLAN/EoE-MAC management table 900 is the same as that of the table processing unit 390.

Although in the foregoing described example, the STP control unit 1780 copies a BPDU and transfers the copy to the table control unit 1790, and the table control unit 1790 obtains correspondence between a VLAN and an EoE-MAC address of a route node from the received BPDU, the functions of the units are exchangeable.

It is possible, for example, that the STP control unit 1780, upon receiving a BPDU, executes the correspondence obtaining processing which is executed by the table control unit 1790 in the foregoing description and notifies the table control unit 1790 of a VLANID and its corresponding EoE-MAC address, and the table control unit 1790 writes received respective information into the VLAN/EoE-MAC management table 900.

The foregoing described STP control unit 1780 and table control unit 1790 enable automatic setting of information of the VLAN/EoE-MAC management table 900.

Setting each table of the forwarding table storage unit 340 by using thus set information of the VLAN/EoE-MAC management table 900 and transferring main signal data along an optimum path can be realized by the operation of each unit which has been described in the first exemplary embodiment.

(Effects of the Second Exemplary Embodiment)

Thus, the node structure, the table generation method and the data transfer method according to the second exemplary embodiment enable transfer between the respective terminals by the shortest path and further enable automatic setting of correspondence between a VLANID for identifying an STP tree necessary therefor and an EoE-MAC address of a route node.

(Third Exemplary Embodiment)

In the third exemplary embodiment, correspondence between a VLANID for identifying an STP tree and an EoE-MAC address of a route node is automatically set by a method (without the BPDU transmission and reception processing) different from that of the second exemplary embodiment.

Figure 45:
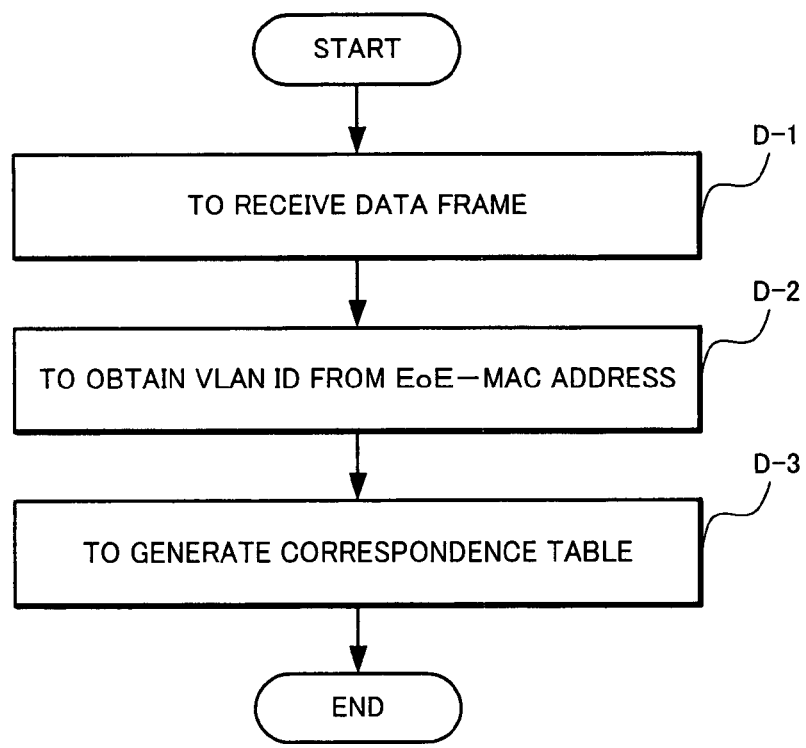
FIG. 45 is a flow chart showing an outline of a procedure of processing of correlating an EoE-MAC address and VLANID in the third exemplary embodiment of the present invention.

Outlines of the above described procedure of correlating an EoE-MAC address and a VLAN ID at each switch in the present exemplary embodiment are as shown in the flow chart of FIG. 45.

Receive a data frame (Step D-1).

Calculate a VLAN ID from an EoE-MAC address of the data frame received at Step D-1 (Step D-2).

Correlate the VLAN ID calculated at Step D-2 with the EoE-MAC address to generate a correspondence table (Step D-3).

In addition, a node (switch) to which a transmission source terminal is connected has a procedure of storing a VLAN ID in a region of arbitrary 12 bits among 48 bits of the EoE-MAC address of the received frame. In the following, description will be made of an example where a VLAN ID is stored in lower-order 12 bits.

Since outlines of a frame transfer procedure and a forwarding table updating procedure in the present exemplary embodiment are the same as the frame transfer procedure and the forwarding table updating procedure in the first exemplary embodiment, no description will be made thereof.

Detailed contents of the above-described correlation processing procedure will be clarified by the following description of the respective components and their operation.

Figure 20:
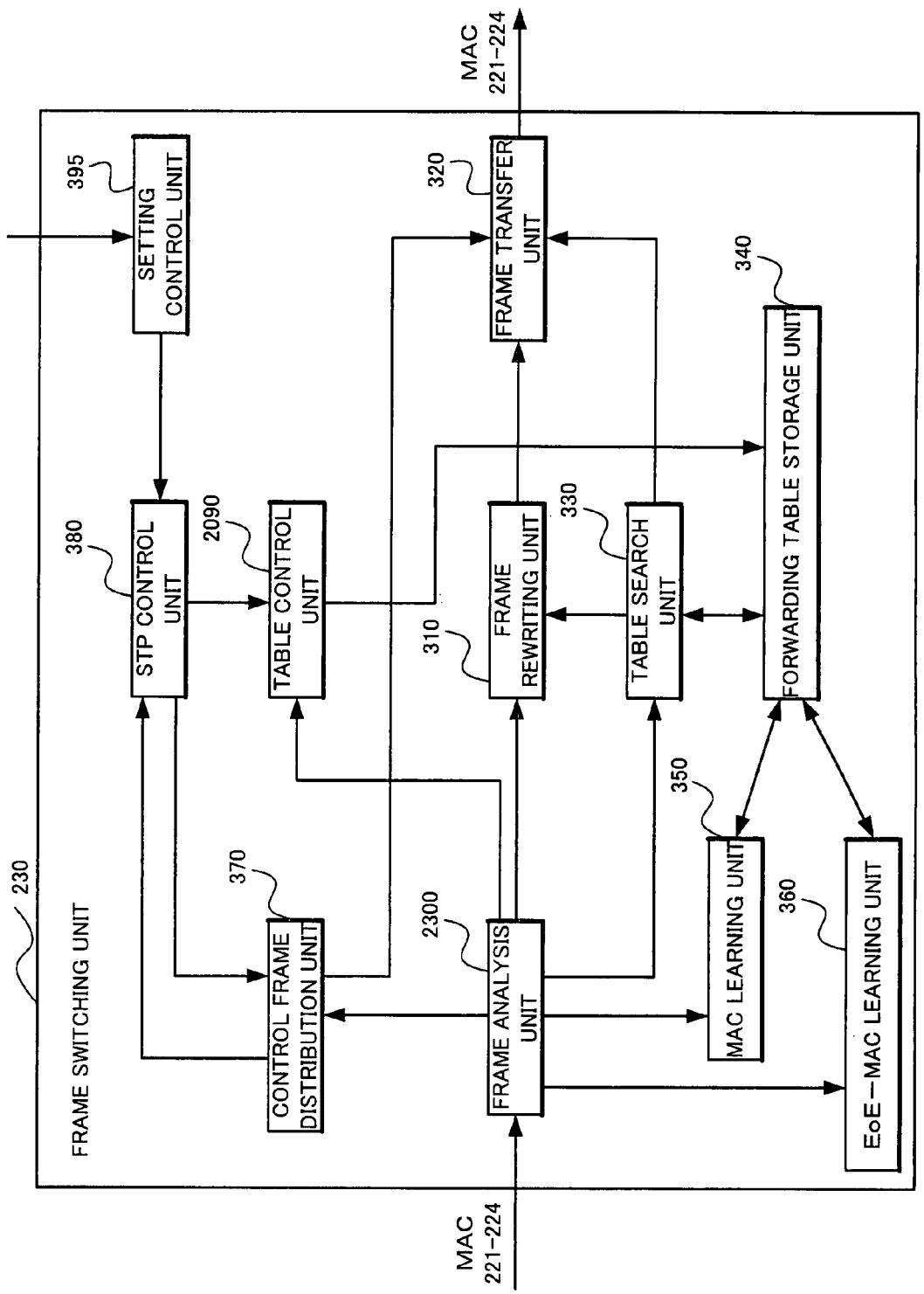
FIG. 20 is a block diagram of a frame switching unit according to a third exemplary embodiment of the present invention.
Figure 21:
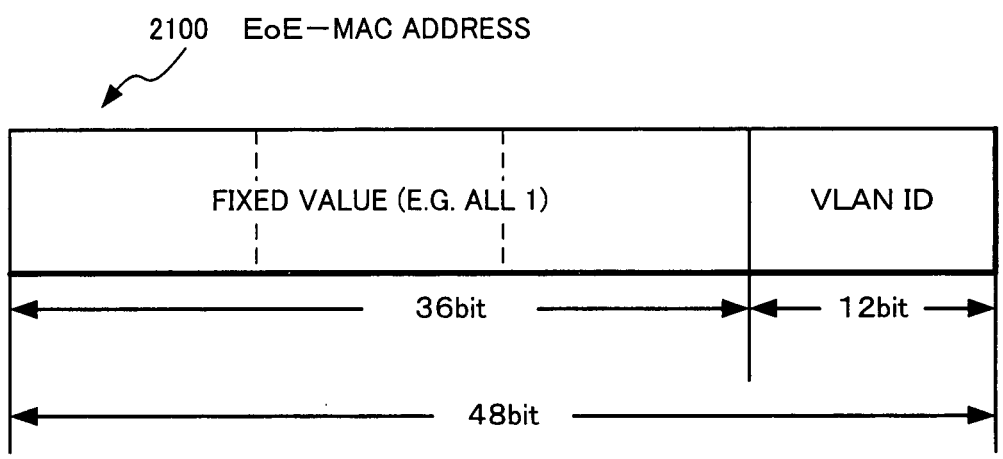
FIG. 21 shows an example of a structure of an EoE-MAC address.

Structure of a node in the present exemplary embodiment is shown in FIG. 20.

In FIG. 20, the table control unit 390 and the frame analysis unit 300 in the node structure according to the first exemplary embodiment shown in FIG. 3 are replaced by a table control unit 2090 and a frame analysis unit 2300, respectively, and the remaining units are the same as those in FIG. 3 (like unit is denoted by the same name and reference numeral). In the following, description will be made of the table control unit 2090 and the frame analysis unit 2300 as the differences from the first exemplary embodiment.

For automatically obtaining correspondence between a VLAN ID for identifying an RSTP tree and an EoE-MAC address of an edge switch as a route node of the RSTP tree, an EoE-MAC address is correlated with a VLAN ID at the time of setting the EoE-MAC address to automatically obtain a VLAN ID from the EoE-Mac address in the present exemplary embodiment.

First, description will be made of EoE-MAC address setting.

EoE-MAC address is formed of 48 bits, the same as an ordinary MAC address. As a method of setting an EoE-MAC address, assume here to set such that an EoE-MAC address can be calculated by subjecting a VLAN ID to one operation or another. In the present exemplary embodiment, assume, as an example, that a VLAN ID is stored in lower-order 12 bits among 48 bits of an EoE-MAC address, with higher-order 36 bits set to be a fixed value.

VLAN ID to be stored is a VLAN ID as an identifier of an RSTP tree with an edge switch to which the EoE-MAC address in question is assigned serving as a route node.

Subsequently, the frame analysis unit 2300 will be described. The frame analysis unit 2300, in addition to the operation of the frame analysis unit 300, transfers a data frame to be transferred to the frame analysis unit 310 also to the table control unit 2090. Remaining operation is the same as that of the frame analysis unit 300.

Next, the table control unit 2090 will be described. The table control unit 390 of the first exemplary embodiment, upon receiving a VLAN and a port number from the STP control unit 380, refers to the VLAN/EoE-MAC management table 900 to obtain an EoE-MAC address corresponding to the notified VLAN and set the received port number as an output port for the obtained EoE-MAC and VLAN at the MAC table 341 in the forwarding table storage unit 340. Also at the MAC/EoE-MAC table 342, the unit sets the received VLAN ID at an entry related to the obtained EoE-MAC address.

On the other hand, according to the present exemplary embodiment, a VLAN ID is calculated from an EoE-MAC address of a data frame to generate the VLAN/EoE-MAC management table 900.

When a port state of a spanning tree is changed, the table control unit 2090 receives a VLAN ID and port information related to the changed spanning tree from the STP control unit 380. Upon receiving a data frame from the frame analysis unit 2300, the table control unit 2090 also calculates a VLAN ID corresponding to an EoE-MAC address of the data frame.

In the present exemplary embodiment, predetermined 12 bits (lower-order 12 bits in this example) are extracted as a VLAN ID out of 48 bits of the EoE-MAC address of the received data frame. This enables a correspondence relationship between the EoE-MAC address and the VLAN ID to be obtained and both data to be stored in the VLAN/EoE-MAC management table 900.

The function of setting the forwarding table storage unit 340 based on the obtained correspondence relationship is the same as that of the table processing unit 390.

Obtaining a VLAN ID corresponding to an EoE-MAC address by the foregoing described EoE-MAC address setting and table control unit 2090, and setting each table of the forwarding table storage unit 340 to transfer main signal data along an optimum path can be realized by the operation of the respective units described in the first exemplary embodiment.

In addition, although in the foregoing description, a VLAN ID is calculated from an EoE-MAC address of a received data frame to generate the VLAN/EoE-MAC management table 900, it is also possible to generate the VLAN/EoE-MAC management table 900 based on a received BPDU frame.

(Effects of the Third Exemplary Embodiment)

Thus, the node structure, the table generation method and the data transfer method according to the third exemplary embodiment enable transfer between the respective terminals by the shortest path and further enable automatic setting of correspondence between a VLAN ID for identifying an STP tree necessary therefor and an EoE-MAC address of a route node.

(Fourth Exemplary Embodiment)

In the fourth exemplary embodiment of the present invention, for realizing optimum path transfer in the EoE technique, each edge switch generates an STP/RSTP tree with its own node as a route node and each switch in the network holds correspondence between a VLANID for identifying each STP/RSTP tree and an EoE-MAC address of an edge switch as a route node of the STP/RSTP tree.

Then, by using a learning mechanism for solving an EoE-MAC address of an Engress edge switch corresponding to a destination MAC address of a user terminal in the EoE technique, an output port for the EoE-MAC address is set with reference to the above correspondence between a VLANID for identifying the RSTP tree and the EoE-MAC address.

Figure 46:
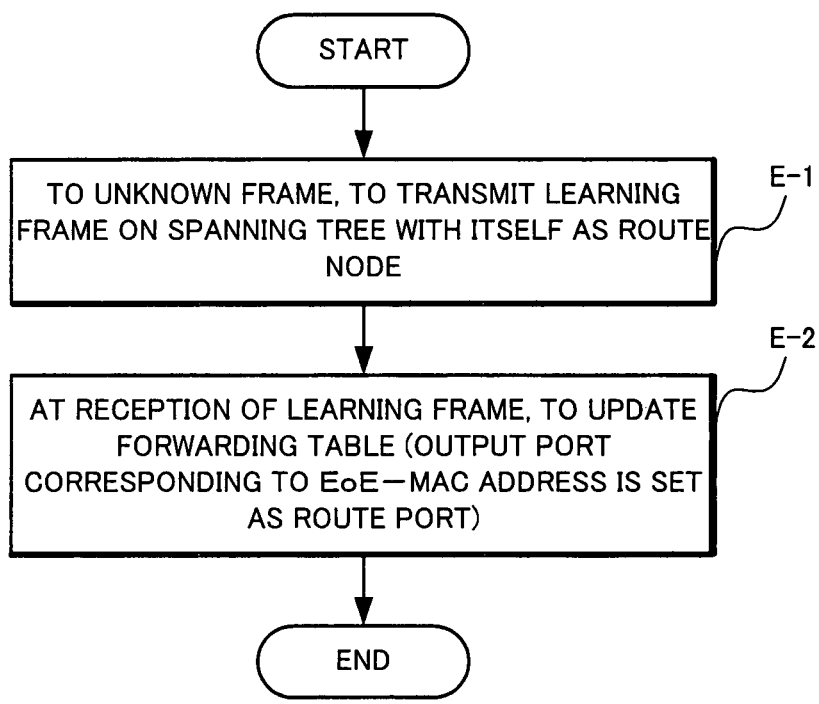
FIG. 46 is a flow chart showing an outline of a forwarding table update procedure according to the fourth exemplary embodiment of the present invention.

Outlines of a forwarding table update procedure in the present exemplary embodiment are as shown in the flow chart FIG. 46.

To an unknown frame, each switch transmits a learning frame on a spanning tree with itself as a route node (switch) (Step E-1).

At the reception of a learning frame, an output port corresponding to the obtained EoE-MAC address is set as a route port to update the forwarding table (Step E-2).

Receive a change of the STP port state (which will be described later) based on the VLANID (spanning tree protocol ID) and changed port information (which will be described later) (Step B-1).

With reference to the correspondence table, obtain an EoE-MAC address corresponding to the VLANID at Step B-1 (Step B-2).

Update the forwarding table by rewriting an output port corresponding to the EoE-MAC address obtained at Step B-2 into a port notified by the spanning tree protocol (Step B-3).

Since outlines of a frame transfer procedure in the present exemplary embodiment are the same as the frame transfer procedure in the first exemplary embodiment and no correlation processing is required, no description will be made thereof.

Detailed contents of the above-described forwarding table updating procedure will be clarified by the following description of the respective components and their operation.

Figure 22:
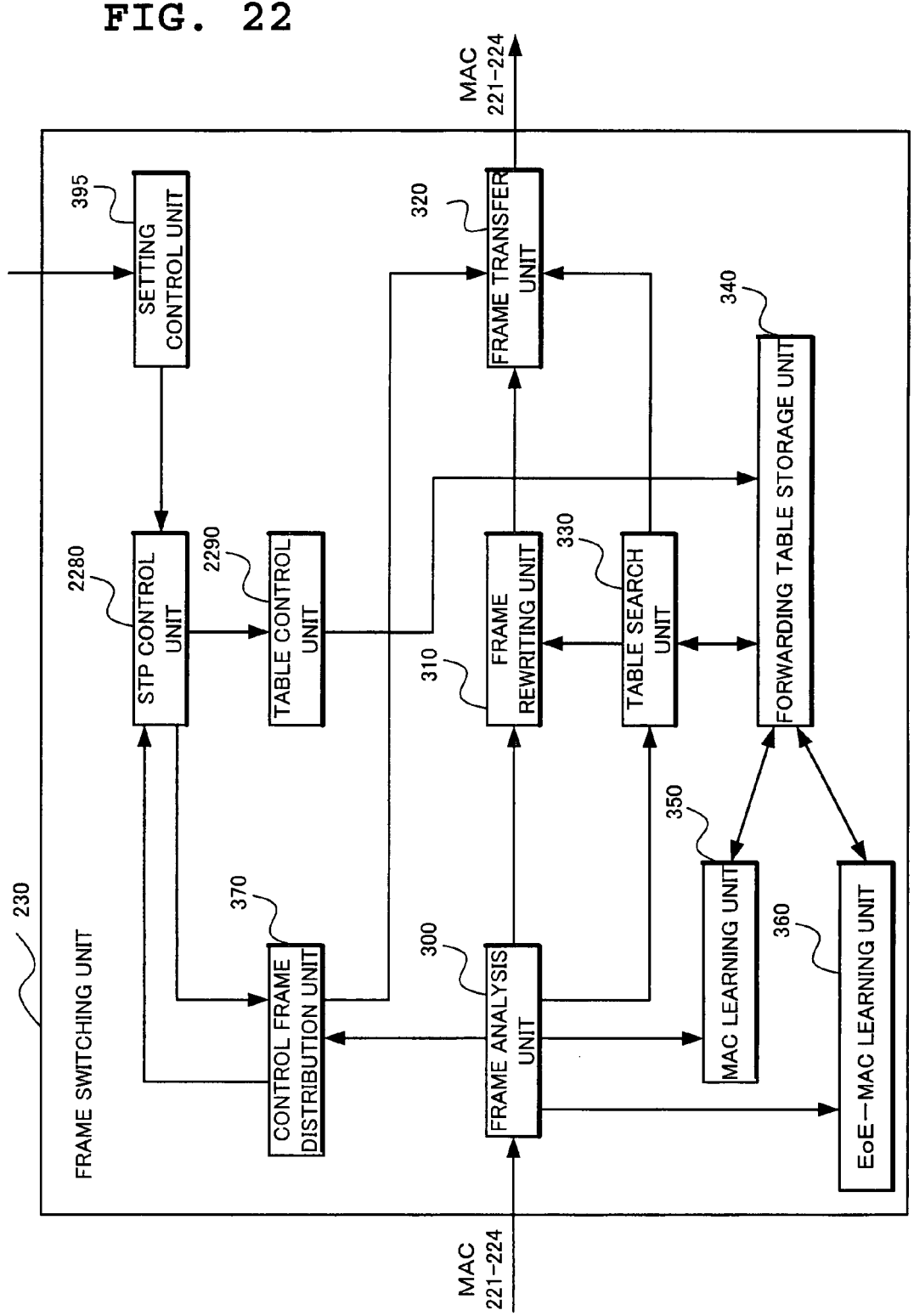
FIG. 22 is a block diagram of a frame switching unit according to a fourth exemplary embodiment of the present invention.

Structure of a node in the present exemplary embodiment is shown in FIG. 22.

In FIG. 22, the STP control unit 380 and the table control unit 390 in the node structure according to the first exemplary embodiment shown in FIG. 3 are replaced by an STP control unit 2280 and a table control unit 2290, respectively, and the remaining units are the same as those in FIG. 3. In the following, description will be made of the STP control unit 2280 and the table control unit 2290 as the differences from the first exemplary embodiment.

First, the STP control unit 2280 will be described.

The STP control unit 380 of the first exemplary embodiment receives a BPDU transferred from the control frame distribution unit 370 to update an STP port state based on information of the BPDU to update an STP port state management table 1100, as well as newly generating a BPDU and transferring the new BPDU to the control frame distribution unit 370 for transferring the BPDU to a node at a subsequent hop. The unit also notifies the table control unit 390 of a port number whose port state coincides with a condition among the ports and a VLANID as an identifier of an STP tree.

On the other hand, in the above-described processing, the STP control unit 2280 of the present exemplary embodiment changes a condition of a port state notified to the table control unit 390 that a port whose state is other than the Discarding state irrespective of a port function and notifies a port number meeting the condition and a VLANID as an identifier of an STP tree.

Subsequently, the table control unit 2290 will be described.

The table control unit 390 of the first exemplary embodiment, upon receiving a VLAN and a port number from the STP control unit 380, obtains an EoE-MAC address corresponding to the VLAN notified from the VLAN/EoE-MAC management table 900 to set the received port number as an output port for the obtained EoE-MAC address and VLAN at the MAC table 341 in the forwarding table storage unit 340, set the received port number as a broadcast output port for the obtained VLAN at the broadcast table 343, and set a VLANID for an entry related to the obtained EoE-MAC address at the MAC/EoE-MAC table 342.

On the other hand, without having the VLAN/EoE-MAC management table 900, the table control unit 2290 according to the present exemplary embodiment executes only processing of setting an output port corresponding to the obtained VLANID at the broadcast table 343 in the forwarding table storage unit 340 out of the above-described processing.

In the present exemplary embodiment, optimum path transfer is executed by thus structured node by a method described in the following. Since the table setting method at each node differs from that of the first exemplary embodiment, description will be made in the following of the table contents and table setting at each node.

Premised network is assumed to be the network shown in FIG. 1 similarly to the first exemplary embodiment and with frame transfer between the terminal T1 and the terminal T3 as an example, shortest path transfer according to the present exemplary embodiment will be described.

Since in the present exemplary embodiment, by using the learning mechanism for solving an EoE-MAC address of an Egress edge switch corresponding to a destination MAC address of a user terminal, an output port for an EoE-MAC address is set with reference to correspondence between a VLANID and an EoE-MAC address, description will be made of the learning mechanism.

The following description will be made with reference to the block diagram of a node shown in FIG. 22 and the diagrams of the tables shown in FIGS. 23 through 25.

For the description appropriate for FIG. 1, assume that frame transfer from the user terminal T3 to the user terminal T1 is executed after frame transfer from the user terminal T1 to the user terminal T3.

The edge switch E1 holds a MAC table 2301, a MAC/EoE-MAC table 2302 and a broadcast table 2303 shown in FIG. 23. It is assumed here that in the present exemplary embodiment, the MAC/EoE-MAC table 2302 has a Flag field to control transmission of a broadcast frame when no learning is executed further to the structure described so far (this is also the case with a MAC/EoE-MAC table 2502 of the edge switch E3 in FIG. 25).

Figure 26:
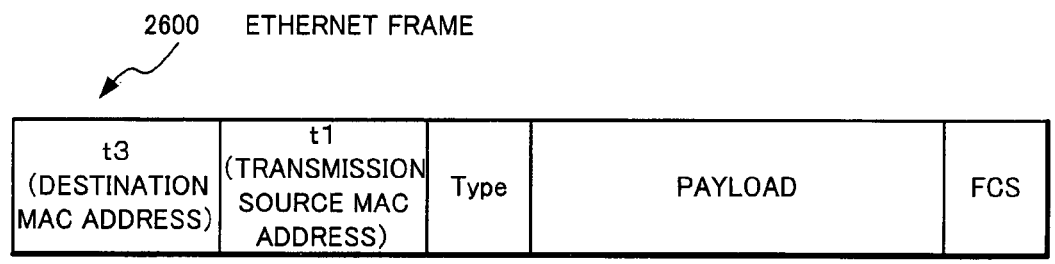
FIG. 26 shows one example of an Ethernet (R) frame.

In the edge switch E1, when receiving an Ethernet (R) frame 2600 of FIG. 26 as a frame directed to the user terminal T3 from the user terminal T1 at the port p1, the frame analysis unit 300 analyzes the input frame as being an ordinary Ethernet (R) frame 4300 to notify the table search unit 330 of header information, frame kind information and input port information and notify the frame rewriting unit 310 of the entire frame or a payload part.

The table search unit 330 refers to the MAC/EoE-MAC table 2302, and because there exists no entry related to the destination MAC address t3, instructs the frame rewriting unit 310 to encapsulate an EoE-MAC header with EoE-MAC_DA=broadcast or multicast and EoE-MAC_SA=its own node EoE-MAC and sets t3 at the MAC address field and 1 at the Flag field of the MAC/EoE-MAC table 2302.

In addition, since a VLANID of an RSTP tree in which its own node serves as a route node is g1, the unit also instructs the frame rewriting unit 310 to stack the VLANID=g1.

The unit also refers to the broadcast table 2303 to obtain the ports p2 and p3 as broadcast transfer port information for the VLANID=g1 and notify the frame transfer unit 320 of the ports p2 and p3 excluding the input port.

Figure 27:
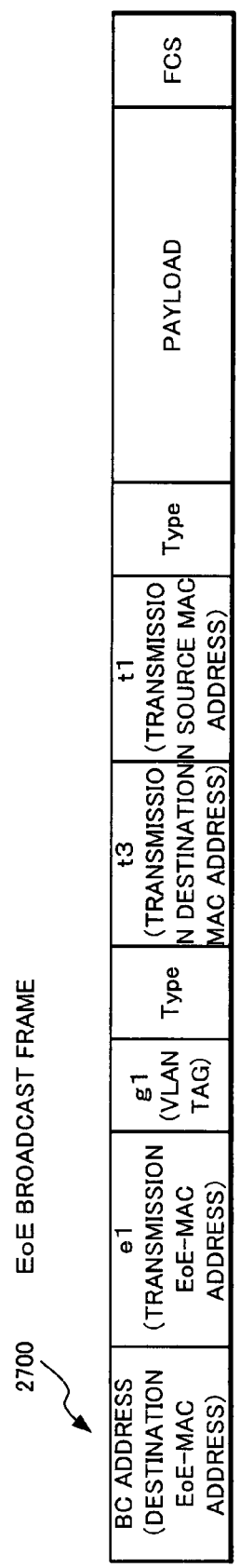
FIG. 27 shows one example of an EoE broadcast frame.

According to the instruction from the table search unit 330, the frame rewriting unit 310 encapsulates the EoE-MAC header to transfer an EoE broadcast frame 2700 shown in FIG. 27 which is a frame with a VLAN tag stacked in which the VLANID is stored to the frame transfer unit 320, and the frame transfer unit 320 outputs the EoE broadcast frame 2700 to the output ports p2 and p3 received from the table search unit 330.

As the learning processing, the frame analysis unit 300 notifies the frame rewriting unit 310 and the table search unit 330 of the information, as well as notifying the MAC learning unit 350 of header information, frame kind information and input port information.

The MAC learning unit 350 having received the information refers to the MAC table 2301 to search a reception port for MAC_SA=t1 and VLANID=0 of the received header information and when there exists no entry, stores the MAC_SA=t1 in the MAC address field, the VLANID=0 in the VLAN field and the reception port p1 in the output port field. While in the first exemplary embodiment, it is possible to set the MAC learning unit 350 to stop MAC learning processing when the reception port is a port on the network side, MAC learning processing is executed irrespective of a reception port in the fourth exemplary embodiment.

Subsequently, the core switch C1 at a hop subsequent to the edge switch E5 will be described.

The core switch C1 holds a MAC table 2401 and a broadcast table 2403 shown in FIG. 24.

The core switch C1 having received the EoE broadcast frame 2700 from the edge switch E1 analyzes the input frame as being the EoE-MAC frame 4600 with a VLAN tag at the frame analysis unit 300 to notify the table search unit 330 of header information, frame kind information and input port information and notify the frame rewriting unit 310 of the entire frame or a payload part.

Since the destination MAC address is a broadcast address, the table search unit 330 refers to the broadcast table 2403 to obtain the broadcast transfer ports p1, p2 and p3 for the VLANID=g1 and notify the frame transfer unit 320 of the ports p2 and p3 excluding the input port. The unit also notifies the frame rewriting unit 310 of no frame rewriting.

The frame rewriting unit 310 transfers the EoE broadcast frame 2700 received from the frame analysis unit 300 to the frame transfer unit 320 without subjecting the same to the rewriting processing.

The frame transfer unit 320 outputs the EoE broadcast frame 2700 to the output ports p2 and p3 received from the table search unit 330.

As the learning processing, the frame analysis unit 300 notifies the MAC learning unit 350 of header information, frame kind information and input port information and the MAC learning unit 350 having received the information refers to the MAC table 2401 to search a reception port for MAC_SA=e1 and VLANID=g1 of the received header information and when there exists no entry, stores the MAC_SA=e1 in the MAC address field, the VLANID=g1 in the VLAN Field and the reception port p1 in the output port field.

Subsequently, the edge switch E3 at a hop subsequent to the core switch C1 will be described.

The edge switch E3 holds a MAC table 2501, the MAC/EoE-MAC table 2502 and a broadcast table 2303 shown in FIG. 25.

The edge switch E3 having received the EoE broadcast frame 2700 from the core switch C1 analyzes the input frame as being the EoE-MAC frame 4600 with a VLAN tag at the frame analysis unit 300 to notify the table search unit 330 of header information, frame kind information and input port information and notify the frame rewriting unit 310 of the entire frame or a payload part.

Since the destination MAC address is a broadcast address, the table search unit 330 refers to the broadcast table 2503 to obtain the broadcast transfer ports p1 and p3 for the VLANID=g1, notify the frame transfer unit 320 of the ports p3 excluding the input port and instruct the frame rewriting unit 310 of no rewriting.

In addition, since its own node is an edge switch, the table search unit 330 instructs the frame rewriting unit 320 to execute EoE-MAC decapsulation processing (deletion processing) and VLAN tag deletion processing, as well as referring to the MAC table 2501, and when finding that there is no entry for MAC_DA=t3 and VLANID=0, referring to the broadcast table 2503 to obtain the port p2 as broadcast transfer port information for the VLANID=0 and notify the frame transfer unit 320 of the port.

The frame rewriting unit 310 transfers the frame or the payload received from the frame analysis unit 300 to the frame transfer unit 320 without rewriting as instructed by the table search unit 330, as well as executing the deletion processing of the EoE-MAC address and the VLAN tag instructed by the table search unit 330 with respect to the other copied frame to output the obtained result to the frame transfer unit 320. As a result, the frame to be output will be the Ethernet (R) frame 2700 in FIG. 26.

The frame transfer unit 320 outputs the EoE broadcast frame 2700 to the output port p3 received from the table search unit 330 and outputs the Ethernet (R) frame 2600 to the output port p2. In line with the frame transfer processing described here, the learning processing is also executed.

The frame analysis unit 300 notifies the MAC learning unit 350 and the EoE-MAC learning unit 360 of header information, frame kind information and input port information.

The MAC learning unit 350 having received the information refers to the MAC table 2501 to search a reception port for MAC_SA=e1 and VLANID=g1 of the received header information and when there exists no entry, stores the MAC_SA=e1 in the MAC address field, the VLANID=g1 in the VLAN field and the reception port p1 in the output port field.

On the other hand, the EoE-MAC learning unit 360 having received the information refers to the MAC/EoE-MAC table 2502 to search EoE-MAC for MAC_SA=t1 of the received header information and when there exists no entry, sets the MAC_SA=t1 in the MAC address field, the EoE-MAC_SA=e1 in the EoE-MAC address field, the VLANID=g1 in the VLAN field and 0 in the Flag field.

Thereafter, the Ethernet (R) frame 2600 output from the edge switch E3 arrives at the user terminal T3.

Subsequently, description will be made of a case where the user terminal T3 transfers a frame to the user terminal T1.

When the edge switch E3 receives, at the port p2, the Ethernet (R) frame 1500 of FIG. 15 as a frame directed to the user terminal T1 from the user terminal T3, the frame analysis unit 300 analyzes the input frame as being the ordinary Ethernet (R) frame 4300 to notify the table search unit 330 of header information, frame kind information and input port information and notify the frame rewriting unit 310 of the entire frame or a payload part.

Since the Flag field of an entry for the destination MAC address t1 in the MAC/EoE-MAC table 2502 is 0, the table search unit 330 instructs the frame rewriting unit 310 to execute EoE-MAC header encapsulation with EoE-MAC_DA=broadcast or multicast and EoE-MAC_SA=its own node EoE-MAC e3 and sets 1 at the Flag field of the entry for the destination MAC address t1 in the MAC/EoE-MAC table 2502. As a result, the MAC/EoE-MAC table 2502 is updated to a MAC/EoE-MAC table 2505. In addition, since a VLANID of an RSTP tree in which its own node serves as a route node is g3, the unit instructs the frame rewriting unit 310 to stack the VLANID=g3. The unit also refers to the broadcast table 2503 to obtain the broadcast transfer ports p1 and p3 for the VLANID=g3 and notify the frame transfer unit 320 of the ports p1 and p3 excluding the input port (in FIG. 25, a broadcast port for the VLANID=g3 is set from among the ports of an RSTP tree with the edge switch E3 as a route node not shown in FIG. 1).

Figure 28:
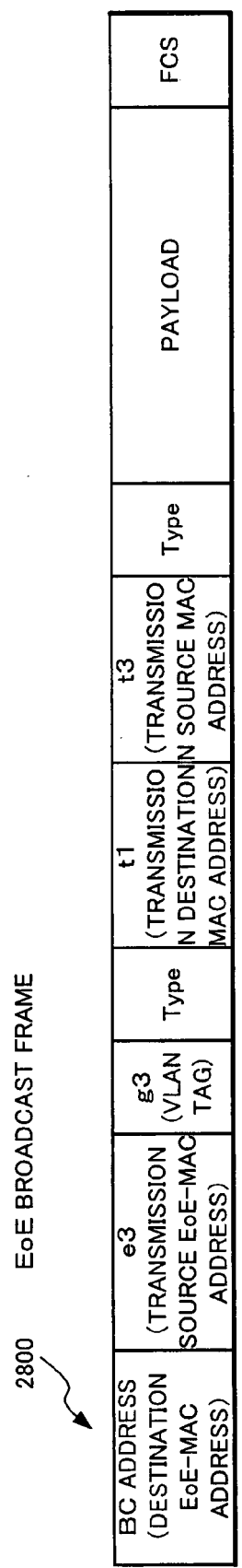
FIG. 28 shows one example of an EoE broadcast frame.

The frame rewriting unit 310 encapsulates the EoE-MAC header according to the instruction from the table search unit 330 and stacks the VLAN tag in which a VLANID is stored, so that a frame to be sent out will be an EoE broadcast frame 2800 shown in FIG. 28.

The frame rewriting unit transfers the EoE broadcast frame 2800 to the frame transfer unit 320, so that the frame transfer unit 320 outputs the frame to the output ports p1 and p3 received from the table search unit 330.

In line with the frame transfer processing described here, learning processing is also executed.

The frame analysis unit 300 notifies the MAC learning unit 350 of header information, frame kind information and input port information. The MAC learning unit 350 having received the information refers to the MAC table 2501 to search a reception port for MAC_SA=t3 and VLANID=0 of the received header information and when there exists no entry, stores the MAC_SA=t3 in the MAC address field, the VLANID=0 in the VLAN field and the reception port p2 in the output port field. As a result, the MAC table 2501 will be a MAC table 2504.

Subsequently, description will be made of the core switch C1 at a hop subsequent to the edge switch E3. The core switch C1 having received the EoE broadcast frame 2800 from the edge switch E3 analyzes the input frame as being the EoE- MAC frame 4600 with a VLAN tag at the frame analysis unit 300 to notify the table search unit 330 of header information, frame kind information and input port information and notify a frame rewriting unit 310 of the entire frame or a payload part.

Since the destination MAC address is a broadcast address, the table search unit 330 refers to the broadcast table 2403 to obtain the broadcast transfer ports p1, p2 and p3 for the VLANID=g3 and notify the frame transfer unit 320 of the ports p1 and p3 excluding the input port. The unit also notifies the frame rewriting unit 310 of no frame rewriting.

The frame rewriting unit 310 transfers the EoE broadcast frame 2800 received from the frame analysis unit 300 to the frame transfer unit 320 without subjecting the same to rewriting processing.

The frame transfer unit 320 outputs the EoE broadcast frame 2800 to the output ports p1 and p3 received form the table search unit 330.

As the learning processing, the frame analysis unit 300 notifies the MAC learning unit 350 of header information, frame kind information and input port information.

The MAC learning unit 350 having received the information refers to the MAC table 2401 to search a reception port for MAC_SA=e3 and VLANID=g3 of the received header information and when there exists no entry, stores MAC_SA=e3 in the MAC address field, VLANID=g3 in the VLAN field and the reception port p2 in the output port field. As a result, the MAC table 2401 is updated to a MAC table 2404.

Subsequently, description will be made of the edge switch E1 at a hop subsequent to the core switch C1.

The edge switch E3 having received the EoE broadcast frame 2800 from the core switch C1 analyzes the input frame as being the EoE-MAC frame 4600 with a VLAN tag at the frame analysis unit 300 to notify the table search unit 330 of header information, frame kind information and input port information and notify the frame rewriting unit 310 of the entire frame or a payload part.

Since the destination MAC address is a broadcast address, the table search unit 330 refers to the broadcast table 2303 to obtain the broadcast transfer ports p2 and p3 for the VLANID=g3 and notify the frame transfer unit 320 of the port p3 excluding the input port, as well as instructing the frame rewriting unit 310 of no rewriting.

In addition, since its own node is an edge switch, the table search unit 330 instructs the frame rewriting unit 320 to execute EoE-MAC decapsulation processing (deletion processing) and VLAN tag deletion processing, as well as referring to the MAC table 2301 to obtain the port p1 as an output port for the MAC_DA=t1 and VLANID=0 and notify the frame transfer unit 320 of the port.

The frame rewriting unit 310 transfers the frame or the payload received from the frame analysis unit 300 to the frame transfer unit 320 without rewriting the same as instructed by the table search unit 330, as well as executing EoE-MAC address and VLAN tag deletion processing with respect to a copied frame to output the obtained frame to the frame transfer unit 320. As a result, a frame to be output will be the Ethernet (R) frame 1500 shown in FIG. 15.

The frame rewriting unit 310 transfers the Ethernet (R) frame 1500 to the frame transfer unit 320.

The frame transfer unit 320 outputs the EoE broadcast frame 2600 to the output port p3 received from the table search unit 330 and outputs the Ethernet (R) frame 1500 to the output port p1.

In line with the frame transfer processing described here, learning processing is also executed.

The frame analysis unit 300 notifies the MAC learning unit 350 and the EoE-MAC learning unit 360 of header information, frame kind information and input port information.

The MAC learning unit 350 having received the information refers to the MAC table 2301 to search a reception port for the MAC_SA=e3 and VLANID=g3 of the received header information and when there exists no entry, stores MAC_SA=e3 in the MAC address field, VLANID=g3 in the VLAN field and the reception port p2 in the output port field. As a result, the MAC table 2301 is updated to a MAC table 2304.

On the other hand, the EoE-MAC learning unit 360 having received the information refers to the MAC/EoE-MAC table 2302 to search an EoE-MAC for the MAC_SA=t3 of the received header information and when there exists no information, stores EoE-MAC_SA=e3 in the EoE-MAC address field and VLANID=g3 in the VLAN field. As a result, the MAC/EoE-MAC table 2302 is updated to a MAC/EoE-MAC table 2305.

Thereafter, the Ethernet (R) frame 1500 output from the edge switch E1 arrives at the user terminal T1.

(Effects of the Fourth Exemplary Embodiment)

As described in the foregoing, in the present exemplary embodiment, with a VLAN tag stacked in which a VLANID as an identifier of an RSTP tree with an Ingress edge switch serving as a route node is stored, an EoE broadcast frame to be sent when an EoE-MAC address of an Egress edge switch corresponding to a destination MAC address of a user terminal is unknown, is sent on the RSTP tree, so that each node in the network receives the frame at a route port of the RSTP tree. At this time, the learning mechanism operates to learn a route port of the RSTP tree as an output port for the EoE-MAC address of the Ingress edge switch stored in the MAC_SA field and the VLANID of the RSTP tree with the Ingress edge switch as a route node and hold the port in the MAC table. Since frame transfer is hereafter executed according the MAC table, the frame will be transferred to the direction of the route port of the RSTP tree with the Egress edge switch as a route node. This enables frame transfer on an optimum path.

Other than the method of the present exemplary embodiment, each edge switch may cyclically send a frame with an EoE-MAC address of its own node as MAC_SA. In this case, determination of an output port for the EoE-MAC address might be made faster.

(Fifth Exemplary Embodiment)

The fifth exemplary embodiment will be described with respect to optimum path transfer in an EoE network in a case where VPN is set up between the user terminals in the first to fourth exemplary embodiments.

Figure 29:
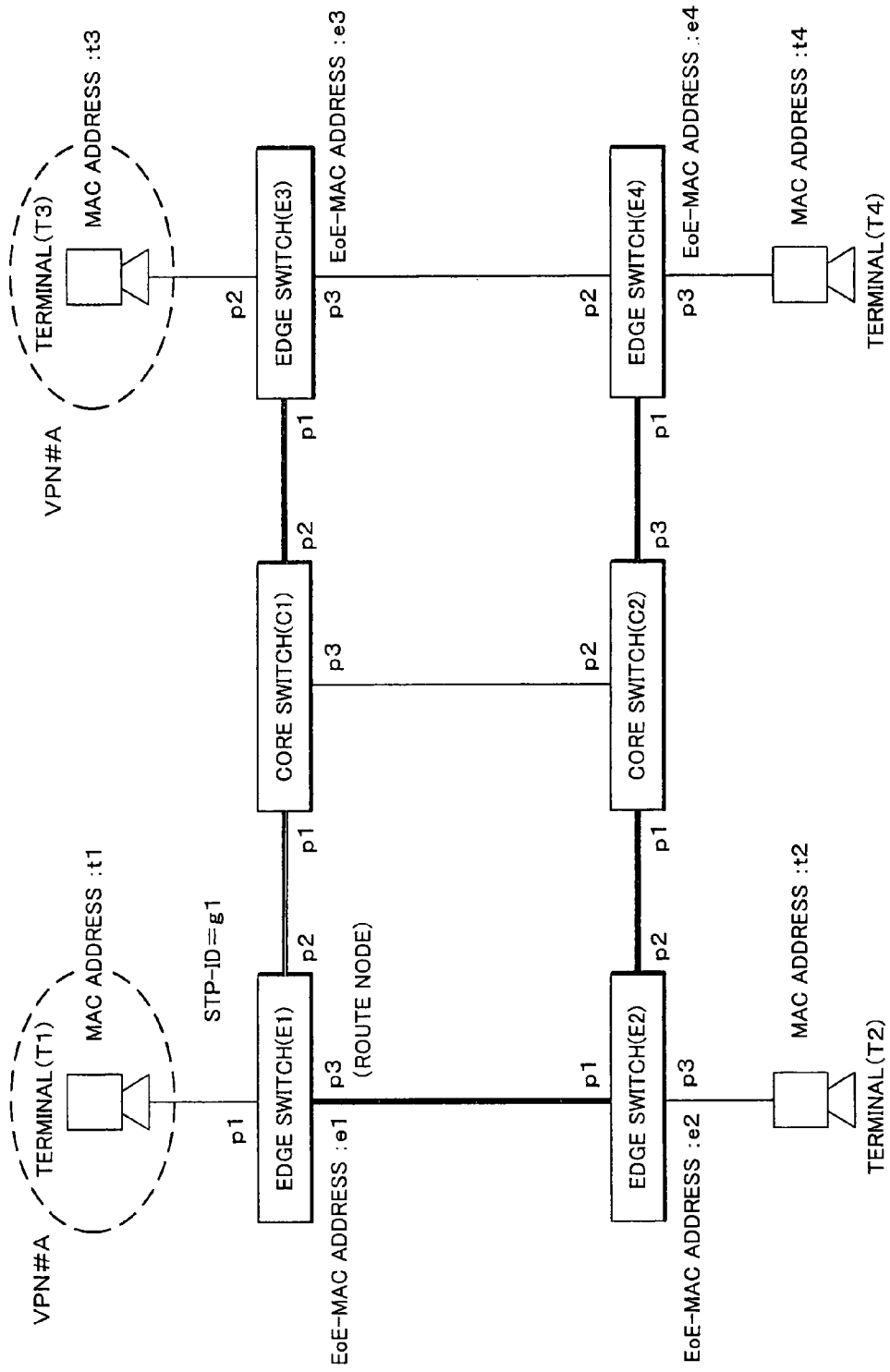
FIG. 29 is a diagram of another network model of wide area Ether of the present invention.

FIG. 29 shows a diagram of a premised network.

Figure 52:
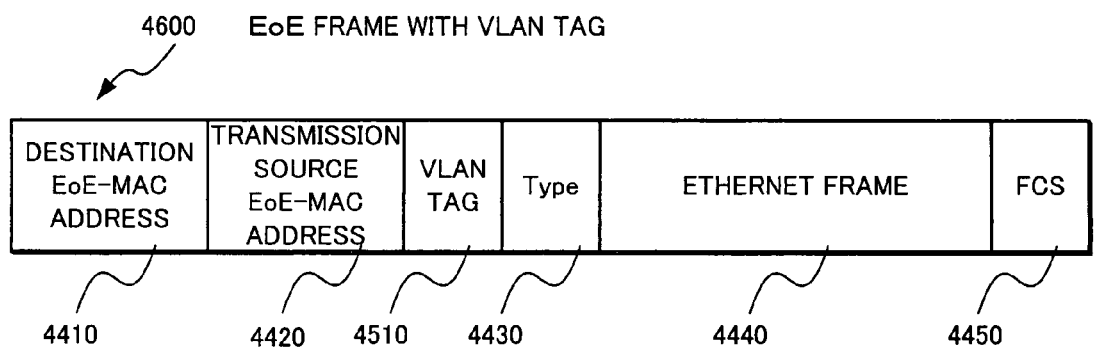
FIG. 52 shows a format of an EoE frame with a VLAN tag.
Figure 53:
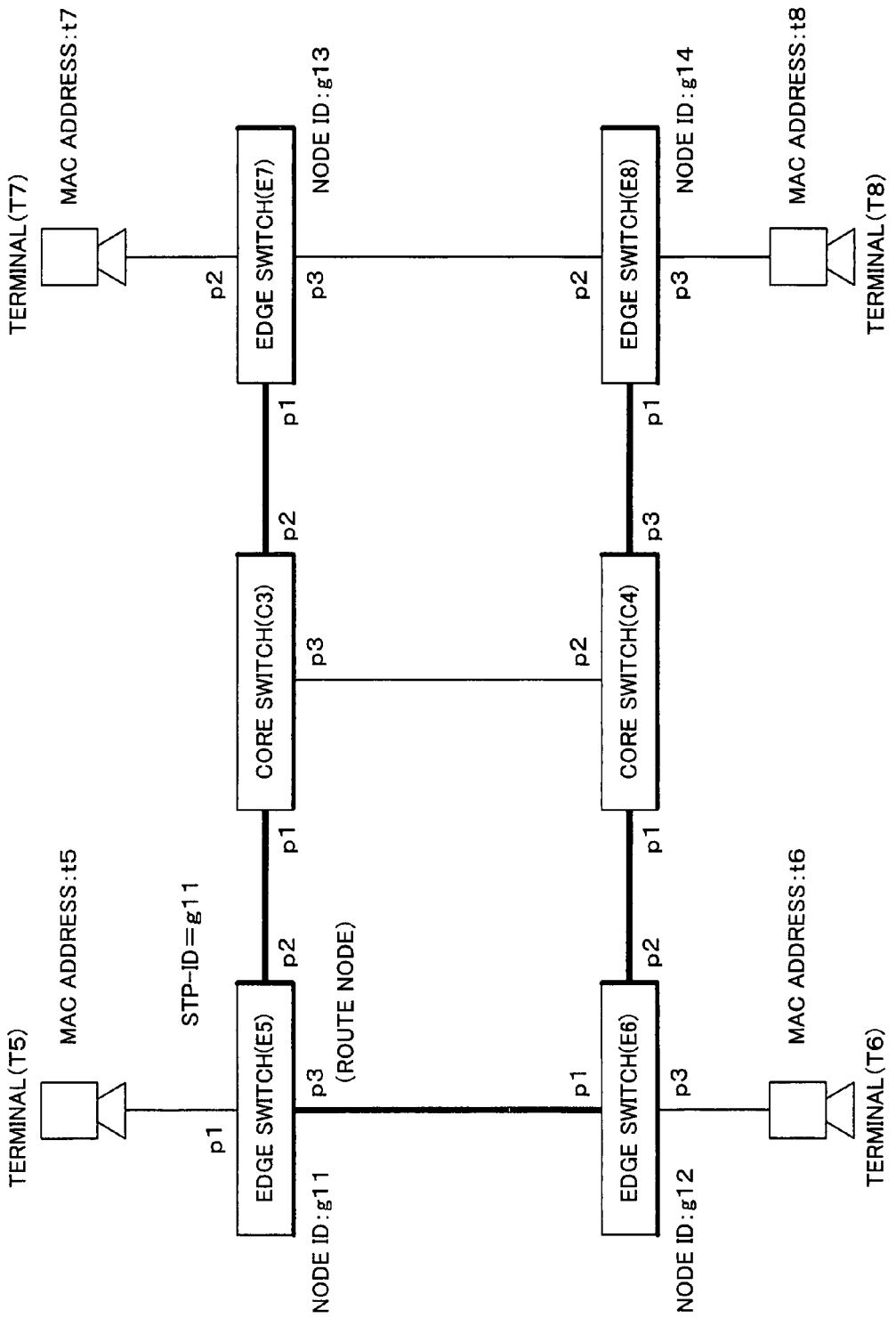
FIG. 53 is a diagram of a related wide area Ether network model.
Figure 54:
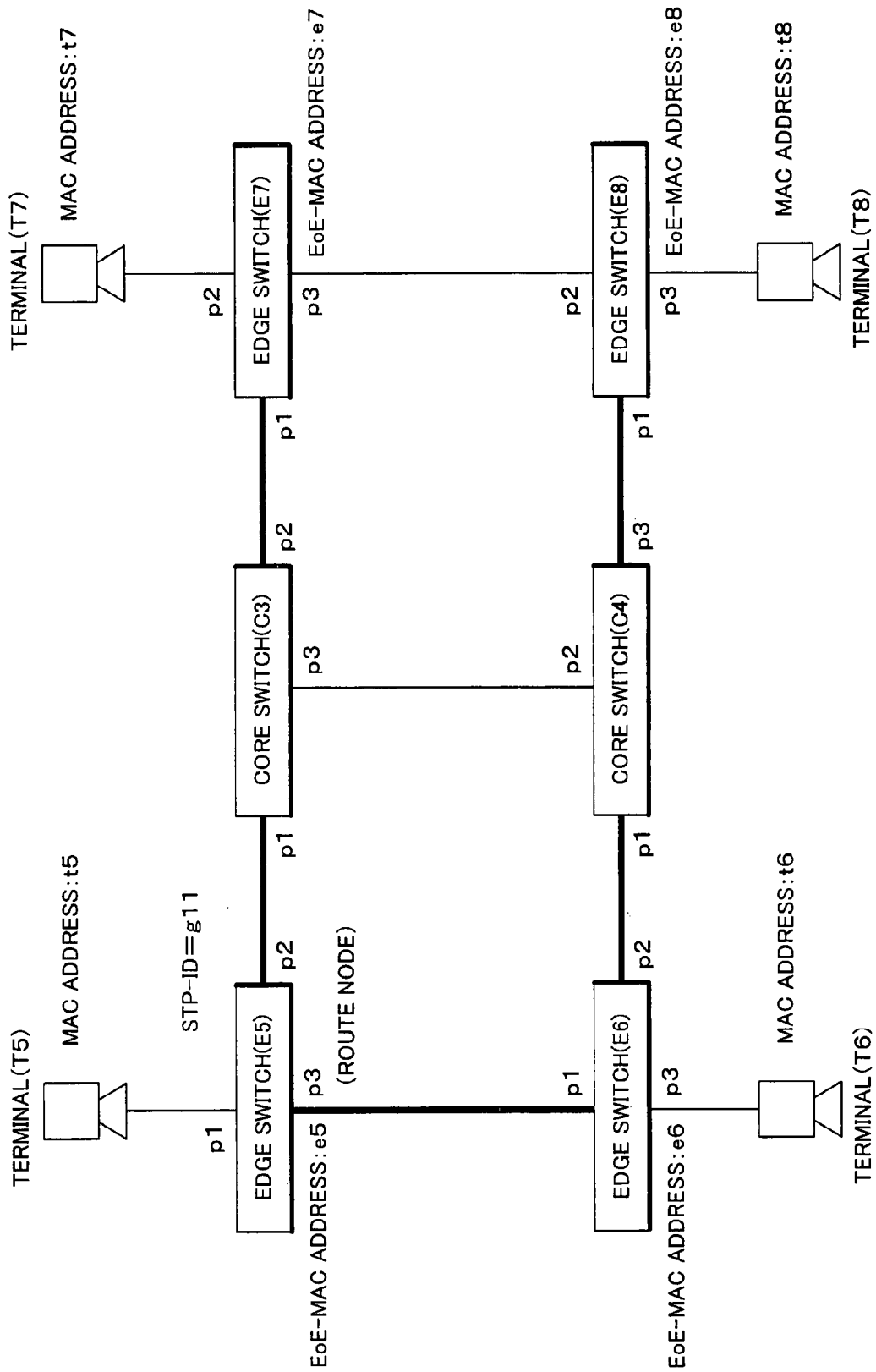
FIG. 54 is a diagram of a related wide area Ether network model.

In FIG. 29, a terminal (only the terminal T1 in FIG. 29) connected to the port p1 of the edge switch E1 and a terminal (only the terminal T3 in FIG. 29) connected to the port p2 of the edge switch E3 form VPN#A in the network of FIG. 1. When a VPN is incorporated, the format of the EoE frame will be the EoE frame 4600 with a VLAN tag of FIG. 52, in which a VPNID for identifying the VPN is stored in a VLAN tag field 4510. The VPNID in this case is set such that VLANID to be assigned for identification of the RSTP tree in a VLAN space fails to overlap with VPNID.

Since outlines of a frame transfer processing procedure, a table setting processing procedure and a correlation processing procedure in the present exemplary embodiment are the same as the respective procedures in the first to fourth exemplary embodiments with only the difference in adding a VPNID to a frame at a transfer source node and deleting the VPNID at a destination node, no description will be made thereof.

Detailed contents of the above-described procedures will be clarified in the following description of the respective components and their operation.

Figure 30:
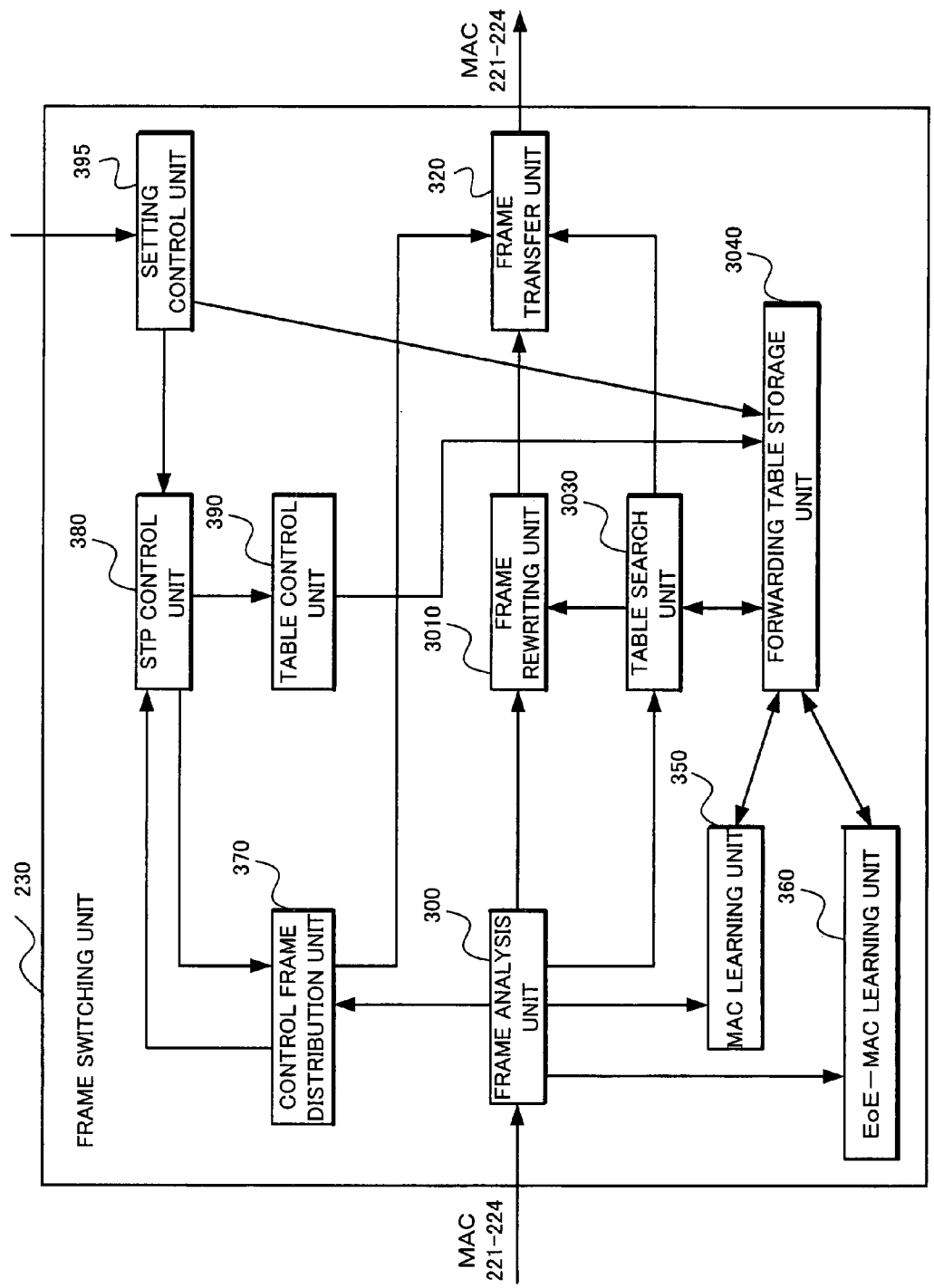
FIG. 30 is a block diagram of a frame switching unit according to a fifth exemplary embodiment of the present invention.

Structure of a node in the present exemplary embodiment is shown in FIG. 30.

In the node structure according to the first exemplary embodiment shown in FIG. 30, the frame rewriting unit 310 is changed to a frame rewriting unit 3010, the table search unit 330 to a table search unit 3030 and the forwarding table storage unit 340 to a forwarding table storage unit 3040 and the remaining units are the same as those in FIG. 3.

In the node structures on which the present exemplary embodiment is based, not only in the node structure (FIG. 3) of the first exemplary embodiment but also in the node structures (FIGS. 17, 20, 22) of the second to fourth exemplary embodiments, transfer processing executed taking VPN into consideration in the present exemplary embodiment is common.

Accordingly, the STP control unit 380 and the table control unit 390 in FIG. 30 may be the STP control unit 1780 and the table control unit 1790 in the second exemplary embodiment, or the STP control unit 380 and the table control unit 2090 in the third exemplary embodiment or the STP control unit 2280 and the table control unit 2290 in the fourth exemplary embodiment.

In the following, description will be made mainly with respect to the frame rewriting unit 3010, the table search unit 3030 and the forwarding table storage unit 3040 which are differences from the first exemplary embodiment.

When receiving an instruction from the table search unit 3030, the frame rewriting unit 3010 executes frame rewriting with respect to a main signal data frame received from the frame analysis unit 300. As to the frame rewriting, difference from the processing at the frame rewriting unit 310 is as follows.

In a case where the frame rewriting unit 310 encapsulates an EoE-MAC header to stack a VLAN tag in which VLANID is stored, the frame rewriting unit 3010 stacks a VLAN tag in which VPNID instructed by the table search unit 3030 is stored after the VLAN tag. In other words, two VLAN tags are stacked.

Figure 36:
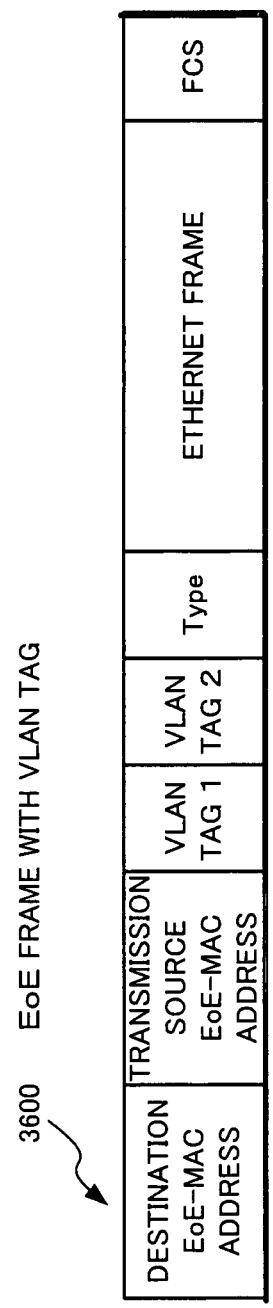
FIG. 36 shows one example of an EoE frame with a VLAN tag.

Format of an EoE frame 3600 with a VLAN tag obtained after the processing is shown in FIG. 36.

Stored in a VLAN tag 1 field is a VLAN-ID as an identifier of an RSTP tree and stored in a VLAN tag 2 field is a VPNID. At the time of header deletion, for executing header deletion processing with the frame 3600 as a target, the frame rewriting unit 3010 decapsulates the EoE-MAC header, as well as deleting both the VLAN tag 1 and the VLAN tag 2.

Figure 31:
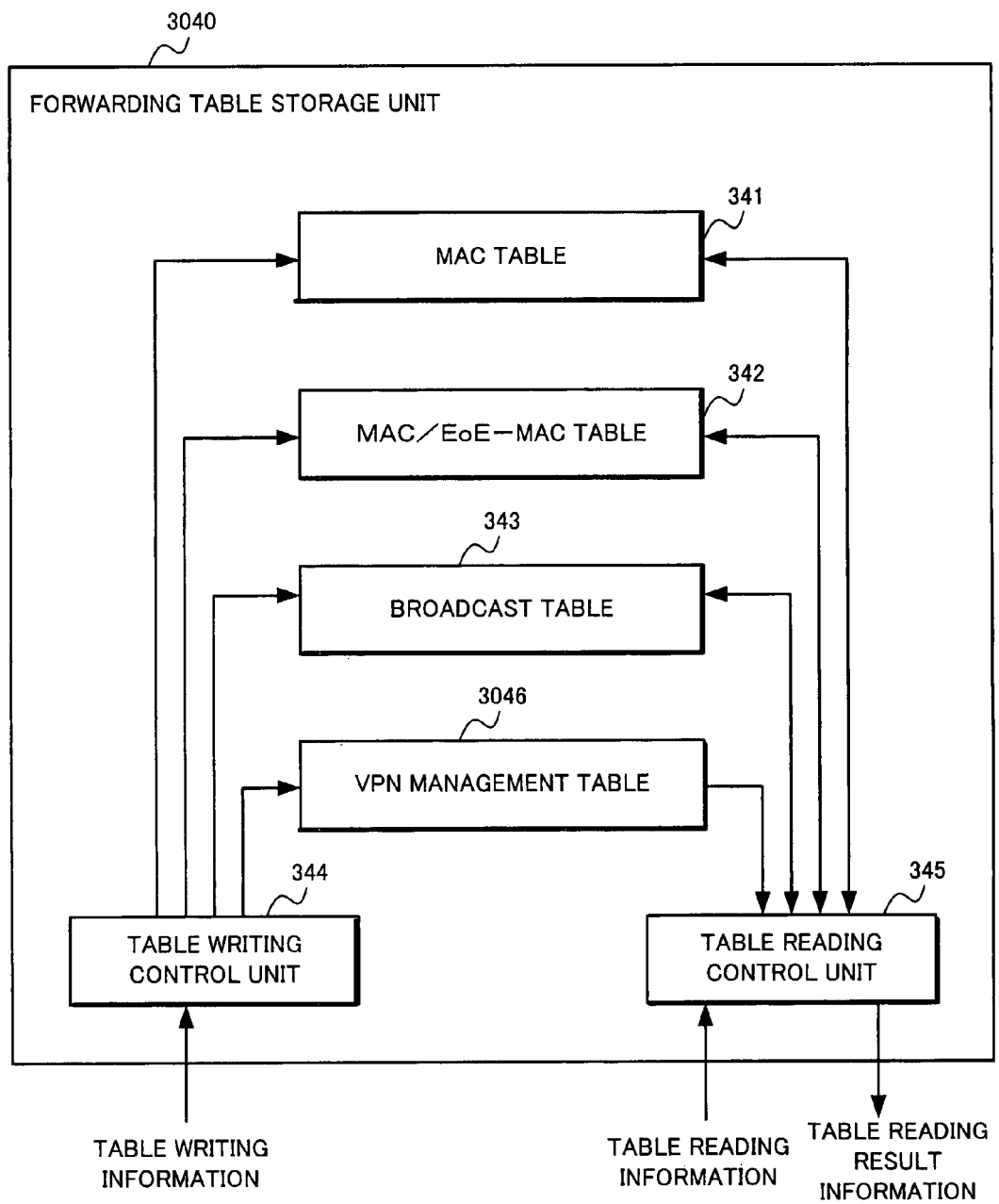
FIG. 31 is another block diagram of a forwarding table storage unit of the present invention.

As shown in FIG. 31, the forwarding table storage unit 3040 has a VPN management table 3046 for solving a VPNID added to the forwarding table storage unit 340 in FIG. 4.

The VPN management table 3046, when VPN setting is port-based, holds a port/VPN table 30461 which manages a VPNID for a port as shown in FIG. 32, as well as holding a VPN/port table 30462 which manages a port for a VPNID as shown in FIG. 33.

There is also a case where VPN setting is managed by a port and a VLANID.

The VPN management table 3046 in this case holds a port/VPN table 30463 which manages a VPNID for a port and a VLANID as shown in FIG. 34, as well as holding a VPN/port table 30464 which manages a port for a VPNID and a VLAN shown in FIG. 35.

The table search unit 3030 refers to the forwarding table storage unit 3040 based on the header information, the frame kind information and the input port information received from the frame analysis unit 300 to obtain output port information and frame rewriting information.

In the following, differences from the processing at the table search unit 330 will be described.

(1) When the frame kind information is the Ethernet (R) frame 4300 or the Ethernet (R) frame 4500 with a VLAN tag and the input port is a user terminal side port, refer to the port/VPN table 30461 or 30463 of the VPN management table 3046 to obtain a VPNID, as well as referring to the MAC/EoE-MAC table 342 of the forwarding table storage unit 3040 to obtain an EoE-MAC address for MAC_DA and a VLANID to be stored in a VLAN tag to be added.

Here, (1-1) when there exists a target entry, notify the frame rewriting unit 3010 of the obtained VPNID, EoE-MAC address and VLANID to instruct the same to encapsulate an EoE-MAC header and stack VLAN tags in which a VPNID and a VLANID are stored. Also refer to the MAC table 341 of the forwarding table storage unit 3040 to obtain output port information for the obtained EoE-MAC address and VLAN. When there exists a target entry here, notify the frame transfer unit 320 of the output port information. Conversely, when there exists no target entry, refer to the broadcast table 343 to obtain broadcast transfer port information for the VLAN and notify the frame transfer unit 320 of port information excluding the input port.

(1-2) When there exists no target entry in the MAC-EoE-MAC table 342, instruct the frame rewriting unit 3010 to encapsulate an EoE-MAC header with EoE-MAC_DA=broadcast or multicast and EoE-MAC_SA=its own node EoE-MAC. Also instruct to stack a VLAN tag in which VLANID and VPNID are respectively stored. In addition, refer to the broadcast table 343 of the forwarding table storage unit 3040 to obtain broadcast transfer port information for VLANID and notify the frame transfer unit 320 of port information excluding an input port.

(2) When the frame kind information is the EoE-MAC frame 4400 or the EoE-MAC frame 4600 with a VLAN tag, an input port is a port on the network side and a destination MAC address (EoE-MAC_DA address) is its own node address, the following processing will be executed.

(2-2) When the destination MAC address (EoE-MAC_DA address) is its own node address, refer to the VPN/port table 30462 or 30464 of the VPN management table 3046 to obtain an output port.

(2-2-1) When there exists a target entry here, notify the frame transfer unit 1020 of output port information, as well as instructing the frame rewriting unit 3010 to delete the EoE-MAC header and the VLAN tags 1 and 2.

(2-2-2) On the other hand, when there exists no target entry, refer to the broadcast table 343 to obtain broadcast transfer port information for the VLANID and notify the frame transfer unit 320 of port information excluding the input port, as well as instructing the frame rewriting unit 3010 to delete the EoE-MAC header and the VLAN tags 1 and 2.

(Effects of the Fifth Exemplary Embodiment)

The foregoing described node structure enables transfer on an optimum path in the network shown in FIG. 29 taking VPN into consideration.

(Sixth Exemplary Embodiment)

In the sixth exemplary embodiment, description will be made of another optimum path transfer when VPN is incorporated between user terminals.

In the fifth exemplary embodiment, such a broadcast frame as an unknown frame flows also on a path to which none of terminals belonging to a VPN is connected. On the other hand, in the present exemplary embodiment, a closed path is defined in a VPN and used together with an optimum path set in the first to fourth exemplary embodiments.

Path to be used is switched to transfer a broadcast frame and a multicast frame through a path in the VPN and transfer a unicast frame whose destination is specified through an optimum path.

This enables closed transfer in the same VPN for a broadcast/multicast frame, while transferring a unicast frame through an optimum path.

Figure 37:
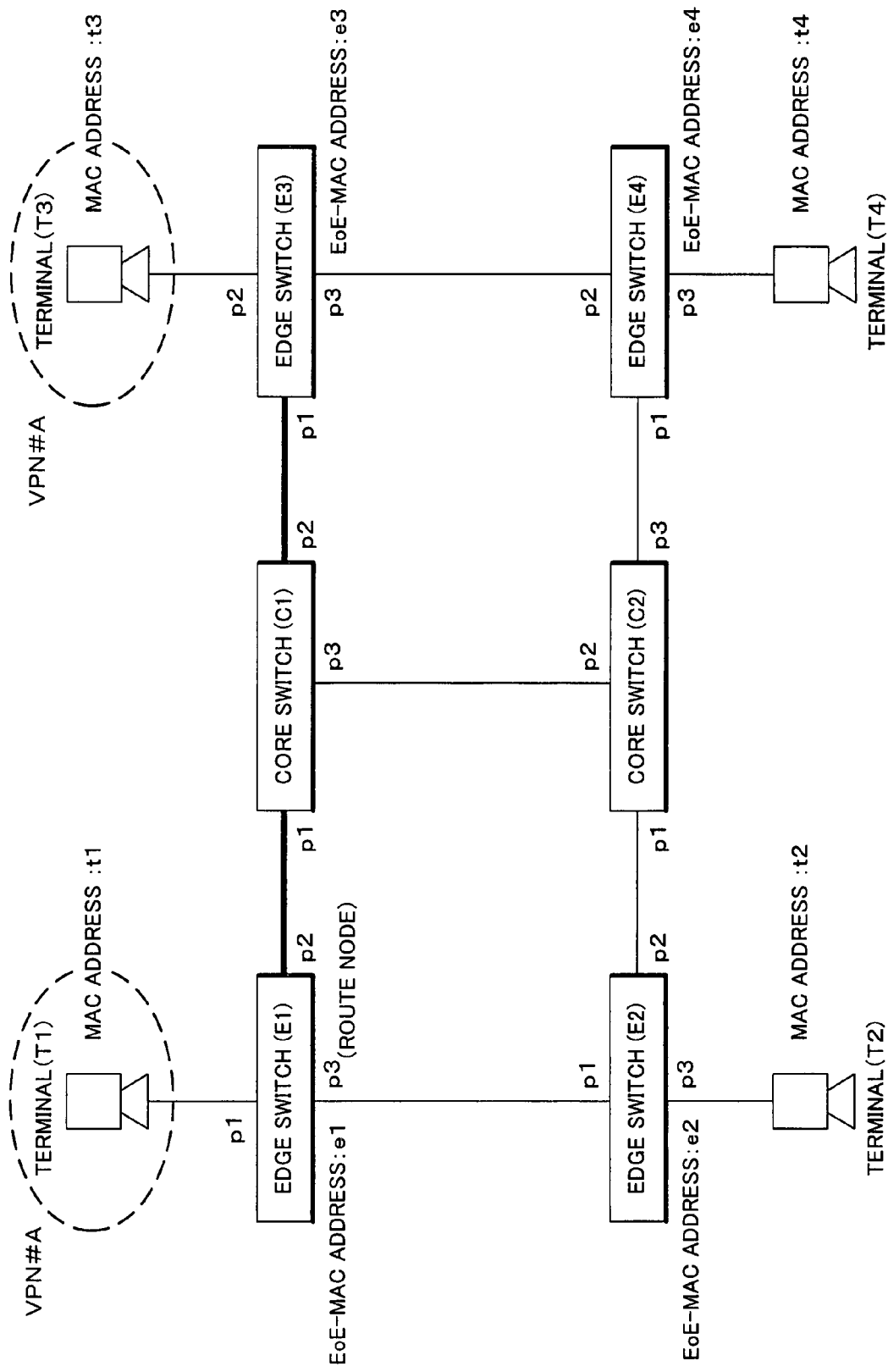
FIG. 37 is a diagram of other network model of wide area Ether of the preset invention.

FIG. 37 is a diagram of a broadcast transfer path according to the present exemplary embodiment.

While the VPN#A is set in FIG. 29, a path connecting the edge switch E1 and the edge switch E3 via the core switch C1 is set as a transfer path for executing broadcast-transfer between user terminals belonging to the VPN#A as shown in FIG. 37. The present transfer path is assumed to be manually set by a network manager or a server.

Transferring a broadcast frame on the present path enables efficient and secure transfer without arrival of a frame at a switch not related to the VPN#A.

Figure 47:
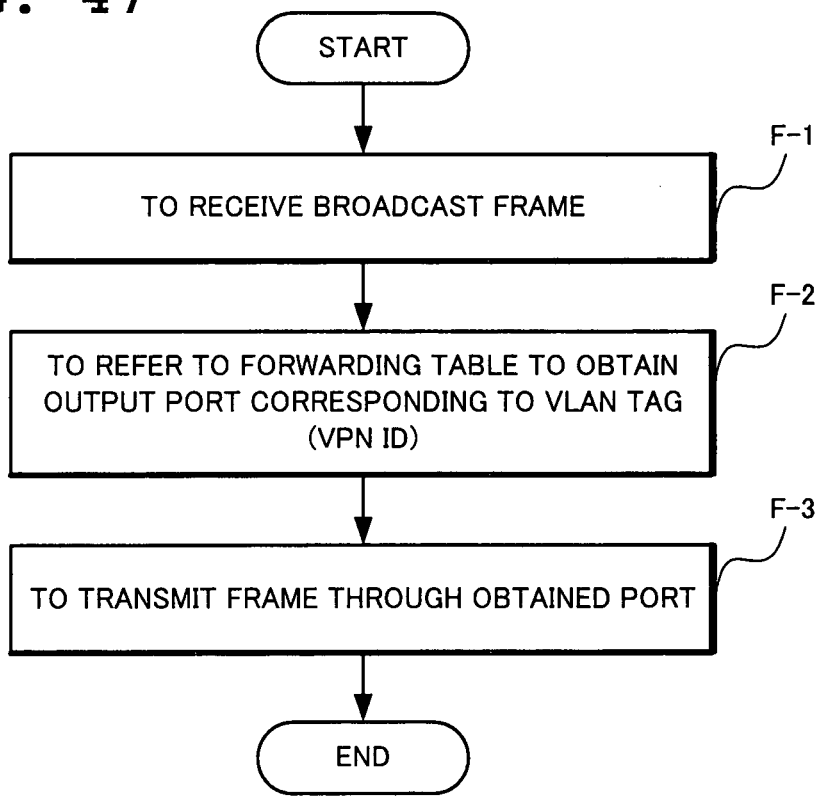
FIG. 47 is a flow chart showing an outline of a broadcast frame transfer processing procedure according to the sixth exemplary embodiment of the present invention.
Figure 48:
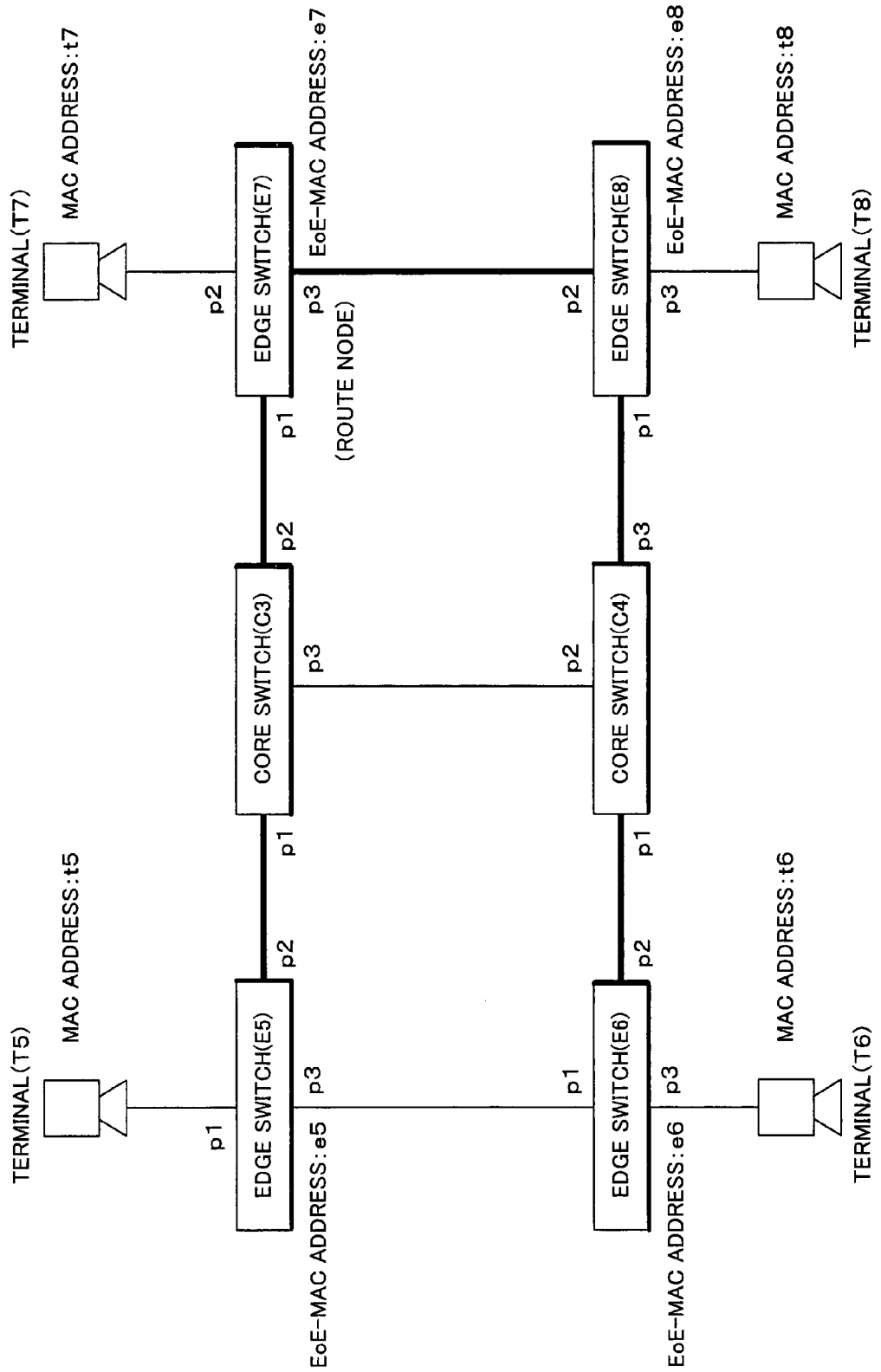
FIG. 48 is a diagram of a related wide area Ether network model.

Outlines of a broadcast frame transfer processing procedure according to the present exemplary embodiment are as shown in the flow chart of FIG. 47.

Each switch receives a broadcast frame (Step F-1).

With reference to the forwarding table, obtain an output port corresponding to a VPNID stored in a VLAN tag of the broadcast frame received at Step F-1 (Step F-2).

Transmit the frame through the port obtained at Step F-2 (Step F-3).

Since a frame transfer processing procedure and a table setting processing procedure at the time of unicast frame transfer according to the present exemplary embodiment are the same as the respective procedures in the first to third exemplary embodiments, no description will be made thereof.

Detailed contents of the above-described broadcast frame transfer processing procedure will be clarified in the following description of the respective components and their operation.

Figure 38:
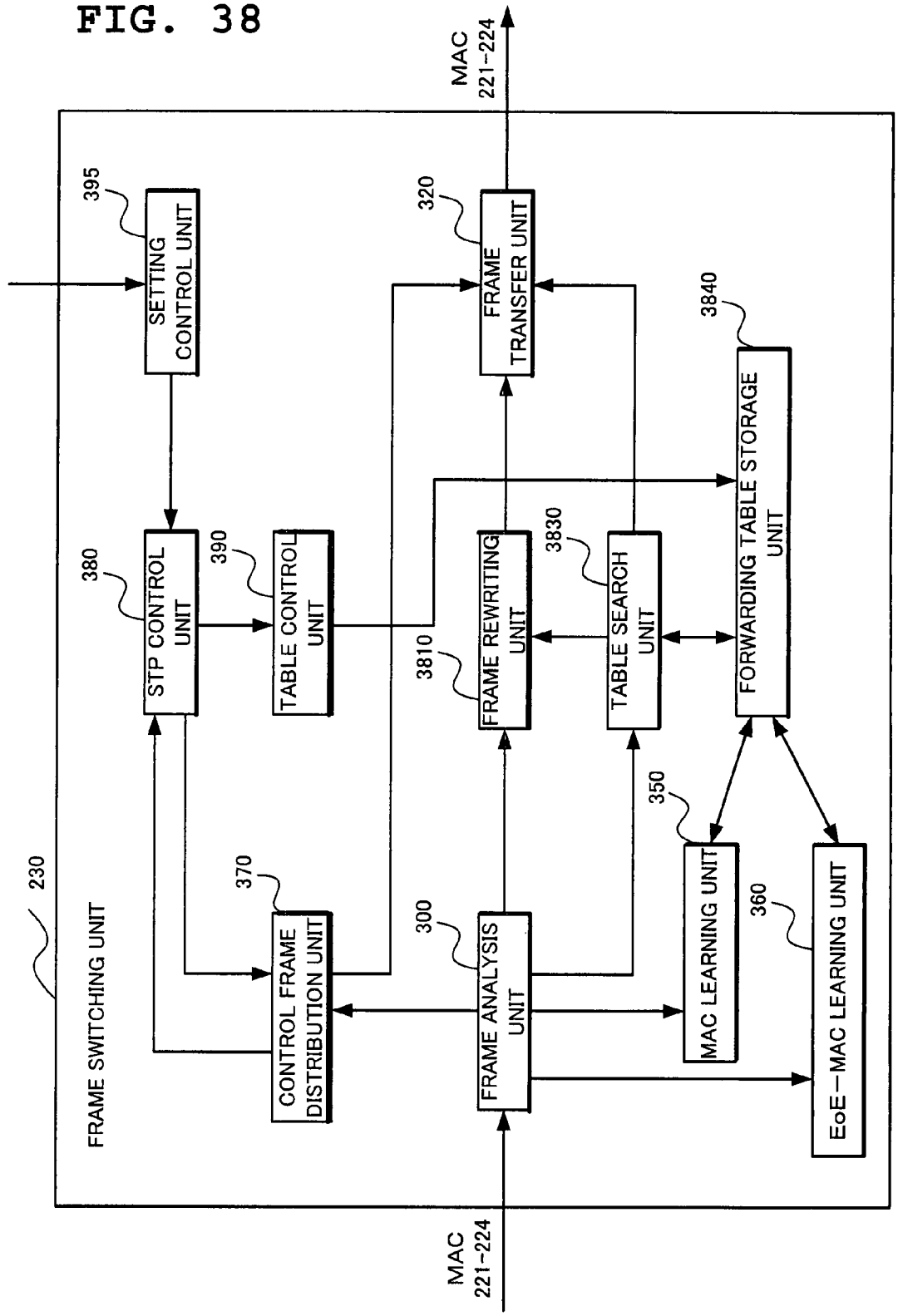
FIG. 38 is a block diagram of a frame switching unit according to a sixth exemplary embodiment of the present invention.

Structure of a node in the present exemplary embodiment is shown in FIG. 38.

In FIG. 38, the frame rewriting unit 3010 is replaced by a frame rewriting unit 3810, the table search unit 3030 by a table search unit 3830 and the forwarding table storage unit 3040 by a forwarding table storage unit 3840 in the node structure according to the fifth exemplary embodiment shown in FIG. 30 and the remaining parts are the same as those in FIG. 30.

In the following, description will be made mainly with respect to the frame rewriting unit 3810, the table search unit 3830 and the forwarding table storage unit 3840 as the differences from the fifth exemplary embodiment.

The frame rewriting unit 3810 subjects a main signal data frame received from the frame analysis unit 300 to frame rewriting when receiving an instruction from the table search unit 3830.

As to frame rewriting, the difference from the processing at the frame rewriting unit 3010 is as follows.

Processing by the frame rewriting unit 3810 differs from that by the frame rewriting unit 3010 in the processing with respect to a broadcast frame. While with respect to both a unicast frame and a broadcast frame, the frame rewriting unit 3010 stacks two tags, a VLAN tag in which an identifier (VLANID) of an RSTP tree is stored and a VLAN tag in which a VPNID is stored as well as executing EoE header encapsulation processing, the frame rewriting unit 3810, with respect to a broadcast frame, stacks only a VLAN tag in which a VPNID is stored, as well as executing EoE header encapsulation processing. At the time of header deletion, the frame rewriting unit 3810, with respect to a broadcast frame, decapsulates an EoE-MAC header, as well as deleting a VLAN tag in which a VPNID is stored.

Subsequently, while the forwarding table storage unit 3840 is the same in having the same table as that of the forwarding table storage unit 3040 shown in FIG. 30, it differs in a method of setting the broadcast table 343.

By the forwarding table storage unit 3840, the broadcast table 343 is set based on the information of the STP control unit 380 through the table control unit 390, while by the forwarding table storage unit 3840, it is set through the setting control unit 395. As the setting contents, for a VPNID, a path only through a switch related to the VPNID is determined and a port on the path is set.

The other tables (the MAC table 341, the MAC/EoE-MAC table 342 and the VPN management table 3046) are held by the same manner as that of the forwarding table storage unit 3040.

Processing of the table search unit 3830 differs from the table search unit 3030 in handling a broadcast frame.

Difference from the processing of the table search unit 3030 is as follows.

(1) When the frame kind information is the Ethernet (R) frame 4300 or the Ethernet (R) frame 4500 with a VLAN tag and the input port is a user terminal side port, refer to the port/VPN table 30461 or 30463 of the VPN management table 3046 to obtain a VPNID, as well as referring to the MAC/EoE-MAC table 342 of the forwarding table storage unit 3840 to obtain an EoE-MAC address for MAC_DA and a VLANID to be stored in a VLAN tag to be added.

Here, (1-1) when there exists a target entry, notify the frame rewriting unit 3810 of the obtained VPNID, EoE-MAC address and VLANID to instruct the same to encapsulate an EoE-MAC header and stack VLAN tags in which VPNID and VLANID are stored, respectively. Also refer to the MAC table 341 of the forwarding table storage unit 3840 to obtain output port information for the obtained EoE-MAC address and VLAN. When there exists a target entry here, notify the frame transfer unit 320 of the output port information. Conversely, when there exists no target entry, considering that a VLAN tag to be stacked is only a tag which stores a VPNID, refer to the broadcast table 343 to obtain broadcast transfer port information for the VPNID and notify the frame transfer unit 320 of port information excluding the input port.

(1-2) When there exists no target entry in the MAC-EoE-MAC table 342, instruct the frame rewriting unit 3810 to execute EoE-MAC header encapsulation with EoE-MAC_DA=broadcast or multicast and EoE-MAC_SA=its own node EoE-MAC. Also instruct to stack a VLAN tag in which a VPNID is stored. In addition, refer to the broadcast table 343 of the forwarding table storage unit 3840 to obtain broadcast transfer port information for VPNID and notify the frame transfer unit 320 of port information excluding an input port.

(2) When the frame kind information is the EoE-MAC frame 4400 or the EoE-MAC frame 4600 with a VLAN tag, an input port is a port on the network side and a destination MAC address (EoE-MAC_DA address) is its own node address, the following processing will be executed.

(2-2) When the destination MAC address (EoE-MAC DA address) is its own node address, refer to the VPN/port table 30462 or 30464 of the VPN management table 3046 to obtain an output port.

(2-2-1) When there exists a target entry here, notify the frame transfer unit 320 of output port information, as well as instructing the frame rewriting unit 3810 to delete the EoE-MAC header and the VLAN tags 1 and 2 (in a case of a broadcast frame, to be deleted are an EoE-MAC header and a VLAN tag).

(2-2-2) On the other hand, when there exists no target entry here, refer to the broadcast table 343 to obtain broadcast transfer port information for the VLANID and notify the frame transfer unit 320 of port information excluding the input port, as well as instructing the frame rewriting unit 3810 to delete the EoE-MAC header and the VLAN tags 1 and 2 (in a case of a broadcast frame, to be deleted are an EoE-MAC header and a VLAN tag).

In the following, description will be made of an example of unicast frame and broadcast frame transfer taking the VPN in the networks of FIGS. 29 and 37 formed by the switches having thus described node structure into consideration.

Description will be made of transfer between the user terminals T1 and T3 with respect to an example of broadcast transfer from the user terminal T1 in FIG. 37 and an example of unicast transfer from the user terminal T3 to T1 in FIG. 29.

Among tables which the edge switch E1, the core switch C1 and the edge switch E3 on the path have, that is, as to the MAC table and the MAC/EoE-MAC table, those shown in FIGS. 23 to 25 are used. More specifically, the edge switch E1 holds the MAC table 2304 and the MAC/EoE-MAC table 2305, the core switch C1 holds the MAC table 2404 and the edge switch E3 holds the MAC table 2504 and the MAC/EoE-MAC table 2505.

Broadcast table and a VPN management table are shown in the lump in FIG. 39.

The edge switch E1 holds a broadcast table 3901, a port/VPN table 3902 and a VPN/port table 3903, the core switch C1 holds a broadcast table 3911, and the edge switch E3 holds a broadcast table 3921, a port/VPN table 3922 and a VPN/port table 3923. In the respective broadcast tables 3901, 3911 and 3921, an entry for VPNID=A is newly set.

Since detailed description of the inside of each switch has been repeated in the exemplary embodiments so far, description will be made in the following with respect only to main points.

First is an example of broadcast transfer from the user terminal T5 in FIG. 37.

The edge switch E5 having received a frame from the user terminal T5, when determining to subject the received frame to broadcast transfer processing, refers to the port/VPN table 30461 to obtain a VPNID=A for the input port=P1, refers to the broadcast table 4600 to obtain an output port=p2 for the VPNID=A and executes EoE header encapsulating processing and stacking processing of a VLAN tag in which the VPNID=A is stored to transfer the obtained frame to the port p2.

Figure 40:
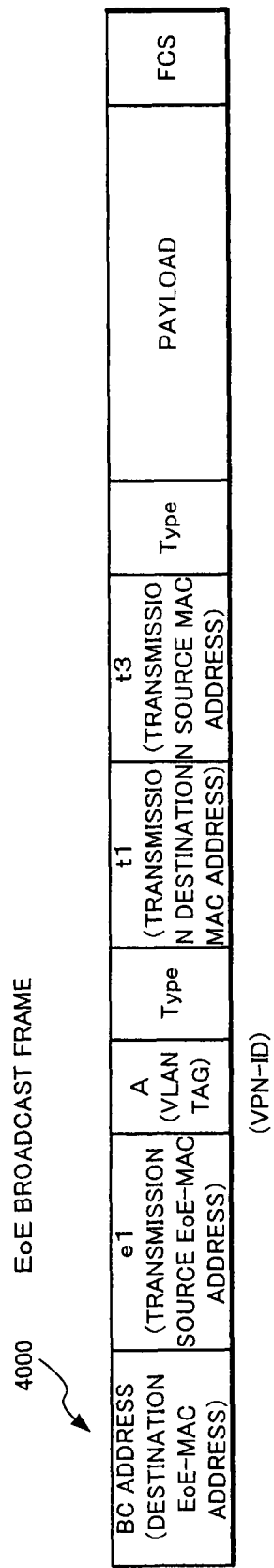
FIG. 40 shows one example of an EoE broadcast frame.

Format of an EoE broadcast frame at this time is as shown in FIG. 40.

The core switch C1 having received the frame from the edge switch E1 refers to the broadcast table 3911 to obtain output ports=p1 and p2 for the VLANID=A and transfer the frame to the port p2 other than the input port.

The edge switch E3 having received the frame from the core switch C1 refers to the broadcast table 3921 to find that an output port for the VLANID=A is no other than the input port=p1, then refers to the VPN/port table 3923 to obtain the output port=p2 for the VPNID=A and transfer the frame to the port p2 after executing deletion processing of the EoE header and the VLAN tag.

The foregoing processing enables broadcast transfer only by the shortest path between edge switches to which the VPN#A is connected.

Next is an example of unicast transfer from the user terminal T3 to T1 in FIG. 29.

Figure 41:
FIG. 41 shows one example of an EoE frame with a VLAN tag.

The edge switch E3 having received a frame directed to the user terminal T1 from the user terminal T3 refers to the MAC/EoE-MAC table 2505 to obtain EoE-MAC=e1 and VLANID=g1 for MAC_DA=t1 and refers to the MAC table 2504 to obtain the port p1 as an output port for MAC=e1 (EoE-MAC=e1) and VLANID=g1. The switch also refers to the port/VPN table 3922 to obtain VPNID=A for the input port=p2. Then, the switch executes header addition processing with EoE-MAC_DA=e1, VLANID=g1 and VPNID=A to transfer the frame to the port p1. Format of the EoE frame in this case is as shown in FIG. 41.

The core switch C1 having received a frame from the edge switch E1 refers to the MAC table 2404 to obtain an output port=p1 for MAC_DA=e1 and VLANID=g1 and transfer the frame to the port p1.

The edge switch E3 having received the frame from the core switch C1, because EoE-MAC_DA=e1 is equal to its own node EoE-MAC, refers to the VPN/port table 3903 to obtain an output port=p1 for the VPNID=A and after executing deletion processing of the EoE header and two VLAN tags, transfers the frame to the port p1.

The foregoing processing enables unicast transfer on the shortest path between edge switches to which the VPN#A is connected.

(Effects of the Sixth Exemplary Embodiment)

Thus, with the method of data transfer in a network formed of the nodes of the present invention, because a spanning tree with an edge switch as a route node is used as a transfer path to the edge switch, solving and holding correspondence between an EoE-MAC address of the edge switch and VLANID as an identifier of the tree leads to formation of the shortest path between all the edge switches, thereby enabling transfer by the shortest path between all the user terminals. This prevents unevenness of traffic in the network to enable a possibility of congestion occurrence to be lowered, thereby realizing efficient use of a network band.

Moreover, the present exemplary embodiment enables transfer on the shortest path for both unicast transfer and broadcast transfer, as well as preventing traffic between user terminals belonging to the same VPN from being transferred to a path not related to the VPN in broadcast transfer to allow transfer only on a path between edge switches belonging to the VPN, so that more efficient use of a network band can be realized. In addition, flowing of no VPN traffic outside the same VPN attains the effect in security.

According to the present invention, a node to which a transmission source node is connected transmits a data frame to be transmitted with an identifier of a node to which a destination terminal is connected and an identifier of a spanning tree with the node connected to the destination terminal as a route node added through the spanning tree as a path and a relay node holds a correspondence relationship between the identifier of the node to which the destination terminal is connected and the identifier of the spanning tree with the node connected to the destination terminal as a route node, thereby transferring the data frame based on a relationship between the identifiers of the node and the spanning tree added to the data frame and the correspondence relationship.

Thus, transferring a data frame based on the correspondence relationship enables the EoE technique to execute data frame transfer by an optimum path.

(Effect of the Invention)

According to the present invention, since in a network formed of nodes, a spanning tree with a node connected to a destination terminal as a route node is used as a transfer path to the node connected to the destination terminal, holding a correspondence relationship between an identifier of the node connected to the destination terminal and an identifier of the spanning tree leads to formation of the shortest path between all the nodes connected to the destination terminal, so that a data frame sent from a transmission source terminal can be transferred to all the destination terminals by the shortest path.

As a result, bias of traffic in the network can be eliminated to enable reduction in a possibility of congestion occurrence and efficient use of a network band, thereby improving throughput in the network as a whole.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-061675, filed on Mar. 4, 2005, the disclosure of which is incorporated herein in its entirety by reference.

The invention claimed is:

1. A node of a network for transferring a data frame sent from a transmission source terminal to a destination terminal, wherein each node in said network, comprising:
   a correspondence table which records in advance, a correspondence relationship between an identifier of a node to which said destination terminal is connected and an identifier of a spanning tree with the node connecting with said destination terminal as a route node;
   a unit which adds the identifier of the node to which said destination terminal is connected and the identifier of said spanning tree with the node as a route node to said data frame with reference to said correspondence table; and
   a determining unit which, with said spanning tree as a path, determines an output port of said data frame from said correspondence relationship recorded in said correspondence table,
   a table control unit which obtains, based on notified information from a spanning tree control unit which executes processing of said spanning tree, an identifier of the node to which said destination terminal is connected from a notified identifier of said spanning tree with reference to said correspondence table and sets an output port for the obtained node to which said destination terminal is connected at a port obtained from said spanning tree control unit to write a forwarding table, wherein
   in said forwarding table, stored are a table for holding an output port for an identifier of the node to which said destination terminal is connected and a table for holding a broadcast output port for an identifier of said spanning tree or an identifier for identifying a Virtual Private Network (VPN),
   wherein a node to which said transmission source terminal is connected, comprising:
   a unit which adds, to a data frame received from said transmission source terminal, an identifier of the node to which said destination terminal is connected as a destination address and an identifier of the node to which said transmission source terminal is connected as a transmission source address to send said data frame, thereby enabling data frame transfer on said spanning tree based on said node identifiers added,
   wherein at the time of determining an output port for the node connecting with said destination terminal, among ports of said spanning tree, said determination unit
   determines a port as a route port whose state is a forwarding state as an output port of an unicast frame, and
   determines a port which is an already assigned port and whose state is the forwarding state or a learning state as an output port of a broadcast frame,
   wherein said node transfers a predetermined control frame on a spanning tree after processing of the spanning tree is completed, wherein
   said table control unit obtains a correspondence relationship between an identifier of the node to which said destination terminal is connected and an identifier of said spanning tree from information stored in a received predetermined control frame to store the correspondence relationship in the table in which a correspondence relationship between an identifier node to which said destination terminal is connected and an identifier of said spanning tree is recorded.

2. The node according to claim 1, wherein said correspondence relationship between an identifier of the node to which said destination terminal is connected and an identifier of said spanning tree is generated from information included in a predetermined control frame transferred on the network in the generation of said spanning tree.

3. The node according to claim 1 further comprising:
   a unit which sets an identifier of the node to which said destination terminal is connected so as to obtain an identifier of the node to which said destination terminal is connected by subjecting an identifier of said spanning tree to predetermined operation; and
   a unit which obtains an identifier of the node to which said destination terminal is connected by subjecting an identifier of said spanning tree obtained from a received data frame to predetermined operation to obtain a correspondence relationship between the identifier of the node to which said destination terminal is connected and the identifier of said spanning tree.

4. The node according to claim 1, wherein in said table control unit, said correspondence table is manually set in which a correspondence relationship between an identifier of the node to which said destination terminal is connected and an identifier of said spanning tree is recorded.

5. The node according to claim 1, further comprising
   a unit which obtains a correspondence relationship between an identifier of the node to which said destination terminal is connected and an identifier of said spanning tree from information stored in a predetermined control frame transferred on said spanning tree, and wherein
   said table control unit stores said correspondence relationship information obtained in the correspondence table in which a correspondence relationship between an identifier of the node to which said destination terminal is connected and an identifier of said spanning tree is recorded.

6. The node according to claim 1, wherein said table control unit calculates an identifier of the node to which said destination terminal is connected from an obtained identifier of said spanning tree, obtains a correspondence relationship between an identifier of the node to which said destination terminal is connected and an identifier of said spanning tree, and stores said correspondence relationship information obtained in the correspondence table in which a correspondence relationship between an identifier of the node to which said destination terminal is connected and an identifier of said spanning tree is recorded.

7. The node according to claim 1, wherein the node connecting with said destination terminal stores an identifier of the node itself as a transmission source address to send a data frame with added data in which an identifier of a spanning tree with the node itself serving as a route node is stored.

8. The node according to claim 1, wherein a node other than the node connecting with said destination terminal sets a port having received said data frame which is sent by the node connecting with said destination terminal to be an output port for the node connecting with said destination terminal.

9. The node according to claim 8, further comprising:

a table search unit for, when an identifier of the node connecting with said destination terminal for a data frame received from said transmission source terminal is unknown, storing an identifier of its own node as a transmission source address and determining generation and sending-out of a data frame with data added in which an identifier of a spanning tree with its own node as a route node is stored; and a Media Access Control (MAC) learning unit for setting an output port for a combination between a node identifier stored in a transmission source address of a received data frame and a spanning tree identifier to be a reception port of said received data frame.

10. The node according to claim 1, which when said transmission source terminal and said destination terminal which execute transmission/reception of a data frame form a network based on another protocol, adds data storing an identifier for identifying said network based on another protocol together with data storing an identifier of said spanning tree to said data frame.

11. The node according to claim 10, further comprising:

a first table for holding an identifier of a network based on another protocol for a reception port of a data frame; or a second table for holding an identifier of a network based on another protocol for a reception port of a data frame and an identifier of a spanning tree.

12. The node according to claim 10, wherein said network based on said another protocol is VPN.

13. The node according to claim 1, wherein when said transmission source terminal and said destination terminal which execute transmission/reception of a data frame form a network based on another protocol, when said data frame is a unicast frame, said spanning tree is used as a transfer path, with data storing an identifier for identifying a network based on another protocol added to said data frame together with data storing an identifier of said spanning tree, and when said data frame is a multicast frame or a broadcast frame, a transfer path set for a terminal belonging to a network based on another protocol is used with the data storing an identifier for identifying said network based on another protocol added to said data frame.

14. The node according to claim 13, further comprising:

a first table for holding an identifier of a network based on another protocol for a reception port of a data frame; or a second table for holding an identifier of a network based on another protocol for a reception port of a data frame and an identifier of a spanning tree; and a table search unit, when said data frame is a unicast frame, determines generation and sending-out of the data frame with data storing an identifier for identifying a network based on another protocol added together with data storing an identifier of said spanning tree, and when said data frame is a multicast frame or a broadcast frame, determines generation and sending-out of the data frame with the data storing an identifier for identifying said network based on another protocol added.

15. The node according to claim 1, wherein an identifier of the node to which said destination terminal is connected is an Ethernet-Over-net-Media Access Control (EoE-MAC) address.

16. A network including a plurality of nodes for transferring a data frame between a transmission source terminal and a destination terminal connected to said nodes, wherein each node in said network comprises:

a correspondence table which records in advance a correspondence relationship between an identifier of a node to which said destination terminal is connected and an identifier of a spanning tree with the node connecting with said destination terminal as a route node;

a unit which adds the identifier of the node to which said destination terminal is connected and the identifier of said spanning tree with the node as a route node to said data frame with reference to said corresponding table; and a determining units which, on said spanning tree, determines an output port for the node to which said destination terminal is connected from said correspondence relationship recorded in said correspondence table based on port information of said spanning tree to transfer said data frame, a table control unit which obtains, based on notified information from a spanning tree control unit which executes processing of said spanning tree, an identifier of the node to which said destination terminal is connected from a notified identifier of said spanning tree with reference to said correspondence table and sets an output port for the obtained node to which said destination terminal is connected at a port obtained from said spanning tree control unit to write a forwarding table, wherein in said forwarding table, stored are a table for holding an output port for an identifier of the node to which said destination terminal is connected and a table for holding a broadcast output port for an identifier of said spanning tree or an identifier for identifying a Virtual Private Network (VPN), wherein a node to which said transmission source terminal is connected, comprising:

a unit which adds, to a data frame received from said transmission source terminal, an identifier of the node to which said destination terminal is connected as a destination address and an identifier of the node to which said transmission source terminal is connected as a transmission source address to send said data frame, thereby enabling data frame transfer on said spanning tree based on said node identifiers added, wherein at the time of determining an output port for the node connecting with said destination terminal, among ports of said spanning tree, said determination unit determines a port as a route port whose state is a forwarding state as an output port of an unicast frame, and determines a port which is an already assigned port and whose state is the forwarding state or a learning state as an output port of a broadcast frame, wherein a predetermined control frame is transferred on a spanning tree after processing of the spanning tree is completed, and said table control unit obtains a correspondence relationship between an identifier of the node to which said destination terminal is connected and an identifier of said spanning tree from information stored in said predetermined control frame received to store the correspondence relationship in the table in which a correspondence relationship between an identifier node to which said destination terminal is connected and an identifier of said spanning tree is recorded.

17. The network according to claim 16, wherein said correspondence relationship between an identifier of the node to which said destination terminal is connected and an identifier of said spanning tree is generated from information included in a predetermined control frame transferred on the network in the generation of said spanning tree.

18. The network according to claim 16, wherein said node further comprising:
a unit which sets an identifier of the node to which said destination terminal is connected so as to obtain an identifier of the node to which said destination terminal is connected by subjecting an identifier of said spanning tree to predetermined operation; and
a unit which said node obtains an identifier of the node to which said destination terminal is connected by subjecting an identifier of said spanning tree obtained from a received data frame to predetermined operation to obtain a correspondence relationship between an identifier of the node to which said destination terminal is connected and an identifier of said spanning tree.

19. The network according to claim 16, wherein in said table control unit, the correspondence table is manually set in which a correspondence relationship between an identifier of the node to which said destination terminal is connected and an identifier of said spanning tree is recorded.

20. The network according to claim 16, wherein each node further comprises:
a unit which obtains a correspondence relationship between an identifier of the node to which said destination terminal is connected and an identifier of said spanning tree from information stored in a predetermined control frame transferred on said spanning tree, and
said table control unit stores said correspondence relationship information obtained in the correspondence table in which a correspondence relationship between an identifier of the node to which said destination terminal is connected and an identifier of said spanning tree is recorded.

21. The network according to claim 16, wherein said table control unit
calculates an identifier of the node to which said destination terminal is connected from an obtained identifier of said spanning tree,
obtains a correspondence relationship between an identifier of the node to which said destination terminal is connected and an identifier of said spanning tree, and
stores said correspondence relationship information obtained in the correspondence table in which a correspondence relationship between an identifier of the node to which said destination terminal is connected and an identifier of said spanning tree is recorded.

22. The network according to claim 16, wherein the node connecting with said destination terminal stores an identifier of the node itself as a transmission source address to send a data frame with added data in which an identifier of a spanning tree with the node itself serving as a route node is stored.

23. The network according to claim 16, wherein a node other than the node connecting with said destination terminal sets a port having received said data frame which is sent by the node connecting with said destination terminal to be an output port for the node connecting with said destination terminal.

24. The network according to claim 23, wherein each node further comprises:
a table search unit for, when an identifier of the node connecting with said destination terminal for a data frame received from said transmission source terminal is unknown, storing an identifier of its own node as a transmission source address and determining generation and sending-out of a data frame with data added in which an identifier of a spanning tree with its own node as a route node is stored; and
a Media Access Control (MAC) learning unit for setting an output port for a combination between the node identifier stored in the transmission source address of the received data frame and the spanning tree identifier to be a reception port of said received data frame.

25. The network according to claim 16, wherein when said transmission source terminal and said destination terminal which execute transmission/reception of a data frame form a network based on another protocol, added to said data frame are data storing an identifier for identifying said network based on another protocol together with data storing an identifier of said spanning tree.

26. The network according to claim 25, further comprising:
a first table for holding an identifier of a network based on another protocol for a reception port of a data frame; or
a second table for holding an identifier of a network based on another protocol for a reception port of a data frame and an identifier of a spanning tree.

27. The network according to claim 25, wherein said network based on another protocol is VPN.

28. The network according to claim 16, wherein when said transmission source terminal and said destination terminal which executes transmission/reception of a data frame faun a network based on another protocol,
when said data frame is a unicast frame, said spanning tree is used as a transfer path, with data storing an identifier for identifying a network based on another protocol added to said data frame together with data storing an identifier of said spanning tree, and
when said data frame is a multicast frame or a broadcast frame, a transfer path set for a terminal belonging to a network based on another protocol is used with the data storing an identifier for identifying said network based on another protocol added to said data frame.

29. The network according to claim 28, wherein provided is
a first table for holding an identifier of a network based on another protocol for a reception port of a data frame; or
a second table for holding an identifier of a network based on another protocol for a reception port of a data frame and an identifier of a spanning tree; and
a table search unit when said data frame is a unicast frame, determines generation and sending-out of the data frame with data storing an identifier for identifying a network based on another protocol added together with data storing an identifier of said spanning tree, and when said data frame is a multicast frame or a broadcast frame, determines generation and sending-out of the data frame with the data storing an identifier for identifying said network based on another protocol added.

30. The network according to claims 16, wherein an identifier of the node to which said destination terminal is connected is an Ethernet-Over-net-Media Access Control (EoE-MAC) address.

31. A method of generating a correspondence relationship of transfer information in a network for transferring a data frame sent from a transmission source terminal to a destination terminal, comprising the steps of
adding an identifier of a node to which said destination terminal is connected and an identifier of a spanning tree with the node to which said destination terminal is connected as a route node to said data frame; and
generating a correspondence relationship for determining an output port of said data frame to be transferred to the node to which said destination terminal is connected based on port information of said spanning tree, which is a correspondence relationship between an identifier of the node to which said destination terminal is connected and an identifier of the spanning tree with the node to which said destination terminal is connected as a route node to each node in said network, wherein each node holds a correspondence table for recording in advance a correspondence relationship between an identifier of the node to which said destination terminal is connected and an identifier of said spanning tree;
obtaining, based on notified information from a spanning tree control unit which executes processing of said spanning tree, an identifier of the node to which said destination terminal is connected from the notified identifier of said spanning tree with reference to said correspondence table;
executing processing of said spanning tree by said spanning tree control unit;
setting an output port for the obtained node to which said destination terminal is connected at a port obtained from said spanning tree control unit; and
writing a forwarding table,
and which comprises the step of:
in said forwarding table, storing a table for holding an output port for an identifier of the node to which said destination terminal is connected and a table for holding a broadcast output port for an identifier of said spanning tree or an identifier for identifying a Virtual Private Network (VPN),
wherein a node to which said transmission source terminal is connected:
adding, to a data frame received from said transmission source terminal, an identifier of the node to which said destination terminal is connected as a destination address and an identifier of the node to which said transmission source terminal is connected as a transmission source address to send said data frame, thereby enabling data frame transfer on said spanning tree based on said node identifiers added,
wherein at the time of determining an output port for the node connecting with said destination terminal among ports of said spanning tree,
determining a port as a route port whose state is a forwarding state as an output port of an unicast frame, and
determining a port which is an already assigned port and whose state is the forwarding state or a learning state as an output port of a broadcast frame,
obtaining a correspondence relationship between an identifier of the node to which said destination terminal is connected and an identifier of said spanning tree from information stored in a predetermined control frame transferred on said spanning tree, and
storing said correspondence relationship information obtained in the table in which a correspondence relationship between an identifier of the node to which said destination terminal is connected and an identifier of said spanning tree is recorded.

32. The transfer information correspondence relationship generating method according to claim 31, wherein a correspondence relationship between an identifier of the node to which said destination terminal is connected and an identifier of said spanning tree is generated from information included in a predetermined control frame transferred on the network in the generation of said spanning tree.

33. The transfer information correspondence relationship generating method according to claim 31, further comprising the steps of:
obtaining an identifier of the node to which said destination terminal is connected by subjecting an identifier of said spanning tree to predetermined operation, setting an identifier of the node to which said destination terminal is connected; and
obtaining an identifier of the node to which said destination terminal is connected by subjecting an identifier of said spanning tree obtained from a received data frame to predetermined operation to generate a correspondence relationship between an identifier of the node to which said destination terminal is connected and an identifier of said spanning tree.

34. The transfer information correspondence relationship generating method according to claim 31, further comprising the step of: manually setting the correspondence table in which a correspondence relationship between an identifier of the node to which said destination terminal is connected and an identifier of said spanning tree is recorded.

35. The transfer information correspondence relationship generating method according to claim 31, further comprising the steps of:
calculating an identifier of the node to which said destination terminal is connected from an obtained identifier of said spanning tree,
obtaining a correspondence relationship between an identifier of the node to which said destination terminal is connected and an identifier of said spanning tree, and
storing said correspondence relationship information obtained in the correspondence table in which a correspondence relationship between an identifier of the node to which said destination terminal is connected and an identifier of said spanning tree is recorded.

36. The transfer information correspondence relationship generating method according to claim 31, wherein the node connecting with said destination terminal stores an identifier of the node itself as a transmission source address to send a data frame with added data in which an identifier of a spanning tree with the node itself serving as a route node is stored.

37. The transfer information correspondence relationship generating method according to claim 31, wherein a node other than the node connecting with said destination terminal sets a port having received said data frame which is sent by the node connecting with said destination terminal to be an output port for the node connecting with said destination terminal.

38. The transfer information correspondence relationship generating method according to claim 37, further comprising the steps of:
when an identifier of the node connecting with said destination terminal for a data frame received from said transmission source terminal is unknown, storing an identifier of its own node as a transmission source address and determining generation and sending-out of a data frame with data added in which an identifier of a spanning tree with its own node as a route node is stored; and
setting an output port for a combination between the node identifier stored in the transmission source address of the received data frame and the spanning tree identifier to be a reception port of said received data frame.

39. The transfer information correspondence relationship generating method according to claim 31, further comprising the step of:
when said transmission source terminal and said destination terminal which execute transmission/reception of a data frame form a network based on another protocol, adding data storing an identifier for identifying said network based on another protocol together with data storing an identifier of said spanning tree to said data frame.

40. The transfer information correspondence relationship generating method according to claim 39, further comprising the step of:
generating a first table for holding an identifier of a network based on another protocol for a reception port of a data frame or a second table for holding an identifier of a network based on another protocol for a reception port of a data frame and an identifier of a spanning tree.

41. The transfer information correspondence relationship generating method according to claim 31, wherein when said transmission source terminal and said destination terminal which execute transmission/reception of a data frame form a network based on another protocol, the method further comprising the steps of:
when said data frame is a unicast frame, using said spanning tree as a transfer path, with data storing an identifier for identifying a network based on another protocol added to said data frame together with data storing an identifier of said spanning tree, and
when said data frame is a multicast frame or a broadcast frame, using a transfer path set for a terminal belonging to a network based on another protocol, with the data storing an identifier for identifying said network based on another protocol added to said data frame.

42. The transfer information correspondence relationship generating method according to claim 41, wherein provided is a table for holding an identifier of a network based on other protocol for a reception port of a data frame or a table for holding an identifier of a network based on other protocol for a reception port of a data frame and an identifier of a spanning tree, and the method further comprising the steps of:
when said data frame is a unicast frame, determining generation and sending-out of the data frame with data storing an identifier for identifying a network based on other protocol added together with data storing an identifier of said spanning tree, and
when said data frame is a multicast frame or a broadcast frame, determining generation and sending-out of the data frame with the data storing an identifier for identifying said network based on other protocol added.

43. A computer readable storage device having frame transfer program which is executed on a computer of a node of a network for transferring a data frame between a transmission source terminal and a destination terminal, which causes said node to execute the functions of:
holding a correspondence table which records in advance a correspondence relationship between an identifier of a node to which said destination terminal is connected and an identifier of a spanning tree with the node connecting with said destination terminal as a route node;
adding the identifier of the node to which said destination terminal is connected and the identifier of said spanning tree to said data frame; and
on said spanning tree, determining an output port for the node to which said destination terminal is connected from said correspondence relationship recorded in said correspondence table based on port information of said spanning tree to transfer said data frame
obtaining, based on notified information from the spanning tree control function which executes processing of said spanning tree, an identifier of the node to which said destination terminal is connected from a notified identifier of said spanning tree with reference to said correspondence table and setting an output port for the obtained node to which said destination terminal is connected at a port obtained from said spanning tree control unit to write a forwarding table, and which causes said forwarding table to execute the function of:
storing a table for holding an output port for an identifier of the node to which said destination terminal is connected and a table for holding a broadcast output port for an identifier of said spanning tree or an identifier for identifying a Virtual Private Network (VPN),
which causes a node to which said transmission source terminal is connected to execute the functions of:
adding an identifier of the node to which said destination terminal is connected as a destination address and an identifier of the node to which said transmission source terminal is connected as a transmission source address to a data frame received from said transmission source terminal; and
on said spanning tree, transferring said data frame based on said node identifiers added,
which causes, at the time of determining an output port for the node connecting with said destination terminal, among ports of said spanning tree, the functions to be executed of:
setting a port as a route port whose state is a forwarding state to be an output port of an unicast frame; and
setting a port which is an already assigned port and whose state is at the forwarding state or a learning state to be an output port of a broadcast frame,
transferring a predetermined control frame on a spanning tree after processing of the spanning tree is completed, wherein
said table control function obtains a correspondence relationship between an identifier of the node to which said destination terminal is connected and an identifier of said spanning tree from information stored in a received predetermined control frame to store the correspondence relationship between an identifier of the node to which said destination terminal is connected and an identifier of said spanning tree is recorded.

44. The computer readable storage device according to claim 43, further having a frame transfer program which causes said node to execute the function of generating a correspondence relationship between an identifier of the node to which said destination terminal is connected and an identifier of said spanning tree from information included in a predetermined control frame transferred on the network in the generation of said spanning tree.

45. The computer readable storage device according to claim 43, further having a frame transfer program which causes execution of function of:
  obtaining an identifier of the node to which said destination terminal is connected by subjecting an identifier of said spanning tree to predetermined operation, setting an identifier of the node to which said destination terminal is connected, and which causes said node to execute the function of:
  obtaining an identifier of the node to which said destination terminal is connected by subjecting an identifier of said spanning tree obtained from a received data frame to predetermined operation to obtain a correspondence relationship between an the identifier of the node to which said destination terminal is connected and an identifier of said spanning tree.

46. The computer readable storage device according to claim 43, wherein said table control function manually sets the correspondence table in which a correspondence relationship between an identifier of the node to which said destination terminal is connected and an identifier of said spanning tree is recorded.

47. The computer readable storage device according to claim 43, wherein said table control function comprises the steps of:
  calculating an identifier of the node to which said destination terminal is connected from an obtained identifier of said spanning tree;
  obtaining a correspondence relationship between an identifier of the node to which said destination terminal is connected and an identifier of said spanning tree; and
  storing said correspondence relationship information obtained in the correspondence table in which a correspondence relationship between an identifier of the node to which said destination terminal is connected and an identifier of said spanning tree is recorded.

48. The computer readable storage device according to claim 43, further having a frame transfer program which causes the node connecting with said destination terminal to execute the function of storing an identifier of the node itself as a transmission source address to send a data frame with added data in which an identifier of a spanning tree with the node itself serving as a route node is stored.

49. The computer readable storage device according to of claim 43, further having a frame transfer program which causes a node other than the node connecting with said destination terminal to execute the function of setting a port having received said data frame which is sent by the node connecting with said destination terminal to be an output port for the node connecting with said destination terminal.

50. The computer readable storage device according to claim 49, further having a frame transfer program which causes execution of:
  a table search function when an identifier of the node connecting with said destination terminal for a data frame received from said transmission source terminal is unknown, storing an identifier of its own node as a transmission source address and determining generation and sending-out of a data frame with data added in which an identifier of a spanning tree with its own node as a route node is stored, and
  setting an output port for a combination between the node identifier stored in the transmission source address of the received data frame and the spanning tree identifier to be a reception port of said received data frame.

51. The computer readable storage device according to claim 43, further having a frame transfer program which causes execution of the function of, when said transmission source terminal and said destination terminal which execute transmission/reception of a data frame faun a network based on another protocol, adding data storing an identifier for identifying said network based on another protocol together with data storing an identifier of said spanning tree to said data frame.

52. The computer readable storage device according to claim 51, further having a frame transfer program which causes execution of the function of:
  generating a first table for holding an identifier of a network based on another protocol for a reception port of a data frame; or
  generating a second table for holding an identifier of a network based on another protocol for a reception port of a data frame and an identifier of a spanning tree.

53. The computer readable storage device according to claim 43, wherein when said transmission source terminal and said destination terminal which execute transmission/reception of a data frame form a network based on another protocol, said frame transfer program causes execution of the functions of:
  when said data frame is a unicast frame, using said spanning tree as a transfer path, with data storing an identifier for identifying a network based on another protocol added to said data frame together with data storing an identifier of said spanning tree, and
  when said data frame is a multicast frame or a broadcast frame, using a transfer path set for a terminal belonging to a network based on another protocol, with the data storing an identifier for identifying said network based on another protocol added to said data frame.

54. The computer readable storage device according to claim 53, comprising:
  a first table for holding an identifier of a network based on another protocol for a reception port of a data frame or a second table for holding an identifier of a network based on another protocol for a reception port of a data frame and an identifier of a spanning tree, further having a frame transfer program which causes execution of the functions of:
  when said data frame is a unicast frame, determining generation and sending-out of the data frame with data storing an identifier for identifying a network based on another protocol added together with data storing an identifier of said spanning tree, and
  when said data frame is a multicast frame or a broadcast frame, determining generation and sending-out of the data frame with the data storing an identifier for identifying said network based on another protocol added.

\* \* \* \* \*